(12) United States Patent
Diard et al.

(10) Patent No.: US 10,217,444 B2
(45) Date of Patent: Feb. 26, 2019

(54) METHOD AND SYSTEM FOR FAST CLONING OF VIRTUAL MACHINES

(71) Applicant: NVIDIA Corporation, Santa Clara, CA (US)

(72) Inventors: Franck Diard, Mountain View, CA (US); Bojan Vukojevic, Dublin, CA (US); Matt Lavoie, Raleigh, NC (US); Yao-Tian Wang, Emerald Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/137,789

(22) Filed: Dec. 20, 2013

(65) Prior Publication Data

US 2015/0113527 A1 Apr. 23, 2015

Related U.S. Application Data

(63) Continuation of application No. 14/092,872, filed on Nov. 27, 2013, now abandoned.
(Continued)

(51) Int. Cl.
*G06F 9/455* (2018.01)
*H04L 12/911* (2013.01)
(Continued)

(52) U.S. Cl.
CPC ......... *G09G 5/393* (2013.01); *A63F 13/2145* (2014.09); *A63F 13/26* (2014.09); *A63F 13/327* (2014.09); *A63F 13/335* (2014.09); *A63F 13/34* (2014.09); *A63F 13/355* (2014.09); *A63F 13/48* (2014.09); *A63F 13/50* (2014.09); *A63F 13/60* (2014.09); *A63F 13/792* (2014.09); *A63F 13/92* (2014.09); *G06F 9/45533* (2013.01);
(Continued)

(58) Field of Classification Search
None
See application file for complete search history.

(56) References Cited

U.S. PATENT DOCUMENTS 6,377,257 B1 4/2002 Borrel et al.
7,203,944 B1 * 4/2007 van Rietschote ... G06F 9/45533
718/1
(Continued)

FOREIGN PATENT DOCUMENTS

| CN | 101802789 | 8/2010 |
|---|---|---|
| WO | WO2007018880 | 2/2007 |
| WO | WO2010078539 | 7/2010 |

OTHER PUBLICATIONS

Lagar-Cavilla et al.; "SnowFlock: Virtual Machine Cloning as a First-Class Cloud Primitive;" ACM Transactions on Computer Systems (TOCS): vol. 29 Issue 1, Article 2, 45 pages, Feb. 2011.*
(Continued)

*Primary Examiner* — Edward Martello

(57) ABSTRACT

A method for network cloud resource generation, including creating a template virtual machine. The method includes creating an instantiation of a virtual machine for an end user by cloning the template, and loading an application executed by the virtual machine. The method includes accessing first information associated with the end user, and loading the first information in an instantiation of the application.

23 Claims, 47 Drawing Sheets

Related U.S. Application Data

(60) Provisional application No. 61/749,224, filed on Jan. 4, 2013, provisional application No. 61/749,231, filed on Jan. 4, 2013, provisional application No. 61/874,056, filed on Sep. 5, 2013, provisional application No. 61/874,078, filed on Sep. 5, 2013, provisional application No. 61/730,940, filed on Nov. 28, 2012, provisional application No. 61/730,939, filed on Nov. 28, 2012.

(51) Int. Cl.

| | | |
|---|---|---|
| *G09G 5/393* | (2006.01) | |
| *A63F 13/26* | (2014.01) | |
| *A63F 13/2145* | (2014.01) | |
| *A63F 13/34* | (2014.01) | |
| *A63F 13/92* | (2014.01) | |
| *A63F 13/48* | (2014.01) | |
| *A63F 13/327* | (2014.01) | |
| *A63F 13/335* | (2014.01) | |
| *A63F 13/792* | (2014.01) | |
| *G06T 1/20* | (2006.01) | |
| *A63F 13/355* | (2014.01) | |
| *A63F 13/50* | (2014.01) | |
| *A63F 13/60* | (2014.01) | |
| *G06F 3/14* | (2006.01) | |
| *G07F 17/32* | (2006.01) | |

(52) U.S. Cl.
CPC ............... G06T 1/20 (2013.01); H04L 47/70 (2013.01); *A63F 2300/1043* (2013.01); *A63F 2300/204* (2013.01); *A63F 2300/301* (2013.01); *A63F 2300/552* (2013.01); *G06F 3/14* (2013.01); *G06F 9/45504* (2013.01); *G06F 2009/45579* (2013.01); *G06T 2200/28* (2013.01); *G07F 17/32* (2013.01); *G09G 2360/12* (2013.01); *G09G 2370/022* (2013.01)

(56) References Cited

U.S. PATENT DOCUMENTS

| | | |
|---|---|---|
| 7,698,178 B2 | 4/2010 | Chu |
| 7,797,475 B2 | 9/2010 | Wilson et al. |
| 7,933,829 B2 | 4/2011 | Goldberg et al. |
| 8,135,626 B2 | 3/2012 | Das et al. |
| 8,217,951 B2 | 7/2012 | Jung |
| 8,406,992 B2 | 3/2013 | Laumeyer et al. |
| 8,464,250 B1 * | 6/2013 | Ansel .................. G06F 9/45504 709/220 |
| 8,572,407 B1 | 10/2013 | Chengottarasappan et al. |
| 8,910,201 B1 | 12/2014 | Zamiska et al. |
| 8,972,485 B1 | 3/2015 | French et al. |
| 9,197,642 B1 | 11/2015 | Urbach |
| 9,471,401 B2 | 10/2016 | Munshi et al. |
| 2002/0087403 A1 | 7/2002 | Meyers et al. |
| 2002/0170067 A1 | 11/2002 | Norstrom et al. |
| 2004/0044567 A1 | 3/2004 | Willis |
| 2005/0028200 A1 | 2/2005 | Sardera |
| 2005/0088445 A1 | 4/2005 | Gonzalez et al. |
| 2005/0218943 A1 | 10/2005 | Padhye et al. |
| 2005/0270298 A1 | 12/2005 | Thieret |
| 2006/0240894 A1 | 10/2006 | Andrews |
| 2006/0248256 A1 | 11/2006 | Liu et al. |
| 2007/0008324 A1 * | 1/2007 | Green ...................... G06T 1/00 345/501 |
| 2007/0061202 A1 | 3/2007 | Ellis et al. |
| 2007/0067535 A1 | 3/2007 | Liu |
| 2007/0155195 A1 | 7/2007 | He et al. |
| 2007/0195099 A1 | 8/2007 | Diard et al. |
| 2007/0253594 A1 | 11/2007 | Lu et al. |
| 2007/0294512 A1 | 12/2007 | Crutchfield et al. |
| 2007/0299682 A1 | 12/2007 | Roth et al. |
| 2008/0139306 A1 | 6/2008 | Lutnick et al. |
| 2008/0276220 A1 | 11/2008 | Munshi et al. |
| 2008/0307244 A1 | 12/2008 | Bertelsen et al. |
| 2009/0125226 A1 | 5/2009 | Laumeyer et al. |
| 2009/0144361 A1 | 6/2009 | Nobakht et al. |
| 2009/0248534 A1 | 10/2009 | Dasdan et al. |
| 2010/0110085 A1 | 5/2010 | Samuel et al. |
| 2010/0122286 A1 | 5/2010 | Begeja et al. |
| 2010/0125529 A1 | 5/2010 | Srinivasan et al. |
| 2010/0231044 A1 | 9/2010 | Tatsumi et al. |
| 2010/0332331 A1 | 12/2010 | Etchegoyen |
| 2011/0102443 A1 | 5/2011 | Dror et al. |
| 2011/0205680 A1 | 8/2011 | Kidd et al. |
| 2011/0218025 A1 | 9/2011 | Katz et al. |
| 2011/0289134 A1 | 11/2011 | de los Reyes et al. |
| 2011/0292057 A1 | 12/2011 | Schmit et al. |
| 2011/0296452 A1 | 12/2011 | Yu et al. |
| 2011/0304634 A1 | 12/2011 | Urbach |
| 2011/0314314 A1 | 12/2011 | Sengupta |
| 2012/0054744 A1 | 3/2012 | Singh et al. |
| 2012/0076197 A1 | 3/2012 | Byford et al. |
| 2012/0149464 A1 | 6/2012 | Bone et al. |
| 2012/0172088 A1 | 7/2012 | Kirch et al. |
| 2012/0220372 A1 | 8/2012 | Cheung et al. |
| 2012/0232988 A1 | 9/2012 | Yang et al. |
| 2012/0324358 A1 | 12/2012 | Jooste |
| 2013/0021353 A1 | 1/2013 | Drebin et al. |
| 2013/0055252 A1 * | 2/2013 | Lagar-Cavilla ....... G06F 9/5077 718/1 |
| 2013/0104044 A1 | 4/2013 | Gujarathi et al. |
| 2013/0148851 A1 | 6/2013 | Leung et al. |
| 2013/0158892 A1 | 6/2013 | Heron et al. |
| 2013/0290711 A1 | 10/2013 | Rajkumar et al. |
| 2014/0009576 A1 | 1/2014 | Hadzic et al. |
| 2015/0009222 A1 | 1/2015 | Diard et al. |
| 2015/0194136 A1 | 7/2015 | Diard et al. |
| 2016/0191627 A1 | 6/2016 | Huang et al. |

OTHER PUBLICATIONS

Antony Leather, Intel Xeon E5-2670 Review. Published on Mar. 6, 2012. http://www.bit-tech.net/hardware/cpus/2012/03/06/intel-xeon-e5-2670-review/1.

Ryan Shrout Date on Jun. 20, 2012. Galaxy Ge Force GT 640 GC 1GB DDR3 Review—GK107 is no GK104. http://www.pcper.com/reviews/Graphics-Cards/Galaxy-Ge Force-GT-640-GC-1 GB-DDR3-Review-GK 107-no-GK104.

\* cited by examiner

GRID Board Block Diagram

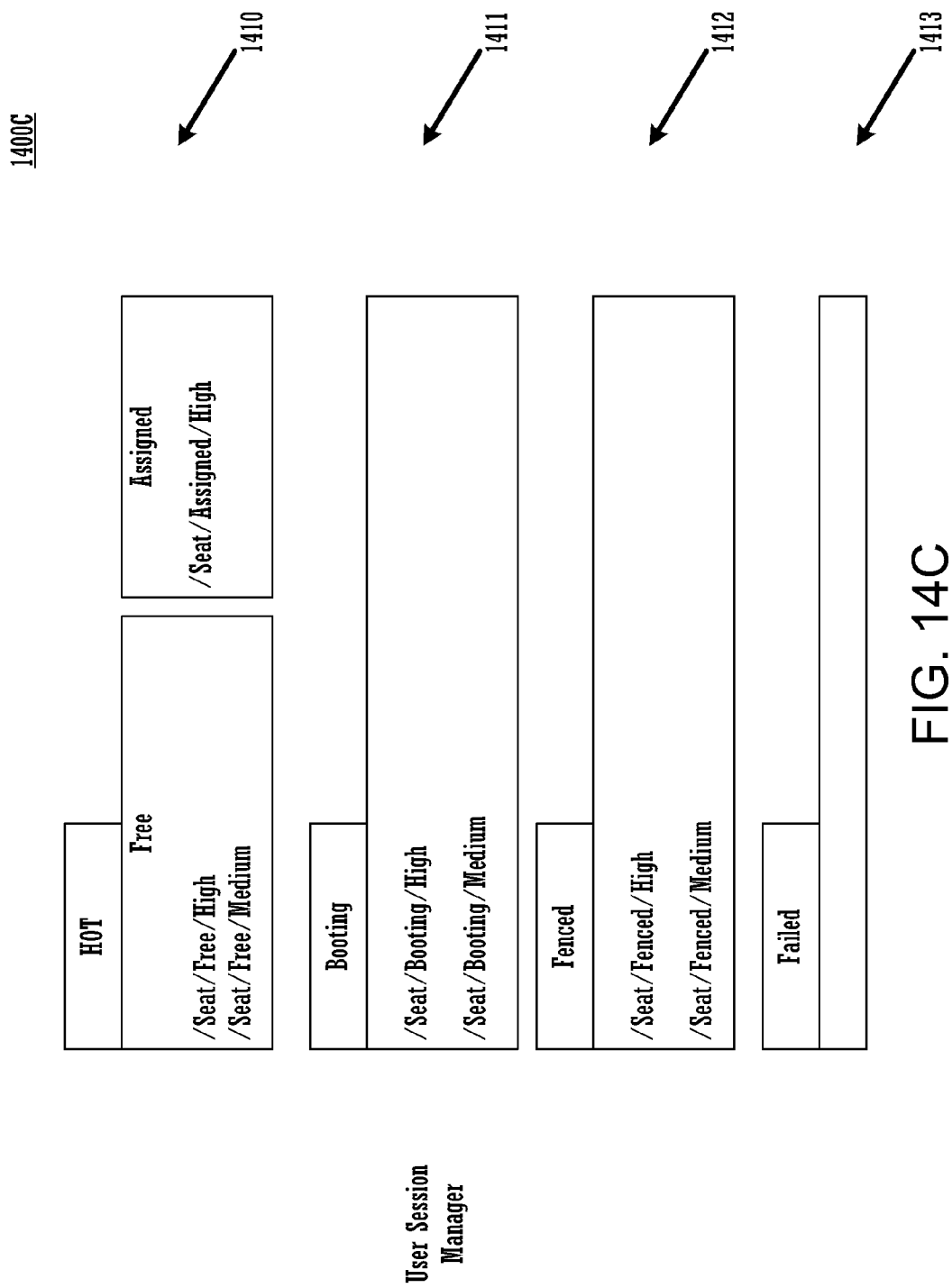

METHOD AND SYSTEM FOR FAST CLONING OF VIRTUAL MACHINES

CROSS-REFERENCE TO RELATED APPLICATIONS

The present application is a continuation of and claims priority to and the benefit of the commonly owned, patent application, U.S. Ser. No. 14/092,872, entitled "METHOD AND SYSTEM FOR CLOUD BASED VIRTUALIZED GRAPHICS PROCESSING FOR REMOTE DISPLAYS," with filing date Nov. 27, 2013, which is herein incorporated by reference in its entirety.

The present application claims priority to and the benefit of the commonly owned, provisional patent application, U.S. Ser. No. 61/730,940, entitled "CLOUD BASED VIRTUALZIED GRAPHICS PROCESSING FOR REMOTE DISPLAYS," with filing date Nov. 28, 2012, which is herein incorporated by reference in its entirety.

The present application claims priority to and the benefit of the commonly owned, provisional patent application, U.S. Ser. No. 61/730,939, entitled "CLOUD BASED VIRTUALZIED GRAPHICS PROCESSING FOR REMOTE DISPLAYS," with filing date Nov. 28, 2012, which is herein incorporated by reference in its entirety.

The present application claims priority to and the benefit of the commonly owned, provisional patent application, U.S. Ser. No. 61/749,224, entitled "NETWORK-ATTACHED GPU DEVICE," with filing date Jan. 4, 2013, which is herein incorporated by reference in its entirety.

The present application claims priority to and the benefit of the commonly owned, provisional patent application, U.S. Ser. No. 61/749,231, entitled "THOR SYSTEM ARCHITECTURE," with filing date Jan. 4, 2013, which is herein incorporated by reference in its entirety.

The present application claims priority to and the benefit of the commonly owned, provisional patent application, U.S. Ser. No. 61/874,056, entitled "THOR SYSTEM ARCHITECTURE," with filing date Sep. 5, 2013, which is herein incorporated by reference in its entirety.

The present application claims priority to and the benefit of the commonly owned, provisional patent application, U.S. Ser. No. 61/874,078, entitled "NETWORK-ATTACHED GPU DEVICE," with filing date Sep. 5, 2013, which is herein incorporated by reference in its entirety.

The present application is related to copending U.S. patent application Ser. No. 13/727,357, "VIRTUALIZED GRAPHICS PROCESSING FOR REMOTE DISPLAY," filed on Dec. 26, 2012, which is incorporated herein by reference for all purposes.

BACKGROUND

Historically, an application such as a video game was executed (played) using a personal computer (PC) or using a console attached to a television. A user purchased or rented a game, which was loaded onto the PC or inserted into the game console and then played in a well-known manner.

More recently, online gaming has become popular. An online game is played over a network such as the Internet. The game is loaded onto a user's device while other software needed to play the game resides on a server that is accessed via the network. Online gaming allows multiple users to compete against each other in the game environment provided by the software on the server.

In addition, mobile gaming has become popular. For example, a mobile device (e.g., phone) may provide a video game to a user that can be controlled through, for example, the touchscreen controls of the mobile phone. These controls are virtually created and displayed on the touchscreen. Because such mobile phones are not manufactured specifically for gaming, the processing power of such mobile phones is often too low for many games. Another problem with mobile phones is that they are often unable to support certain games because such games require a certain operating system environment to run. Further, the virtual buttons take up valuable screen space, thereby reducing the overall display of the game to the user.

Furthermore, virtual control buttons simulated through the touchscreen of the display provides a poor interface between the user and the game. It is difficult to gain a tactile interaction with a virtual button since the button is virtualized on a flat screen. Without a tactile reference, the only way to ensure that the virtual button is being engaged is to physically look at the finger and the virtual button simultaneously. This may take the eye of the gamer away from the screen at a crucial point in a game. Also, the buttons are limited to the front surface of the mobile device. Since the buttons are virtually created, these buttons can only be presented on the touch screen display. Competition for screen space may cause the number of buttons to be reduced, or to be rendered so small that they are difficult to use.

SUMMARY

In embodiments of the present invention, an apparatus for providing graphics processing is described. The apparatus includes a dual central processing unit (CPU) socket architecture comprising a first CPU socket and a second CPU socket. The apparatus includes a plurality of graphics processing unit (GPU) boards providing a plurality of GPU processors coupled to the first CPU socket and the second CPU socket, wherein each GPU board comprises two or more of the plurality of GPU processors. The apparatus includes a communication interface coupling the first CPU socket to a first subset of one or more GPU boards and the second CPU socket to a second subset of one or more GPU boards. In another embodiment, a network attached GPU device is described. The network attached GPU device includes a plurality of processing boards providing a plurality of virtual CPU and GPU processors. Each of the processing boards includes a dual CPU socket architecture comprising a first CPU socket and a second CPU socket. Each processing board includes a plurality of GPU boards providing a plurality of GPU processors coupled to the first CPU socket and the second CPU socket, wherein each GPU board comprises two or more of the plurality of GPU processors. Each processing board includes a first plurality of communication bridges each coupling a corresponding GPU board to said the CPU socket and the second CPU socket. Each processing board includes a communication interface coupling the first CPU socket to a first subset of one or more GPU boards and the second CPU socket to a second subset of one or more GPU boards.

In embodiments of the present invention, a computer implemented method for switching video streams delivered to a remote display is disclosed. In other embodiments, a non-transitory computer readable medium is disclosed having computer-executable instructions for causing a computer system to perform a method for switching video streams delivered to a remote display. In still other embodiments, a computer system is disclosed comprising a processor and memory coupled to the processor and having stored therein instructions that, if executed by the computer system, cause the computer system to execute a method for switching video streams delivered to a remote display. The method includes initializing an instantiation of an application. The method includes performing graphics rendering on a plurality of frames to generate a first video stream through execution of the application, wherein the first video stream comprises the plurality of frames. The method includes sequentially loading the plurality of frames into one or more frame buffers. The method includes determining when a first bitmap of a frame is loaded into a corresponding frame buffer matches an application signature comprising a derivative of a master bitmap associated with a keyframe of the first video stream.

In another embodiment, a system for switching video streams delivered to a remote display is disclosed. The system includes a processor for initializing an instantiation of an application. The system includes a graphics renderer for performing graphics rendering on a plurality of frames to generate a first video stream through execution of the application, wherein the first video stream comprises the plurality of frames. The system includes a frame buffer for receiving in sequence a plurality of frames associated with the first video stream. The system includes a comparator configured for determining when a first bitmap of a frame is loaded into a corresponding frame buffer matches an application signature comprising a derivative of a master bitmap associated with a keyframe of the first video stream.

In embodiments of the present invention, a computer implemented method for network cloud resource generation. The method includes creating a template virtual machine in a cloud based system. The method includes creating an instantiation of a virtual machine for an end user by cloning the template. The method includes loading an application executed by the virtual machine. The method includes accessing first information associated with the end user. The method includes loading the first information in an instantiation of said application.

In embodiments of the present invention, a computer implemented method of allocation is described. In other embodiments, a non-transitory computer readable medium is disclosed having computer-executable instructions for causing a computer system to perform a method for allocation is described. In still other a computer system is disclosed comprising a processor and memory coupled to the processor and having stored therein instructions that, if executed by the computer system, cause the computer system to execute a method for allocation. The method includes receiving a request for executing an application from a client device associated with an end user. The method includes determining a first performance class for the application. The method includes determining a first virtual machine of the first performance class that is available. The method includes assigning the first virtual machine for purposes of executing the application in association with the client device.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIGS. 14A-H are diagrams illustrating a system and method for dynamically allocating and assigning game seats in a cloud based gaming/application environment, in embodiments of the present invention.

DETAILED DESCRIPTION OF THE INVENTION

Figure 1:
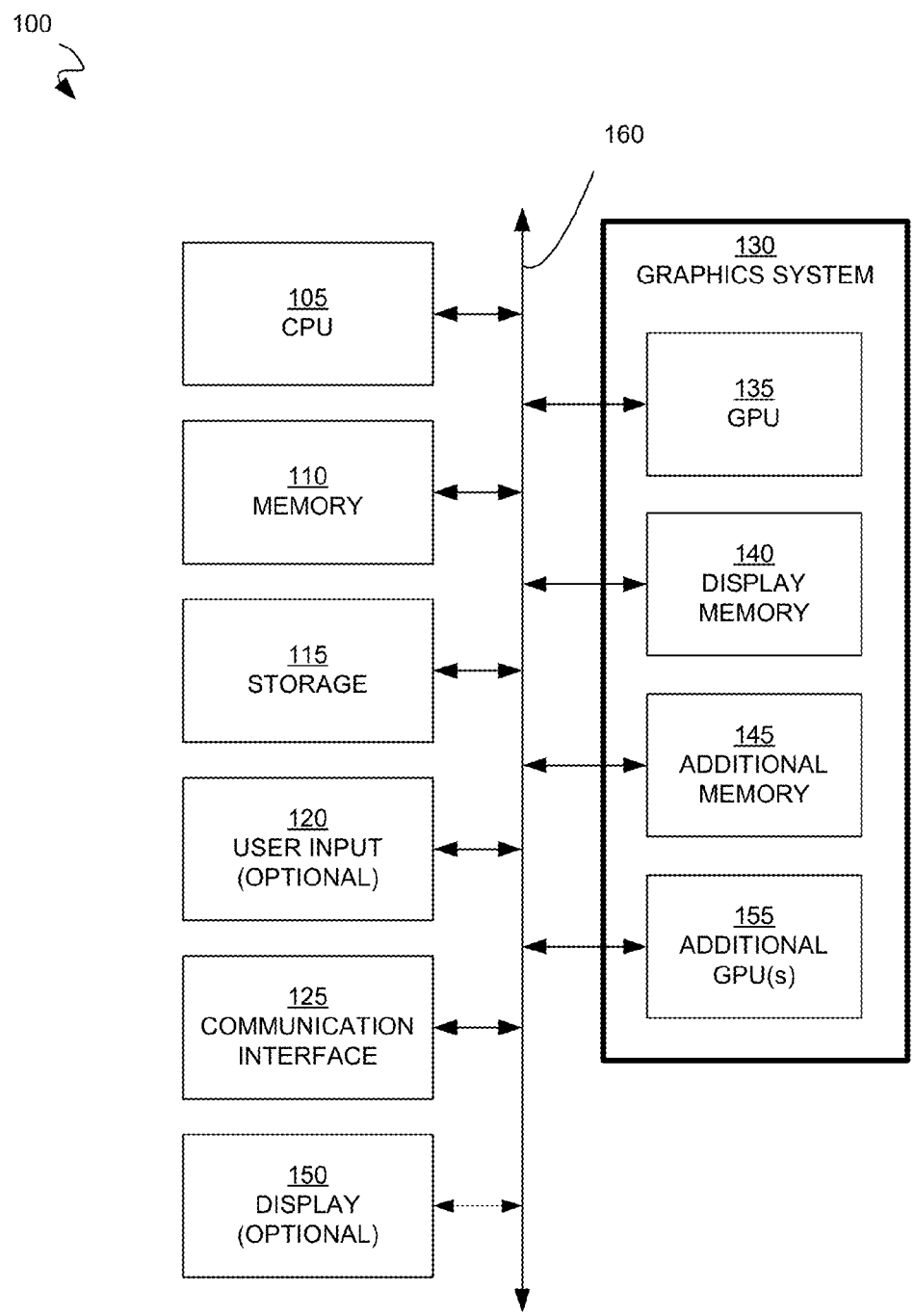
FIG. 1 depicts a block diagram of an exemplary computer system suitable for implementing embodiments according to the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing computing terms such as "executing," "receiving," "connecting," "navigating," "facilitating," "installing," or the like, refer to actions and processes of a computer system or similar electronic computing device or processor (e.g., in flow charts 8A, 10A-B, 12, 15, 16, and 17A-F of the present application). The computer system or similar electronic computing device manipulates and transforms data represented as physical (electronic) quantities within the computer system memories, registers or other such information storage, transmission or display devices.

FIGS. 8A, 10A-B, 12, 15, 16, and 17A-F are flowcharts of examples of computer-implemented methods for providing cloud based virtualized graphics processing for remote displays, according to embodiments of the present invention. Although specific steps are disclosed in the flowcharts, such steps are exemplary. That is, embodiments of the present invention are well-suited to performing various other steps or variations of the steps recited in the flowcharts.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 105 and a system memory 110.

It is appreciated that computer system 100 described herein illustrates an exemplary configuration of an operational platform upon which embodiments may be implemented to advantage. Nevertheless, other computer system with differing configurations can also be used in place of computer system 100 within the scope of the present invention. That is, computer system 100 can include elements other than those described in conjunction with FIG. 1.

Moreover, embodiments may be practiced on any system which can be configured to enable it, not just computer systems like computer system 100. It is understood that embodiments can be practiced on many different types of computer systems 100. System 100 can be implemented as, for example, a desktop computer system or server computer system having a power general-purpose CPUs coupled to a dedicated graphics rendering GPU. In such an embodiment, components can be included that add peripheral buses, specialized audio/video components, I/O devices, and the like. Similarly system 100 can be implemented as a handheld device (e.g., cell phone, etc.) or a set-top video game console device, such as, for example Xbox®, available from Microsoft corporation of Redmond, Wash., or the PlayStation3®, available from Sony Computer Entertainment Corporation of Tokyo, Japan. System 100 can also be implemented as a "system on a chip", where the electronics (e.g., the components 105, 110, 115, 120, 125, 130, 150, and the like) of a computing device are wholly contained within a single integrated circuit die. Examples include a hand-held instrument with a display, a car navigation system, a portable entertainment system, and the like.

In the example of FIG. 1, the computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones.

The communication or network interface 125 allows the computer system 100 to communicate with other computer systems via an electronic communications network, including wired and/or wireless communication and including the Internet. The optional display device 150 may be any device capable of displaying visual information in response to a signal from the computer system 100. The components of the computer system 100, including the CPU 105, memory 110, data storage 115, user input devices 120, communication interface 125, and the display device 150, may be coupled via one or more data buses 160.

In the embodiment of FIG. 1, a graphics system 130 may be coupled with the data bus 160 and the components of the computer system 100. The graphics system 130 may include a physical graphics processing unit (GPU) 135 and graphics memory. The GPU 135 generates pixel data for output images from rendering commands. The physical GPU 135 can be configured as multiple virtual GPUs that may be used in parallel (concurrently) by a number of applications executing in parallel.

Graphics memory may include a display memory 140 (e.g., a frame buffer) used for storing pixel data for each pixel of an output image. In another embodiment, the display memory 140 and/or additional memory 145 may be part of the memory 110 and may be shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 may be adapted to operate in parallel with the GPU 135. Each additional GPU 155 generates pixel data for output images from rendering commands. Each additional physical GPU 155 can be configured as multiple virtual GPUs that may be used in parallel (concurrently) by a number of applications executing in parallel. Each additional GPU 155 can operate in conjunction with the GPU 135 to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately coupled with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

Figure 2:
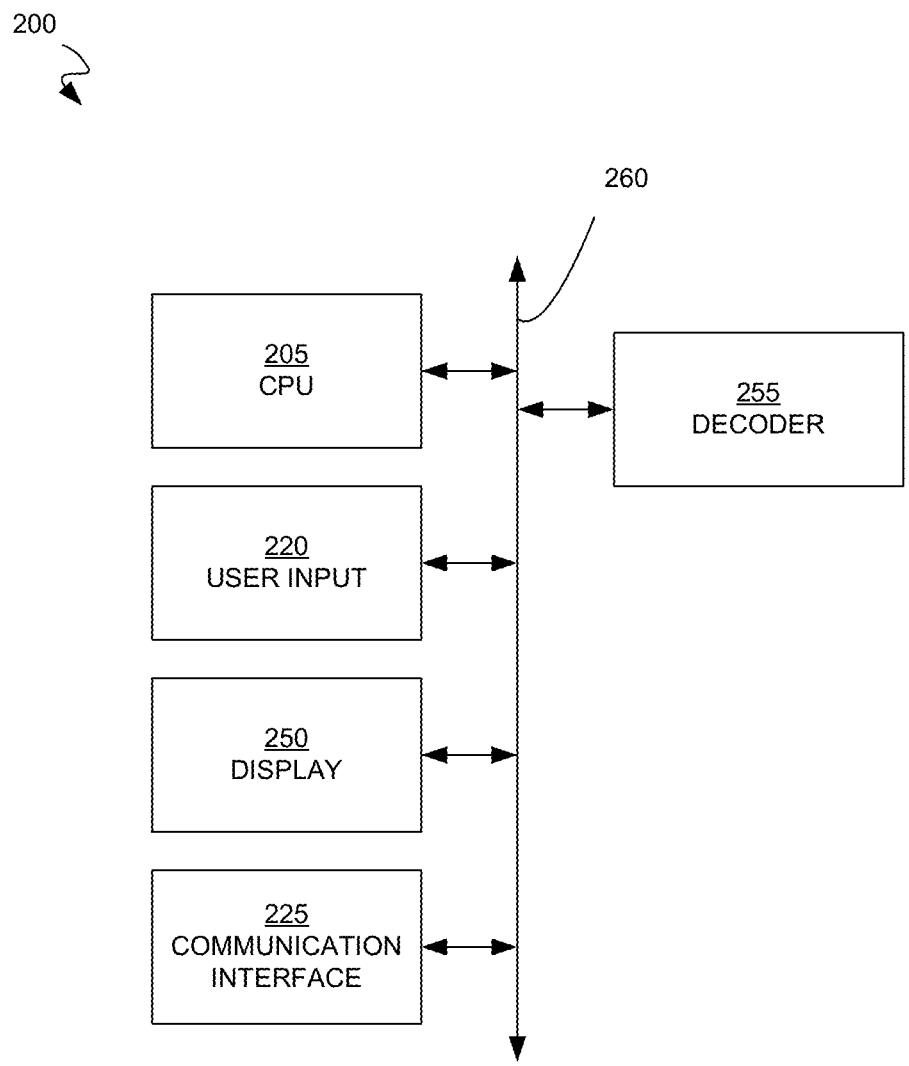
FIG. 2 is a block diagram of an example of a client device capable of implementing embodiments according to the present invention.

FIG. 2 is a block diagram of an example of an end user or client device 200 capable of implementing embodiments according to the present invention. In the example of FIG. 2, the client device 200 includes a CPU 205 for running software applications and optionally an operating system. The user input 220 includes devices that communicate user inputs from one or more users and may include keyboards, mice, joysticks, touch screens, and/or microphones.

The communication interface 225 allows the client device 200 to communicate with other computer systems (e.g., the computer system 100 of FIG. 1) via an electronic communications network, including wired and/or wireless communication and including the Internet. The decoder 255 may be any device capable of decoding (decompressing) data that may be encoded (compressed). For example, the decoder 255 may be an H.264 decoder. The display device 250 may be any device capable of displaying visual information, including information received from the decoder 255. The display device 250 may be used to display visual information generated at least in part by the client device 200. However, the display device 250 may be used to display visual information received from the computer system 100. The components of the client device 200 may be coupled via one or more data buses 260. Further, the components may or may not be physically included inside the housing of the client device 200. For example, the display 250 may be a monitor that the client device 200 communicates with either through cable or wirelessly.

Relative to the computer system 100, the client device 200 in the example of FIG. 2 may have fewer components and less functionality and, as such, may be referred to as a thin client. In general, the client device 200 may be any type of device that has display capability, the capability to decode (decompress) data, and the capability to receive inputs from a user and send such inputs to the computer system 100. However, the client device 200 may have additional capabilities beyond those just mentioned. The client device 200 may be, for example, a personal computer, a tablet computer, a television, a hand-held gaming system, or the like.

Figure 3:
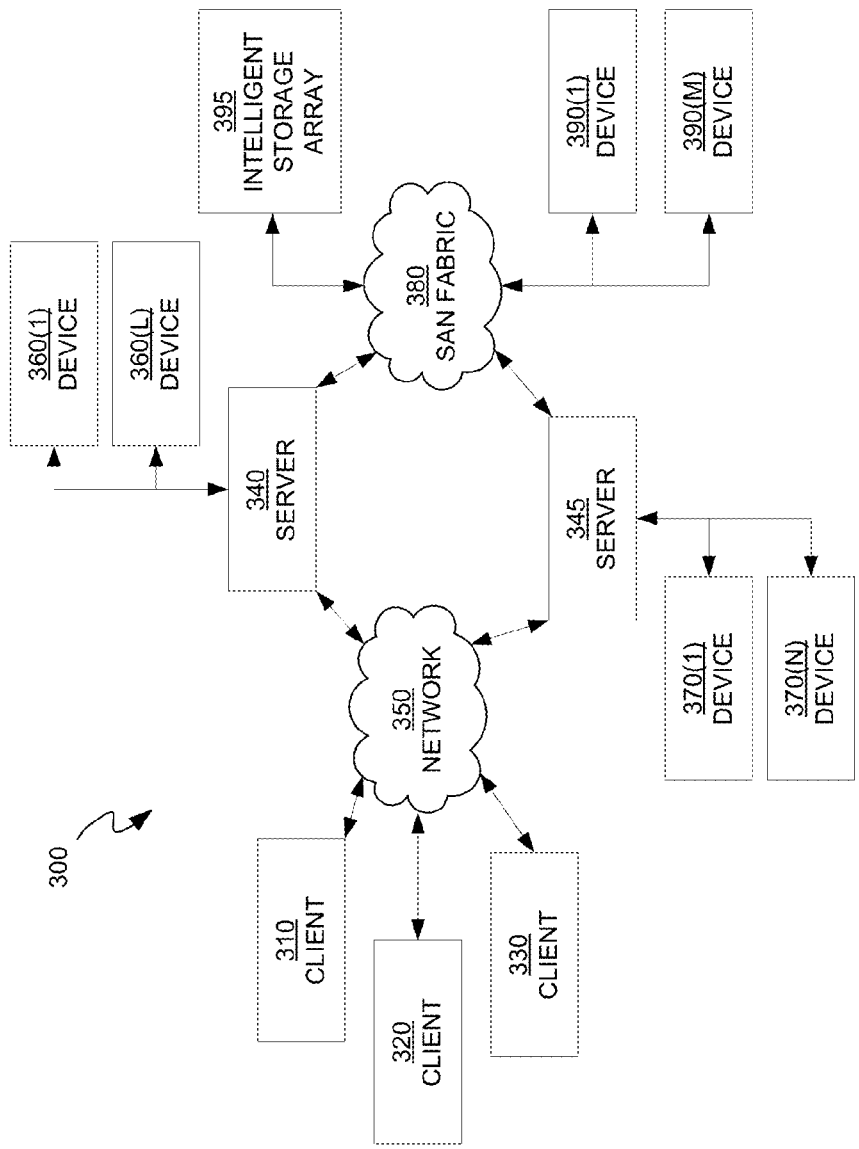
FIG. 3 is a block diagram of an example of a network architecture in which client systems and servers may be coupled to a network, according to embodiments of the present invention.

FIG. 3 is a block diagram of an example of a network architecture 300 in which client systems 310, 320, and 330 and servers 340 and 345 may be coupled to a network 350. Client systems 310, 320, and 330 generally represent any type or form of computing device or system, such as computing system 110 of FIG. 1 and/or client device 200 of FIG. 2.

Similarly, servers 340 and 345 generally represent computing devices or systems, such as application servers, GPU servers, or database servers, configured to provide various database services and/or run certain software applications. Network 350 generally represents any telecommunication or computer network including, for example, an intranet, a wide area network (WAN), a local area network (LAN), a personal area network (PAN), or the Internet.

With reference to computing system 100 of FIG. 1, a communication interface, such as communication interface 125, may be used to provide connectivity between each client system 310, 320, and 330 and network 350. Client systems 310, 320, and 330 may be able to access information on server 340 or 345 using, for example, a web browser or other client software. In that manner, client systems 310, 320, and 330 are configurable to access servers 340 and/or 345 that provide for graphics processing capabilities, thereby off-loading graphics processing to the back end servers 340 and/or 345 for purposes of display at the front end client systems 310, 320, and 330. Further, such software may allow client systems 310, 320, and 330 to access data hosted by server 340, server 345, storage devices 360(1)-(L), storage devices 370(1)-(N), storage devices 390(1)-(M), or intelligent storage array 395. Although FIG. 3 depicts the use of a network (such as the Internet) for exchanging data, the embodiments described herein are not limited to the internet or any particular network-based environment.

In one embodiment, all or a portion of one or more of the example embodiments disclosed herein are encoded as a computer program and loaded onto and executed by server 340, server 345, storage devices 360(1)-(L), storage devices 370(1)-(N), storage devices 390(1)-(M), intelligent storage array 395, or any combination thereof. All or a portion of one or more of the example embodiments disclosed herein may also be encoded as a computer program, stored in server 340, run by server 345, and distributed to client systems 310, 320, and 330 over network 350.

Figure 4A:
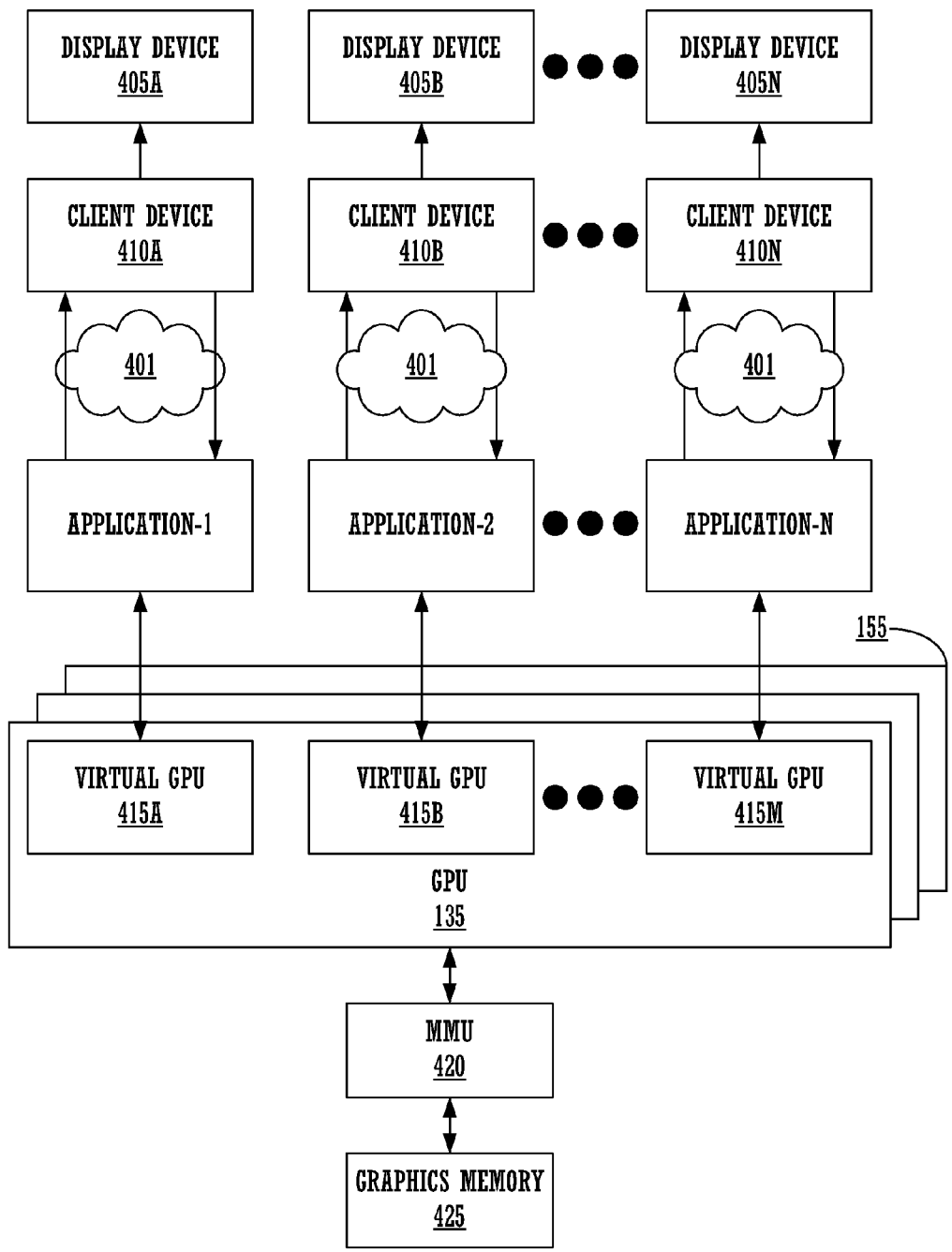
FIG. 4A illustrates a graphics system 400A configurable for implementing cloud based virtualized graphics processing for remote displays, in accordance with one embodiment of the present disclosure.

Methods and Systems for a GRID Architecture Providing Cloud Based Virtualized Graphics Processing for Remote Displays FIG. 4A illustrates a graphics system 400A configurable for implementing cloud based virtualized graphics processing for remote displays, in accordance with one embodiment of the present disclosure. As shown, the graphics processing system 400A includes a physical GPU 135 of FIG. 1, although system 400A can include additional physical GPUs 155 as described above.

According to embodiments of the present invention, the physical GPU 135 is configured for concurrent use by a number N of applications 1, 2, . . . , N. More specifically, the physical GPU 135 is configured as a number M of virtual GPUs 415A, 415B, . . . , 415M that are concurrently used by the applications 1, 2, . . . , N. Each of the additional GPUs 155 may be similarly configured as multiple virtual GPUs. In one embodiment, the GPU 135 and the additional GPUs 155 are coupled to a memory management unit 420 (MMU; e.g., an input/output MMU) that is in turn coupled to graphics memory, described in conjunction with FIG. 1.

In one embodiment, the applications 1, 2, . . . , N are video game applications; however, the invention is not so limited. That is, the applications 1, 2, . . . , N can be any type of application. For example, the application may provide financial services, computer aided design (CAD) services, etc. In still another example, the application may be a programming guide that provides, in table form, a list of the various programs that are available on different television channels in different time slots, and the client device may be a set top box (cable or satellite).

Figure 4B:
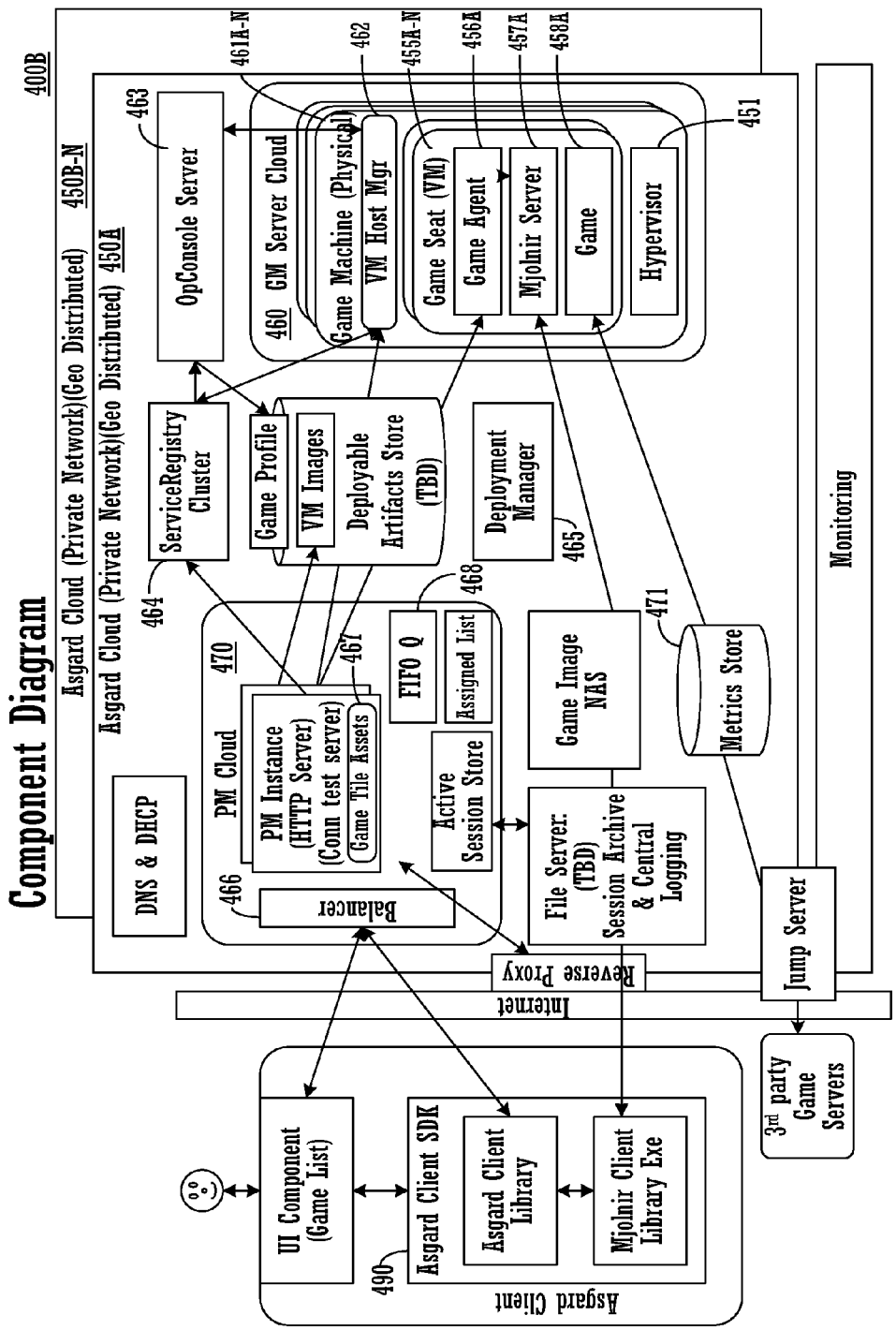
FIG. 4B is an illustration of an architecture 400B that is configured to implement a cloud based virtualized graphics processing for remote displays, in accordance with one embodiment of the present disclosure.

FIG. 4B is an illustration of an architecture 400B that is configured to implement a cloud based virtualized graphics processing for remote displays, in accordance with one embodiment of the present disclosure. The graphics architecture 400B provides network resources managed by one or more host operating systems, wherein the network resources (e.g., CPU, GPU, etc.) are virtualized and shared within one or more virtual machines (VMs) and external communication networks. In particular, a cloud system 450A-N is shown, wherein each of the cloud systems 450A-N work cooperatively to connect multiple computing resources together through a communication network. As such, the computing resources are distributed throughout the architecture 400B. In embodiments of the present invention, the cloud systems 450A-N provide complete, virtualized gaming systems that are also designed to provide high power graphics processing.

As an example, cloud system 450A provides distributed computing resources, and is representative of each of the cloud systems 450A-N that provide cloud based virtualized graphics processing for remote displays. In particular, cloud system 450A includes a Game Machine (GM) server cloud system 460, which comprises a plurality of physical servers or game machines 461A-N. The GM system 461A is described herein and is representative of each of the GMs 461A-N. In particular, the physical GM 461A provides a host system that supports a plurality of virtual machines. For implementing the virtual machines 455A-N within the GM 461A, a VM host manager 462 in conjunction with the hypervisor 451 include software, firmware or hardware that create, manages, and runs the virtual machines (also referred to as "game seats") 455A-N. Specifically, the VM host manager 462 interacts with a hypervisor 451 to allocate the game seats 455A-N within the GM system 461A. More particularly, the VM host manager is able to bind and link the physical resources (e.g., one or more CPU cores and the physical GPUs) that are allocated to a specific game seat (e.g., 455A).

The game seat (e.g., VM) 455A is representative of game seats 455A-N within the physical server or GM 461A. Each virtual game seat 455A operates within its own virtual environment that is run through a corresponding operating system, such as, a virtualized Windows® operating system. For example, the operating system gives the game seat 455A the ability to execute the gaming application 458A, turn it into a video stream, and send it out a proper port and channel to a receiver at the client server 490. The client server 490 includes any electronic device configured to communicate with the cloud system 450A-N for an instantiation of a virtual machine. For example, the client server 490 includes a thin client, dumb server, mobile device, laptop, personal computer, etc.

A game agent 456A instantiates the game seat 455A and helps with the management and coordination of the plurality of game seats within the cloud system 450A. For instance, game agent 456A along with all the other game agents work with a provision manager 471 of a provision manager cloud 470 in order to create, manage, and provision to end client systems 490 the necessary game seats within the cloud system 450A-N. For instance, provision manager 470 works with the client system 490 to provision a corresponding game seat (e.g., 455A). Further, provision manager includes information related to each of gaming applications (e.g., 458), which is included in the game title assets block 467. As such, the game agent 456A is able to receive information related to the gaming application 458 that is instantiated within the game seat 455A, such as, descriptive information, recommended configuration settings based on the capabilities of the game seat 455A, etc. A first-in-first-out (FIFO)

component 468 that orders the incoming requests for game seats. In one embodiment, the FIFO component handles requests in FIFO order.

A mjolnir server 457A provides the encoding and packetization of information. For instance, mjolnir server 457A is configured to encode and packetize graphics video data that is generated by the game seat (VM) 455A through the execution of a gaming application 458A. As shown, the instantiation of the gaming application 458A is provided from a metrics storage 471 that is coupled to a third party content provider that provides access to an instance of the gaming application 458A.

An OpConsole server 463 coordinates with the various VM host managers (e.g., 462) on the nodes of physical servers 461A-N. In particular, the OpConsole server 463 acts as a cluster manager for the cluster of servers or GMs 461A-N. For example, the OpConsole server 463 notifies the service registry 464 or seat registry which game seats are operational, which game seats are in use, which game seats are down, which game seats are queued up, which game seats are being reset, which game seats need to be serviced, etc.

In addition, the OpConsole server 463 interacts with the service registry 464 so that current status of the overall cluster of game seats is provided. The status of game seats is maintained in the service registry 464. In addition, the deployment manager 465, is configured to provide a notification service to each of the game seats. For instance, the deployment manager 465 is able to push information about and instantiations of new games, or information about new games, new software updates, new versions of software, etc. in that manner, the deployment manager 465 provides a scalable method for notifying each of the game agents and game seats of pertinent information.

The metrics store 471 is configured to collect data related to the operation of gaming applications within corresponding game seats. For instance, the metrics store 471 collects bit rates, quality of service (QoS), etc. The load balancer 466 balances the loads of connection request for game seats coming in from the client servers 490.

Figure 5A:
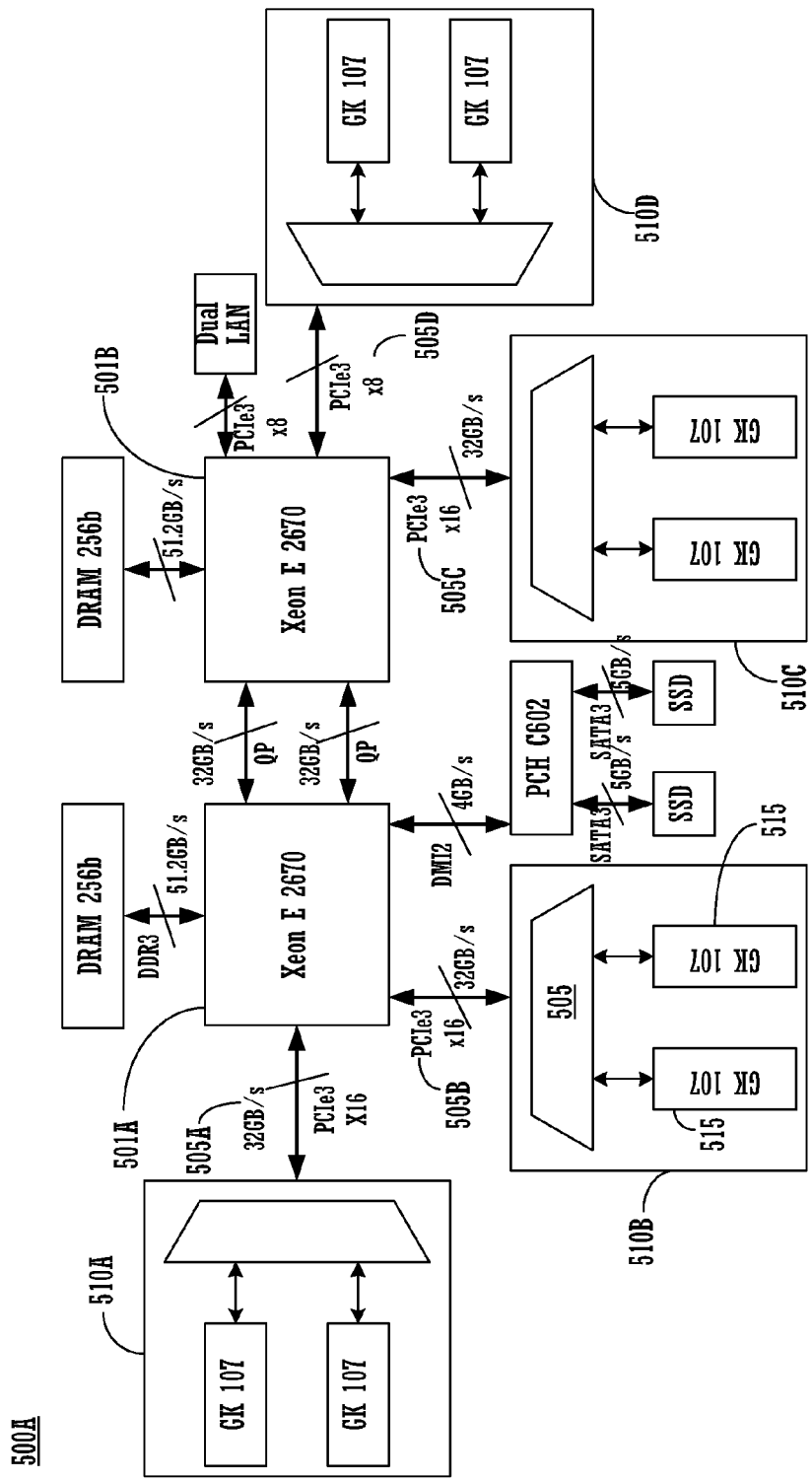
FIGS. 5A-B are illustrations of dual socket architectures configured with multiple graphics processor chipsets implemented to provide one or more network attached GPU devices, in accordance with one embodiment of the present disclosure.

Visual Computing Appliance (VCA) for Implementing Cloud Based Virtualized Graphics Processing for Remote Displays FIG. 5A is an illustration of a symmetrical GRID system architecture 500A that provides graphics processing, in accordance with one embodiment of the present disclosure. For example, the architecture is implemented as a circuit board holding one or more integrated chips that are communicatively coupled together to provide graphics processing capabilities. The GRID architecture 500A is implemented within the cloud based architecture 400B in order to implement cloud based virtualized graphics processing for remote displays, in one embodiment.

The GRID system architecture 500A includes a dual socket architecture that includes a first CPU socket 501A and a second CPU socket 501B. In one implementation, each CPU socket is configured to provide electrical connections between a microprocessor providing CPU capabilities and an underlying board. As shown in FIG. 5A, a multi-core processor is communicatively coupled to each of the first and second CPU sockets. For instance, a integrated circuit or "chipset" includes multiple core processors that combined form hardware components of a computing system that is configured to execute instructions of a computer programs as implemented through operations of an operating system. In one embodiment, the multi-core processor comprises a XEON E 2670 processor. As shown in FIG. 5A, a XEON E 2670 processor is coupled to the first socket 501A and a XEON E 2670 processor is also coupled to the second socket 501B.

In one embodiment, the dual socket architecture 500A is configured as a Sandy bridge processor architecture including multi-core processors. For instance, an Intel® QuickPath Interconnect (QPI) link is provided between the first and second CPU sockets in order to provide a point-to-point front-side bus interface between the two sockets and the CPU processors coupled to the sockets. In that manner, the two CPU processors within the first CPU socket 501A and the second CPU socket 501B can operate as one machine under a single operating system. That is, a single operating system manages the CPU multi-core processors that are coupled to the first CPU socket 501A and second CPU socket 501B as supported by the QPI link.

In addition, the dual socket architecture 500A is configured with multiple graphics processors (e.g., integrated circuits, chipsets, etc.). Specifically, the architecture 500A includes a plurality of GPU boards 510A, 510B, . . . , 510N providing a plurality of GPU processors and/or chipsets, wherein the GPU processors are coupled to the first CPU socket and to the second CPU socket. Each of the GPU boards are coupled to a corresponding CPU socket through a communication bus interface that couples the first CPU socket 501A to a first subset of one or more GPU boards, and the second CPU socket 501B to a second subset of one or more GPU boards. In one embodiment, the communication bus interface includes communication bridge 505A-N, such as, a PCI Express (PCIe) bridge in one embodiment. In that configuration, a PCIe controller acts to facilitate communication between a corresponding GPU board and the CPU socket over a corresponding PCIe bridge. As such, the dual socket architecture 500A includes a plurality of communication bridges, wherein each communication bridge communicatively couples a corresponding GPU board to a corresponding first or second CPU socket. For example, as shown in FIG. 5A, bridges 505A-D couples each of the GPU boards 510A-D to either the first CPU socket 501A or second CPU socket 501B.

In one embodiment, the plurality of GPU boards are symmetrically distributed across the dual CPU socket architecture 500A. For instance, an equal number of GPU boards are connected to or hang off of each CPU socket. As shown in FIG. 5A, the dual CPU socket architecture 500A includes four GPU boards that are coupled to the first CPU socket 501A and second CPU socket 501B. More specifically, in a four GPU board configuration, a first GPU board 510A and a second GPU board 510B are each coupled to the first CPU socket 501A, and a third GPU board 510C and a fourth GPU board 510D are each coupled to the second CPU socket 501B.

Each of the GPU boards 510A-D are configured identically, in one embodiment. In other embodiments, the GPU boards 510A-D may be configured differently with varying numbers of GPU processors included within each GPU board. As shown, each of the GPU boards 510A-D includes two or more of the plurality of GPU processors. As shown in FIG. 5A, the GPU boards 510A-D each includes two GPU processors, though a higher number of GPU processors are used in other embodiments. For purposes of illustration, the GPU board 510A-D is outfitted with an Nvidia® GK107 graphics processor chip. Each GPU board 510A-D includes a bridge splitter that is coupled to a corresponding communication bridge. The bridge splitter directs communication originating from and directed the proper GPU board.

Figure 5B:
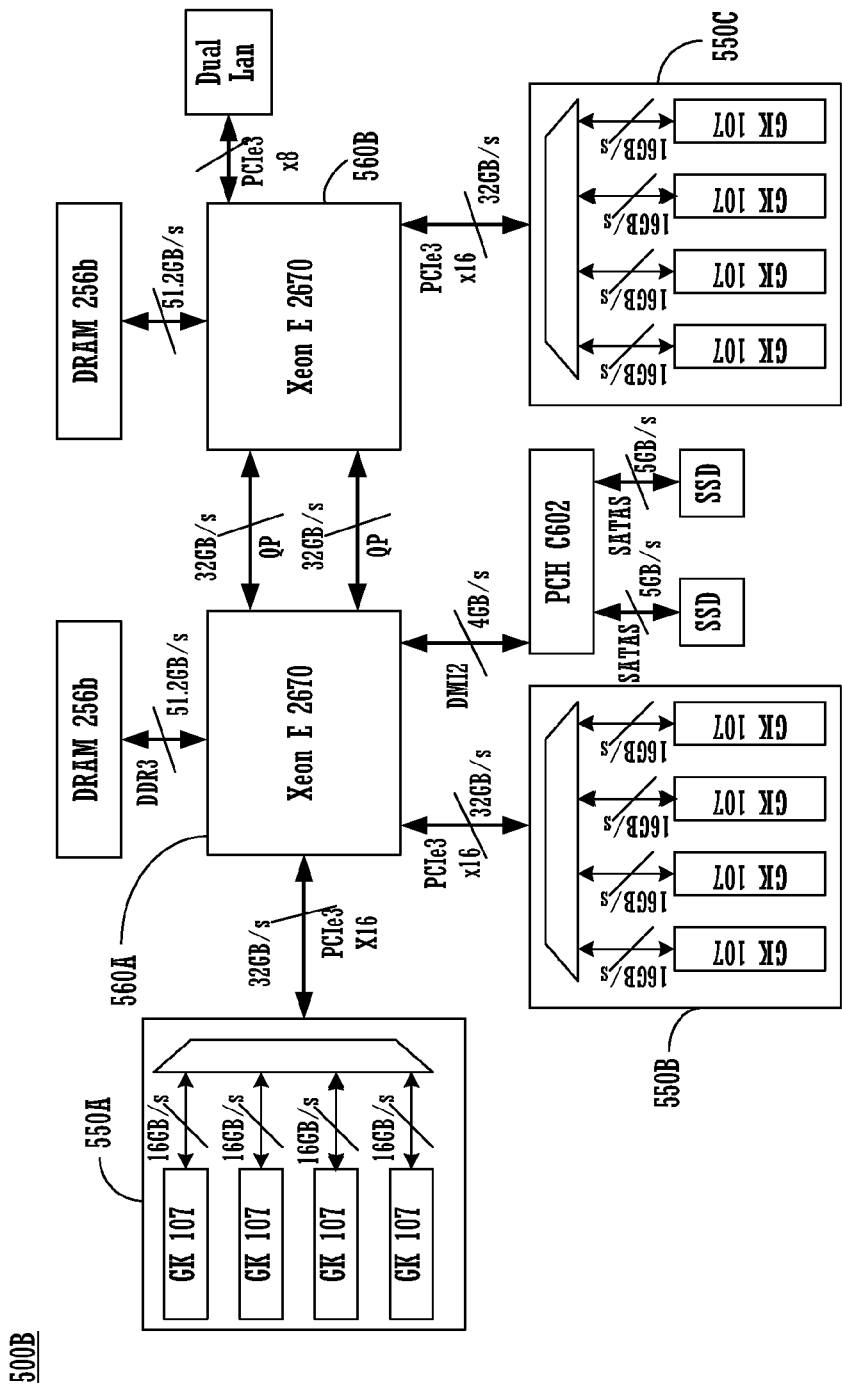

FIG. 5B is an illustration of an asymmetrical GRID system architecture 500B that provides graphics processing, in accordance with one embodiment of the present disclosure. That is, the plurality of GPU boards 550A-C are asymmetrically distributed across a dual socket architecture 500B. In general, the dual socket GRID system architecture 500B is configured similarly as the GRID system architecture 500A, including two CPU sockets 560A and 560B that are each communicatively coupled to one or more GPU boards.

For instance, the asymmetric configuration includes unequal numbers of GPU boards connected to each CPU socket 560A or 560B. As shown in FIG. 5B, the dual CPU socket architecture 500B includes three GPU boards that are coupled to the first CPU socket 560A and second CPU socket 560B. More specifically, in a three GPU board configuration, a first GPU board 550A and a second GPU board 550B are each coupled to the first CPU socket 560A. On the other hand, only one GPU board 550C is coupled to the second CPU socket 560B.

Each of the GPU boards 550A-C are configured identically, in one embodiment. In other embodiments, the GPU boards 510 may be configured differently with varying numbers of GPU processors included within each GPU board. As shown, each of the GPU boards 550A-C includes two or more of the plurality of GPU processors. As shown in FIG. 5B, the GPU boards 550A-C each includes four GPU processors, though a different number of GPU processors are used in other embodiments. For purposes of illustration, the GPU board 550A-C is outfitted with an Nvidia® GK107 graphics processor chip.

In one embodiment, the dual CPU socket architecture (e.g., 500A) and the plurality of GPU broads support a plurality of virtual machines (e.g., through a could based structure), each of which include portions of one or more CPU cores and one or more GPU processors. In one further embodiment, the dual socket architecture 500A is configured in such a way that one GPU processor supports one instantiation of a virtual machine as populated by the dual socket architecture 500A. In another embodiment, a plurality of virtualized GPU processors is supported by the plurality of physical GPU processors, wherein a virtualized GPU supports a virtual machine. In that case, a physical GPU, or portions of a physical GPU may support any number of virtual machines.

In one embodiment, the dual CPU socket architecture and the plurality of GPU boards are implemented within a pseudo virtual machine system operating under a single operating system. That is, a software layer enables the use of a single operating system to stream multiple applications, such as, gaming applications. That is, the software layer (e.g., middleware) instantiates a pseudo virtual machine that may support multiple end clients, wherein the pseudo virtual machine runs and/or executes multiple applications for one or more end users.

In one embodiment, the NUMI pinning software configuration for providing the proper CPU to GPU ratio and allocation of hardware resources is described as follows:

CPUPinning=["0, 1, 2, 3, 4, 5, 6, 7", "8, 9, 10, 11, 12, 13, 14, 15", "8, 9, 10, 11, 12, 13, 14, 15", "16, 17, 18, 19, 20, 21, 22, 23", "24, 25, 26, 27, 28, 29, 30, 31", "24, 25, 26, 27, 28, 29, 30, 31"]}

In another embodiment, the NUMI pinning configuration for implementing the proper CPU to GPU ratio is described as follows:
CPUPinning=["0, 1, 2, 3, 4, 5, 6, 7", "0, 1, 2, 3, 4, 5, 6, 7", "8, 9, 10, 11, 12, 13, 14, 15", "8, 9, 10, 11, 12, 13, 14, 15", "16, 17, 18, 19, 20, 21, 22, 23", "16, 17, 18, 19, 20, 21, 22, 23", "24, 25, 26, 27, 28, 29, 30, 31", "24, 25, 26, 27, 28, 29, 30, 31"]}

Figure 6:
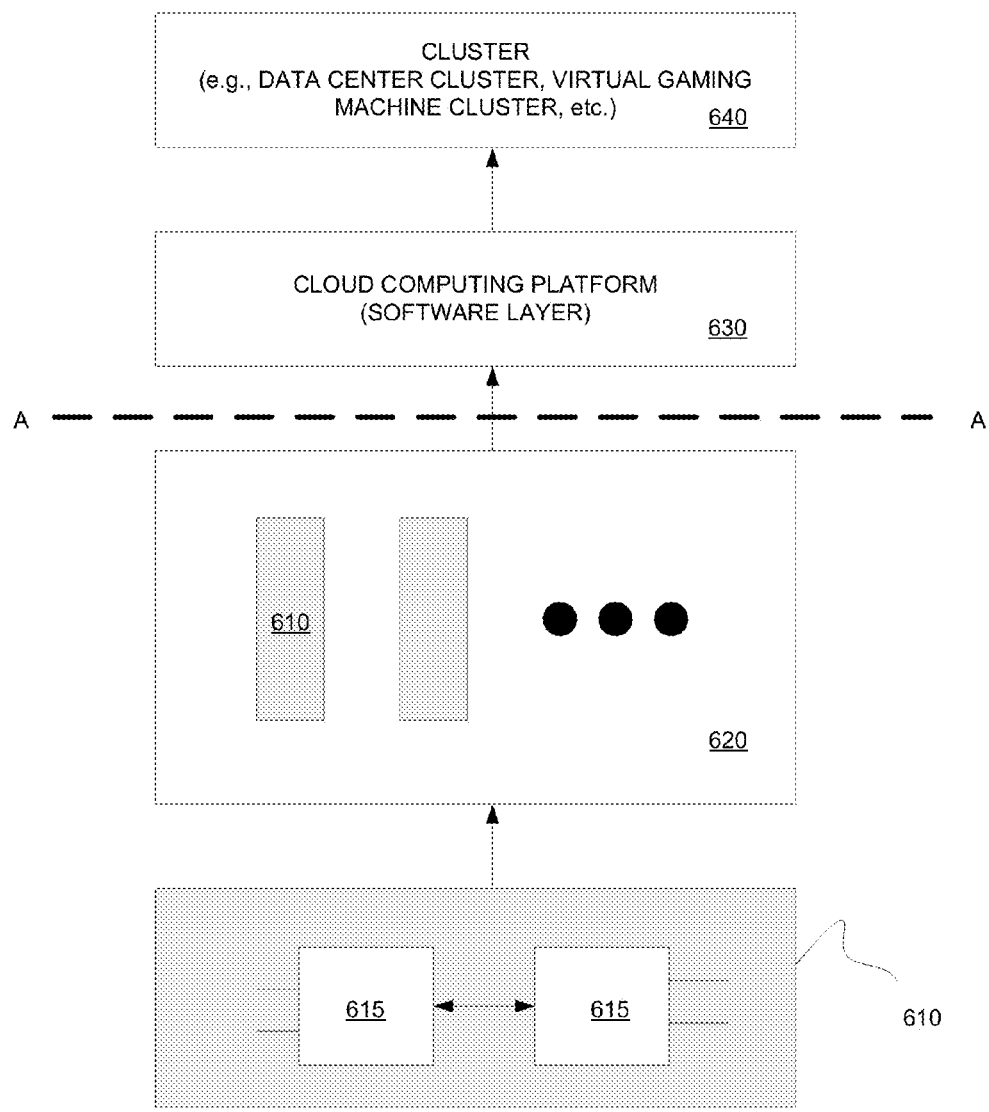
FIG. 6 is an illustration of the implementation of multiple GPU capable processing boards to provide cloud based virtualized graphics processing for remote displays.

FIG. 6 is an illustration of the implementation of multiple GPU capable processing boards to provide cloud based virtualized graphics processing for remote displays. More specifically, FIG. 6 illustrates a network attached GPU appliance 620 that provides cloud based graphics processing to remote displays. In one embodiment, the GPU appliance 620 provides graphics processing in a PC emulated environment, and as such the GPU appliance 620 acts a visual computing appliance (VCA).

As shown in FIG. 6, the VCA 620 includes one or more GRID system architectures or processing boards 610. For instance, the GRID architectures 610 are similar in function configuration as the GRID system architectures 500A and 500B, generally described in FIGS. 5A-B, respectively. Specifically, the GRID architecture 610 includes a dual CPU sockets 615. In one implementation, each CPU socket is configured to provide electrical connections between a microprocessor providing CPU capabilities and an underlying board. A multi-core processor is communicatively coupled to each of the CPU sockets, in one embodiment. In addition, the dual socket GRID architecture 610 includes multiple GPU boards including one or more graphics processors (not shown) providing a plurality of GPU processors and/or chipsets coupled to the CPU sockets 615. That is, each of the GPU boards are coupled to a corresponding CPU socket through a communication bus interface.

So far, the VCA 620 and the GPU architecture 610 are implemented below line A-A, which is intended to separate the hardware from the software layer when implementing cloud based virtualized graphics processing for remote displays. As such, above line A-A, a cloud computing platform 630 is shown that creates and manages a plurality of virtual machines, each of which is designed to provide high power graphics processing. The cloud computing platform 630 provides the same services and features as the cloud systems 450A-N of FIG. 4B. In one embodiment, the virtual machines created and managed at the cloud computing platform layer 630 act as PC emulators which take instruction commands from end user client devices (e.g., thin clients), processes the instructions, and then retunes the results back to the thin client.

The cloud computing platform 630 may take on many forms, as represented to client devices. For example, layer 640 indicates that the cloud computing platform may be presented as a cluster of computing resources. For example, the cluster may take the form of a data center cluster, or a virtual gaming machine cluster.

TABLE 1

| LISTING OF CLAIMS |
| --- |
| 1. An apparatus for providing graphics processing, comprising: a dual CPU socket architecture comprising a first CPU socket and a second CPU socket; |

TABLE 1-continued

LISTING OF CLAIMS a plurality of GPU boards providing a plurality of GPU processors coupled to said first CPU socket and said second CPU socket, wherein each GPU board comprises two or more of said plurality of GPU processors; and a communication bus interface coupling said first CPU socket to a first subset of one or more GPU boards and said second CPU socket to a second subset of one or more GPU boards.

2. The apparatus of Claim 1, further comprising:
a multi-core processor coupled to said first CPU socket.

3. The apparatus of Claim 2, wherein said multi-core processor comprises a XEON E 2670 processor coupled to said first CPU socket.

4. The apparatus of Claim 1, wherein said communication bus interface comprises:
a plurality of communication bridges each coupling a corresponding GPU board to said first CPU socket and said second CPU socket.

5. The apparatus of Claim 4, wherein at least one of said communication bridges comprises a PCIe bridge.

5. The apparatus of Claim 5, wherein each of said plurality of GPU boards comprises:
a bridge splitter coupled to a corresponding PCIe bridge; and
two or more of said plurality of GPU processors.

6. The apparatus of Claim 5, wherein said plurality of GPU boards are distributed across said dual CPU socket architecture symmetrically.

7. The apparatus of Claim 6, further comprising:
a first GPU board and a second GPU board each coupled to said first CPU socket; and
a third GPU board and a fourth GPU board each coupled to said second CPU socket;
wherein each of said first, second, third, and fourth GPU boards comprises a two GPU processor configuration.

8. The apparatus of Claim 5, wherein said plurality of GPU boards are distributed across said dual CPU socket architecture asymmetrically.

9. The apparatus of Claim 1, further comprising:
a front side bus network coupling said first CPU socket and said second CPU socket;

10. The apparatus of Claim 1, wherein said front side bus network comprises:
a QPI link communicatively coupling said first CPU socket and said second CPU socket; and
a single operating system managing CPU processors coupled to said first CPU socket and said second CPU socket as supported by said QPI link.

11. The apparatus of Claim 1, wherein at least one of said plurality of graphics processors comprises an Nvidia GK107 graphics processor chip.

12. The apparatus of Claim 1, wherein a GPU processor supports a virtual machine in a one-to-one relationship.

13. The apparatus of Claim 1, further comprising:
a plurality of virtualized GPU processors supported by said plurality of GPU processors, wherein a virtualized GPU supports a virtual machine.

14. The apparatus of Claim 1, wherein said dual CPU socket architecture is configured in a Sandy bridge configuration.

15. The apparatus of Claim 1, wherein said plurality of GPU boards are identical.

16. The apparatus of Claim 1, wherein said dual CPU socket architecture and said plurality of GPU boards support a plurality of virtual machines each comprising portions of one or more CPU cores and one or more GPU processors.

17. The apparatus of Claim 1, wherein said dual CPU socket architecture and said plurality of GPU boards are implemented within a pseudo virtual machine system operating under a single operating system and running multiple applications for one or more end users.

18. A network attached GPU device, comprising:
a plurality of processing boards providing a plurality of virtual CPU and GPU processors, wherein each of said processing boards comprises:
   a dual CPU socket architecture comprising a first CPU socket and a second CPU socket;
   a plurality of GPU boards providing a plurality of GPU processors coupled to said first CPU socket and said second CPU socket, wherein each GPU board comprises two or more of said plurality of GPU processors;
   a first plurality of communication bridges each coupling a corresponding GPU board to said first CPU socket and said second CPU socket; and
   a communication interface coupling said first CPU socket to a first subset of one or more GPU boards and said second CPU socket to a second subset of one or more GPU boards.

19. The apparatus of Claim 18, wherein each of said plurality of GPU boards comprises:
a bridge splitter coupled to a corresponding communication bridge; and
two or more of said plurality of GPU processors.

20. The apparatus of Claim 18, wherein said plurality of GPU boards are distributed across said dual CPU socket architecture symmetrically such that a first GPU board and a second GPU board each coupled to said first CPU socket and a third GPU TABLE 1-continued

LISTING OF CLAIMS board and a fourth GPU board each coupled to said second CPU socket, wherein each of said first, second, third, and fourth GPU boards comprises a two GPU processor configuration.

21. The network attached GPU device of Claim 18, further comprising:
a plurality of computing device emulators supported by said plurality of processing boards.

Figure 7:
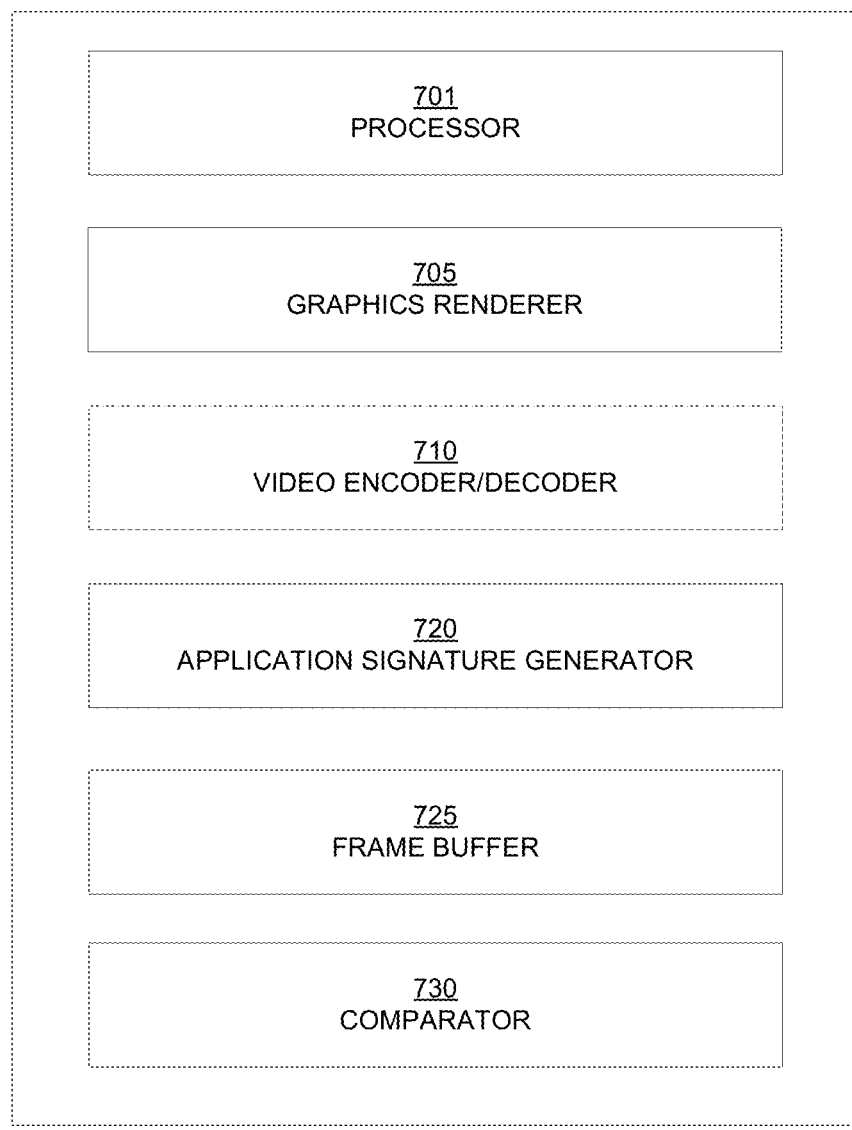
FIG. 7 is a block diagram of a system configured for detecting a keyframe, in accordance with one embodiment of the present disclosure.

Keyframe Detection when Executing an application in a Cloud Based System Providing Virtualized Graphics Processing to Remote Servers FIG. 7 is a block diagram of a system 700 configured for detecting a keyframe, in accordance with one embodiment of the present disclosure. In one embodiment, system 700 is implemented within the graphics system 400A of FIG. 4A and/or the architecture 400B of FIG. 4B that is configured to implement a cloud based virtualized graphics processing for remote displays. Detection of a preselected keyframe is critical to determine when to switch back to streaming video from the application after streaming secondary video, such as, an advertisement.

As shown in FIG. 7, system 700 includes a processor 701 that is configured for initializing an instantiation of an application. In one embodiment, the processor 701 is a virtual machine that is supported by cloud based graphics processing system that provides, in part, virtualized graphics rendering and processing for remote displays. The application that is instantiated within the virtual machine undergoes a loading process in order to initialize the application. In one embodiment, the loading process includes determining the proper configuration settings for the virtual machine when executing the application. The configuration settings may take into account the resource capabilities of the virtual machine, as well as the resource capabilities of the end client device.

System 700 includes a graphics renderer 705 for performing graphics rendering to generate a plurality of frames forming the basis of a first video stream. The graphics rendering is performed through execution of the application, wherein the first video stream comprises the plurality of frames.

In one embodiment, optionally the system 700 includes a video encoder/decoder 710 that encodes the rendered video into a compressed format before delivering encoded video stream to a remote display. In the present embodiment, the encoded video frame is used to detect a keyframe.

System 700 also includes an application signature generator that is configured for generating the master signature associated with a preselected rendered keyframe of the application that is used to determine when an instantiation of the executed application has reached the same keyframe, as will be described more fully below in relation to FIGS. 8A-B. In particular, the application signature is generated by accessing a master bitmap from a corresponding frame associated with said keyframe from a master video stream. In one embodiment, the master bitmap is hashed using a hashing algorithm to generate a hashed keyframe bitmap, which comprises the application signature of the application.

System 700 includes a frame buffer 725 for receiving in sequence a plurality of frames associated with the first video stream. In one embodiment, the graphics rendering is performed by the virtual machine in the cloud based graphics rendering system, wherein the video stream of rendered video is then delivered to a remote display. The frame buffer comprises one or more frame buffers configured to receive the rendered video frame. For example, a graphics pipeline may output its rendered video to a corresponding frame buffer. In a parallel system, each pipeline of a multi-pipeline graphics processor will output its rendered video to a corresponding frame buffer.

System 700 includes a comparator 730 that is configured for determining when a first bitmap of a frame is loaded into a corresponding frame buffer matches an application signature comprising a derivative of a master bitmap associated with a keyframe of said first video stream.

Figure 8A:
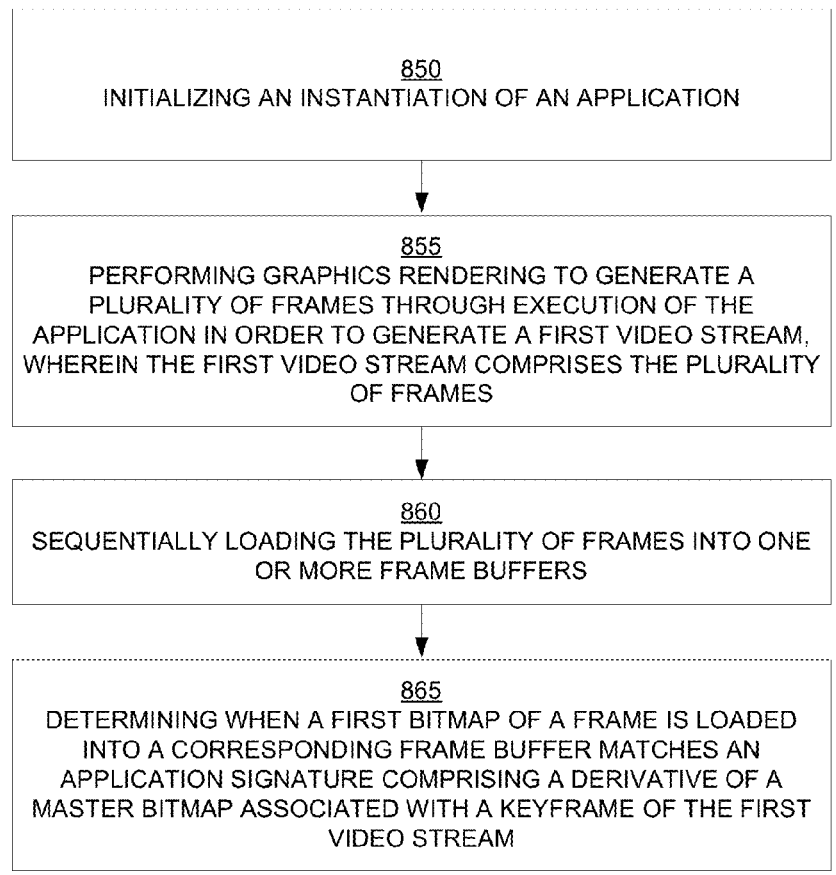
FIG. 8A is a flow diagram illustrating a method for detecting a keyframe during execution of an application on a virtual machine supported by a cloud computing platform providing virtualized graphics processing for remote displays, in accordance with one embodiment of the present disclosure.
Figure 8B:
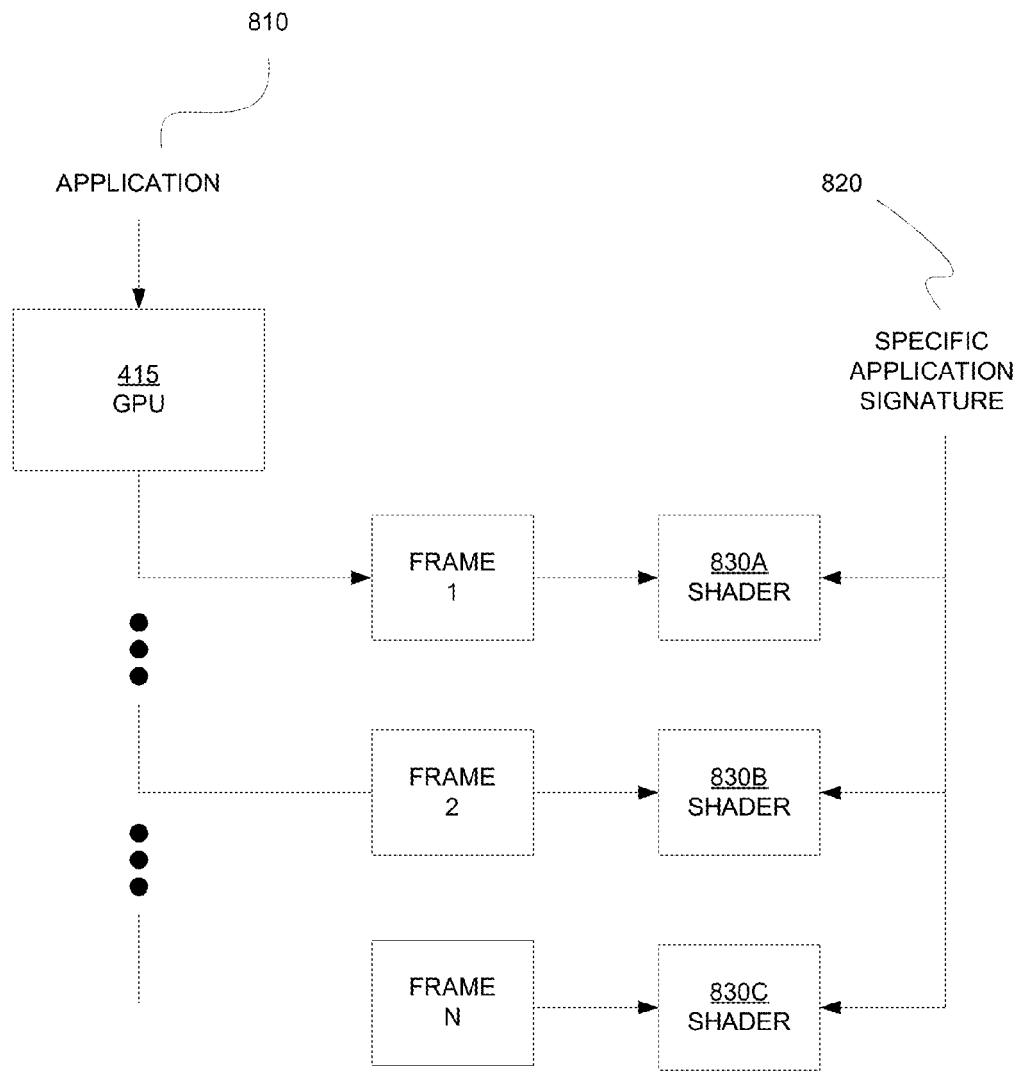
FIG. 8B is an information flow diagram illustrating the process for detecting a keyframe, in accordance with one embodiment of the present disclosure.

FIGS. 8A-B in combination illustrate a method for executing an application and determining when a predetermined keyframe is rendered in that execution. Keyframe detection is critical for many reasons, one of which includes understanding when to switch between a first video stream generated from the execution of the application and a second video stream that provides other information, possibly unrelated to the application (e.g., advertisements, etc.).

In particular, FIG. 8A is a flow diagram 800A illustrating a method for detecting a keyframe during execution of an application on a virtual machine supported by a cloud computing platform providing virtualized graphics processing for remote displays, in accordance with one embodiment of the present disclosure. In still another embodiment, flow diagram 800A illustrates a computer implemented method for detecting a keyframe during execution of an application on a virtual machine supported by a cloud computing platform providing virtualized graphics processing for remote displays. In another embodiment, flow diagram 800A is implemented within a computer system including a processor and memory coupled to the processor and having stored therein instructions that, if executed by the computer system causes the system to execute a method for detecting a keyframe during execution of an application on a virtual machine supported by a cloud computing platform providing virtualized graphics processing for remote displays. In still another embodiment, instructions for performing a method as outlined in flow diagram 800A are stored on a non-transitory computer-readable storage medium having computer-executable instructions for causing a computer system to perform a method for detecting a keyframe during execution of an application on a virtual machine supported by a cloud computing platform providing virtualized graphics processing for remote displays. In embodiments, the method outlined in flow diagram 800A is implementable by one or more components of the computer system 100 and client device 200 of FIGS. 1 and 2, respectively, as well as system 700 of FIG. 7.

At 850, the method includes initializing an instantiation of an application. For instance, when a virtual machine is instantiated within a cloud based virtual graphics processing platform at the request of an end user, an application (e.g., a gaming application) is instantiated. That is, the end user is requesting to play in the application, and the cloud based virtual graphics processing platform creates a virtual machine for executing the application. Initialization of the application loads the application within the virtual machine, and can include any sequence of operations that may or may not generate an output video stream. For example, some applications will display a rotating hourglass over a blank or darkened screen while loading the application.

In one embodiment, the cloud based virtual graphics processing platform streams a second video stream to the end user while the application is loading. The second video stream is not part of the application. For instance, the second video stream includes additional information, such as, advertisements, notifications, etc. At a predetermined moment, the graphics processing platform discontinues streaming the second video stream and switches back to the video stream generated by the application. Embodiments of the present invention provide for detection of a specific and predetermined keyframe that indicates when to switch back to the video stream generated by the application.

At 855, the method includes performing graphics rendering on a plurality of rendered frames through execution of the application. A first video stream that is generated comprises the plurality of rendered frames. FIG. 8B is an information flow diagram 800B illustrating the process for detecting a keyframe, in accordance with one embodiment of the present disclosure. As shown, execution of application within any processor, including a processor of a virtual machine, includes sending instructions to a virtual GPU 415, which was previously described in relation to virtual GVUs 415A-M of FIG. 4B. For instance, GPU 415 can be any of the virtual GPUs 415A-M. The GPU 415 outputs rendered frames in sequential order, as executed in one or more graphics pipelines. For instance, GPU 415 generates frames 1-N.

At 865, the method includes determining when a first bitmap of a frame that is loaded into a corresponding frame buffer matches an application signature. As shown in FIG. 8B, a shader module performs the comparison between the bitmap of a rendered frame from the executed application and a master bitmap, which forms the application signature 820. For example, once a rendered frame (e.g., frame 1) is generated by the GPU 415, and its corresponding bit map loaded into a corresponding frame buffer, the rendered frame or its associated bitmap is inputted to the shader 830A, and compared against an application signature 820 that is specific to that application and also inputted into the shader 830A. The shader 830A performs the comparison between the application signature 820 and the associated bitmap information loaded into frame buffer 1.

Preliminarily, the application signature is generated from a master copy of the application, in one embodiment. In particular, in one embodiment, the application signature comprises a derivative of a master bitmap that is associated with a keyframe of the first video stream. That is, a master application is executed and includes a plurality of master frames that are rendered. One of the rendered frames is selected from a master video stream as the keyframe. For example, the keyframe may be a specific scene, or a specific logo that is rendered at a consistent moment in the execution, initialization, and/or loading of any instantiation of the application. The master bitmap of the keyframe that is loaded into a frame buffer for display is then manipulated to form a derivative of the master keyframe and forms the application signature. For instance, generation of the application signature includes accessing a master bit map, and performing a hashing algorithm on the master bitmap to generated a hashed keyframe bitmap. The hashed keyframe bitmap now comprises the application signature 820 of the application. In any subsequent instantiation of the application, with the proper manipulation of each of the frames rendered (e.g., performing a hash), embodiments of the present invention are able to determine when a rendered frame, modified or unmodified, matches the keyframe, or a derivative of the keyframe.

When determining if there is a match between the rendered frame and the master keyframe, the method includes accessing a first bitmap of the frame that is loaded into the corresponding frame buffer. This first bitmap is generated during the execution of the application instantiated in a corresponding virtual machine, for example. Whatever manipulation was performed on the master keyframe or master keyframe bitmap is also performed on the first bitmap. For instance, if the master keyframe bitmap was hashed in order to generated the application signature, then the method includes performing a hashing algorithm on the first bitmap to generate a hashed first bitmap. Of course, rather than performing a hash algorithm, other manipulations may be performed in other embodiments.

Continuing with the example where the master keyframe bitmap is hashed to generate an application signature, the method includes comparing the hashed keyframe bitmap (e.g., application signature) and the hashed first bitmap to determine if there is a match. In one embodiment, there is a tolerance in the hashing algorithm in that the first bitmap and the master bitmap of the keyframe can be within a tolerance. As long as they are within the tolerance (e.g., 95 percent matching), then the subsequent hashes that are generated from the master bitmap and the first bitmap are matched.

The method includes determining when the application as executed reaches the keyframe. This occurs when it is determined that the hashed keyframe and the hashed first bitmap map, as previously described. In one embodiment, determining when the application reaches the keyframe is used to switch between video streams. In that case, when a match is determined, a notification of the match is delivered up the software stack responsible for delivery of encoded video to the client device so that a switch can be made. For instance, while the application is loading, the method includes sending a second video stream to a client device of the requesting end user for display. The second video stream includes information unrelated to the application and/or is independently generated from the application. In one example, the second video stream includes an advertisement.

As such, when the executed application reaches a point where a rendered frame matches the keyframe, this indicates that the application that is instantiated has also reached the keyframe. In that manner, the method includes switching to the first video stream upon detection of the keyframe, wherein the first video stream is the plurality of rendered video (encoded or not encoded) generated by the application. Also, the method includes sending the first video stream to the client device, and suspending delivery of the second video stream (e.g., advertisement). In one embodiment, the first video stream is delivered beginning with the frame that matches the keyframe to the client device for display. In another embodiment, the first video stream is delivered beginning with a frame after a frame that matches the keyframe to the client device for display.

TABLE 2

LISTING OF CLAIMS

1. A non-transitory computer readable medium having computer executable instructions for causing a computer system to perform a method for switching, comprising:
   initializing an instantiation of an application;
   performing graphics rendering to generate a plurality of rendered frames through execution of said application in order to generate a first video stream comprising said plurality of rendered frames;
   sequentially loading said plurality of rendered frames into one or more frame buffers; and
   determining when a first bitmap of a frame that is loaded into a corresponding frame buffer matches an application signature comprising a derivative of a master bitmap associated with a keyframe of said first video stream.

2. The computer readable medium of Claim 1, wherein said initializing an instantiation of an application in said method comprises:
   initializing said instantiation of said application on a virtual machine of a cloud based graphics processing system for an end user.

3. The computer readable medium of Claim 1, wherein in said method said application comprises a gaming application.

4. The computer readable medium of Claim 1, wherein said method further comprises:
   sending a second video stream to a client device of said end user for display;
   switching to said first video stream upon detection of said keyframe; and
   sending said first video stream beginning with said frame that matches said keyframe to said client device for display.

5. The computer readable medium of Claim 4, wherein in said method said second video stream comprises an advertisement.

6. The computer readable medium of Claim 1, wherein said method further comprises:
   sending a second video stream to a client device of said end user for display;
   switching to said first video stream upon detection of said keyframe; and
   sending said first video stream beginning with a frame after a frame that is associated with said keyframe to said client device for display.

7. The computer readable medium of Claim 1, wherein said method further comprises:
   selecting said keyframe that is take from a master video stream of a master copy of said application for purposes of generating said application signature.

8. The computer readable medium of Claim 7, wherein said determining when a first bitmap in said method further comprises:
   accessing a master bitmap from a corresponding frame associated with said keyframe from said master video stream; and
   performing a hashing algorithm on said master bitmap to generate a hashed keyframe bitmap comprising said application signature of said application.

9. The computer readable medium of Claim 8, wherein said method further comprises:
   accessing a first bitmap of said frame that is loaded into a corresponding frame buffer;
   performing said hashing algorithm on said first bitmap to generate a hashed first bitmap;
   comparing said hashed keyframe and said hashed first bitmap to determine if they match; and
   determining when said application as executed reaches said keyframe when said hashed keyframe and said hashed first bitmap match.

10. A computer system comprising:
    a processor; and
    memory coupled to said processor and having stored therein instructions that, if executed by a computer system, causes said computer system to execute a method for switching, comprising:
    initializing an instantiation of an application;
    performing graphics rendering to generate a plurality of rendered frames through execution of said application in order to generate a first video stream comprising said plurality of frames;
    sequentially loading said plurality of rendered frames into one or more frame buffers; and
    determining when a first bitmap of a rendered frame that is loaded into a corresponding frame buffer matches an application signature comprising a derivative of a master bitmap associated with a keyframe of said first video stream.

11. The computer system of Claim 10, wherein said initializing an instantiation of an application in said method comprises:
    initializing said instantiation of said application on a virtual machine of a cloud based graphics processing system for an end user.

12. The computer system of Claim 10, wherein in said method said application comprises a gaming application.

13. The computer system of Claim 10, wherein said method further comprises:
    sending a second video stream to a client device of said end user for display;
    switching to said first video stream upon detection of said keyframe; and
    sending said first video stream beginning with said frame that matches said keyframe to said client device for display.

TABLE 2-continued

LISTING OF CLAIMS

14. The computer system of Claim 13, wherein in said method said second video stream comprises an advertisement.
15. The computer system of Claim 10, wherein said method further comprising:
sending a second video stream to a client device of said end user for display;
switching to said first video stream upon detection of said keyframe; and
sending said first video stream beginning with a frame after a frame that is associated with said keyframe to said client device for display.
16. The computer system of Claim 10, wherein said method further comprises:
selecting said keyframe that is take from a master video stream of a master copy of said application for purposes of generating said application signature.
17. The computer system of Claim 16, wherein said determining when a first bitmap in said method further comprises:
accessing a master bitmap from a corresponding frame associated with said keyframe from said master video stream; and
performing a hashing algorithm on said master bitmap to generate a hashed keyframe bitmap comprising said application signature of said application.
18. The computer system of Claim 17, wherein said method further comprises:
accessing a first bitmap of said frame that is loaded into a corresponding frame buffer;
performing said hashing algorithm on said first bitmap to generate a hashed first bitmap;
comparing said hashed keyframe and said hashed first bitmap to determine if they match; and
determining when said application as executed reaches said keyframe when said hashed keyframe and said hashed first bitmap match.
19. A system for switching, comprising:
a processor configured for initializing an instantiation of an application;
a graphics renderer configured for performing graphics rendering on a plurality of frames to generate a first video stream through execution of said application, wherein said first video stream comprises said plurality of frames;
a frame buffer configured for receiving in sequence a plurality of frames associated with said first video stream;
a comparator configured for determining when a first bitmap of a frame is loaded into a corresponding frame buffer matches an application signature comprising a derivative of a master bitmap associated with a keyframe of said first video stream.
20. The system of Claim 19, further comprising:
a cloud based graphics processing system;
a virtual machine of said cloud based graphics processing system, wherein said virtual machine is configured for executing said application.

Fast Cloning of Virtual Machines

Figure 9:
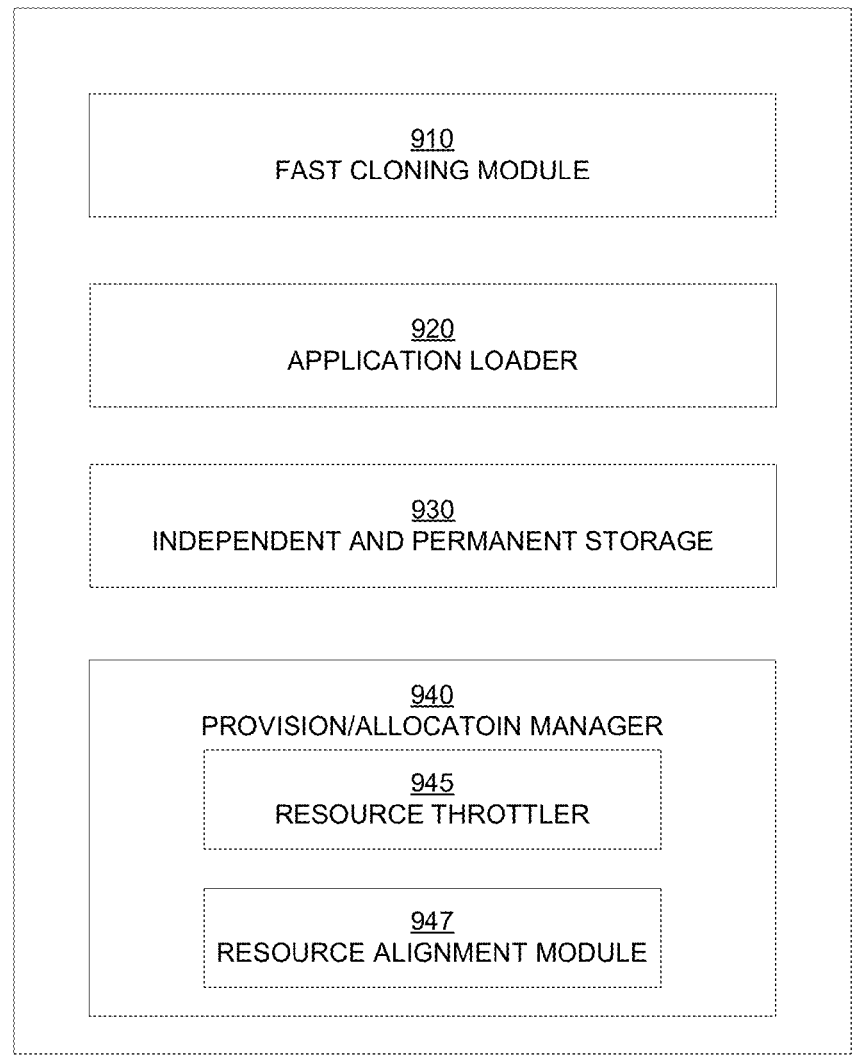
FIG. 9 is a block diagram of a resource generation system configured to generate new virtual machines using a template virtual machine and customizing each instantiation of a virtual machine with user specific data, in accordance with one embodiment of the present disclosure.

FIG. 9 is a block diagram of a resource generation system 900 configured to generate new virtual machines using a template virtual machine and customizing each instantiation of a virtual machine with user specific data, in accordance with one embodiment of the present disclosure. System 900 is implementable within the cloud architecture 400B of FIG. 4B and is used to generate new virtual machines. In one embodiment, the resource generation system 900 is configured within the VM Host Manager 462 of the GM server 461A.

As shown, system 900 includes a fast cloning module 910 that is configured to generate a new instantiation of a virtual machine. In particular, fast cloning module 910 creates a new virtual machine from a template virtual machine. The new virtual machine is customized to a particular user by modifying the template with updates. In that manner, instead of storing a whole image of the customized virtual machine, only the updates that are custom to the requesting user need be stored. The updates are then used to modify the template to generate a new instantiation of a virtual machine that is customized to the end user.

System 900 also includes an application loader 920. In one embodiment, an end user accessing the cloud based service that provides virtualized graphics processing for remote servers is interested in executing an application. The virtual machine is instantiated in order to execute that application. For instance, a cloud based graphics processing platform may be created to provide a cloud based gaming experience, wherein gaming applications are stored and executed for the cloud based platform. End users typically would request to play a specific gaming application, and a virtual machine is instantiated to support that request to play the gaming application. As such, in response to a request to play a gaming application by an end user, virtual machine is instantiated and the gaming application is loaded by the application loader for execution within the virtual machine.

System 900 also includes independent and persistent storage 930. In particular, the updates and/or information related to the end user is stored in storage 930. That information is then used to customize a template virtual machine when creating a instantiation of a virtual machine that is customized to a particular end user. For instance, the information may include user profile information, and game save files or application save files, wherein the application save file provides information related to the interactions of the user with the particular application (e.g., game status, etc.). As such, with the storing of the updates and/or user related information, an instantiation or image of a virtual machine and application specific to a user need not be persisted, and the instantiation of the virtual machine may be extinguished. This provides an added benefit, since each new instantiation of a virtual machine starts from a pristine, template virtual machine that is free from bugs and viruses, and need only be updated with information related to a requesting end user (e.g., updates and/or user profile information).

System 900 also includes a provision/allocation manager 940. In one embodiment, the manager 940 performs similar functionality as provision manager 470 of FIG. 4B. Specifically, provision/allocation manager 940 is configured to allocate resources to a newly instantiated virtual machine. In one embodiment, the provision/allocation manager 940 includes a resource throttler 945 that is configured to reduce and/or throttle the amount of resources originally allocated to the virtual machine upon initialization in order to reduce any adverse affects upon existing and operational virtual machines. After initialization, the resource alignment module 947 is configured to increase the resources within the virtual machine until the original allocation of resources is met.

Figure 10A:
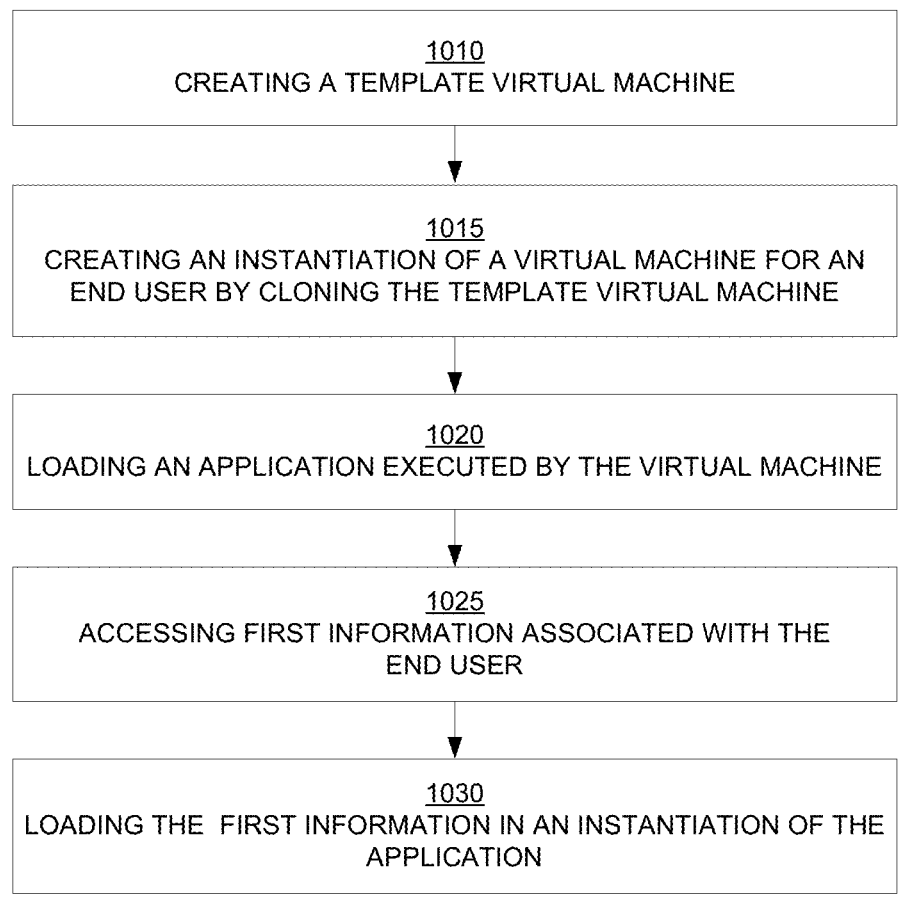
FIG. 10A is a flow chart illustrating a method for resource generation for a new virtual machine providing cloud based virtualized graphics processing for a remote display, in accordance with one embodiment of the present disclosure.

FIG. 10A is a flow chart 1000A illustrating a method for resource generation for a new instantiation of a virtual machine providing cloud based virtualized graphics processing for a remote display, in accordance with one embodiment of the present disclosure. In still another embodiment, flow diagram 1000A illustrates a computer implemented method for resource generation for a new instantiation of a virtual machine providing cloud based virtualized graphics processing for a remote display. In another embodiment, flow diagram 1000A is implemented within a computer system including a processor and memory coupled to the processor and having stored therein instructions that, if executed by the computer system causes the system to execute a method for resource generation for a new instantiation of a virtual machine providing cloud based virtualized graphics processing for a remote display. In still another embodiment, instructions for performing a method as outlined in flow diagram 1000A are stored on a non-transitory computer-readable storage medium having computer-executable instructions for causing a computer system to perform a method for resource generation for a new instantiation of a virtual machine providing cloud based virtualized graphics processing for a remote display. In embodiments, the method outlined in flow diagram 1000A is implementable by one or more components of the computer system 100 and client device 200 of FIGS. 1 and 2, respectively, as well as the resource generation system 900 of FIG. 9.

At 1010, the method includes creating a template virtual machine. The template is used for cloning additional virtual machines. At 1015, the method includes creating an instantiation of a virtual machine for a requesting end user by cloning the template virtual machine. In particular, the cloning operation is efficient in that, in a customized instantiation of a virtual machine related to an end user, only modifications to the template need be stored and not the entire image of the virtual machine. The update information is then used to modify the template to create an instantiation of the virtual machine that is customized to the end user. In one embodiment, the update information includes user profile information, and application save file data, as previously described. For instance, in a gaming application, the "save game" file data includes information related to the progress of a player within the game as executed by the gaming application.

In one embodiment, the virtual machine is initialized in a cloud based graphics process system for the requesting end user. For example, the virtual machine may be instantiated within the architecture 400B of FIG. 4B. Furthermore, in a cloud based gaming platform that provides virtualized graphics processing for remote displays, the template virtual machine comprises a plurality of pre-selected gaming applications that are available to each of a plurality of end users. That is, the template already contains full copies of every gaming application. In that manner, the user need only access the platform, and request a supported gaming application, and begin playing that gaming application through a corresponding virtual machine.

At 1020, the method includes loading an application executed by the virtual machine. For instance, the end user may be accessing the platform to use a particular application, such as, video generation software. In the gaming environment, the end user is typically accessing the cloud based platform to play a gaming application. As such, after the instantiation of the virtual machine, the particular application, as requested by the end user is loaded onto the virtual machine, and then executed.

At 1025, the method includes accessing first information that is associated with the end user. That first information is used to customize the virtual machine and the instantiation of the gaming application as executed within the virtual machine. In one embodiment, the first information is used to modify the template virtual machine in order to customize it for the end user. For instance, as previously described, the first information includes "game save" information, and/or user profile information.

At 1030, the method includes loading the first information into an instantiation of the application. For instance, "game save" information associated with the application is accessed and used to bring the user to his or her last updated version of an instantiation of the application. In a gaming environment, the application is updated to the last, qualified location for the end user, or the role player associated with the end user.

The generation of a virtual machine from a template assures that the new instantiation of the virtual machine originates from a pristine source. As such, no viruses should reside within any new instantiation of a virtual machine, as long as no viruses have entered the user profile information and/or the update information. In that manner, virtual machines are not persisted when the user session ends. In particular, the method includes receiving an instruction to terminate the instantiation of the virtual machine. At that time, information specific to and associated with the end user is updated (e.g., a "save game" file is updated) and stored in a storage system that is independent of the virtual machine. This is necessary since the instantiation of the virtual machine will be terminated. The information specific to and associated with the end user is then used the next time a virtual machine is requested by the end user.

Figure 10B:
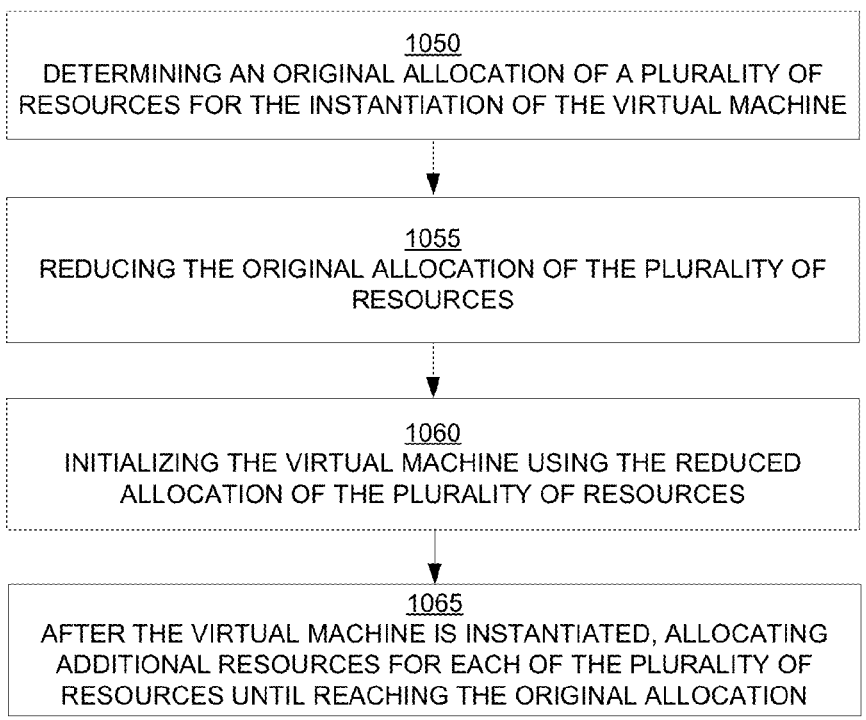
FIG. 10B is a flow chart illustrating a method for throttling the allocation of resources when generating a new virtual machine to lessen its impact on the operations of existing virtual machines, in accordance with one embodiment of the present disclosure.

FIG. 10B is a flow chart 1000B illustrating a method for throttling the allocation of resources when generating a new virtual machine to lessen its impact on the operations of existing virtual machines, in accordance with one embodiment of the present disclosure. In particular, the generation of the virtual machine to include the allocation of resource may provide a noticeable load on existing virtual machines that are currently executing applications. That load affects the execution of on-going applications, and may negatively reduce the overall gaming experience of those end users. As such, flow chart 1000B provides a method for reducing the affect on the operation of existing virtual machines when instantiating a virtual machine for an end user.

At 1050, the method includes determining an original allocation of a plurality of resources for the instantiation of the virtual machine. That is, the virtual machine comprises a plurality of resources, each of which is originally assigned an original allocation. For example, resources may include CPU processor cores, memory etc. For illustration, a virtual machine may be originally allocated eight GPU processor cores.

At 1055, the method includes reducing the original allocation of the plurality of resources. In one embodiment, the reduction is such that the reduced allocation is less than twenty-five percent of the original allocation. In a further embodiment, the reduction is performed for each of the different resources, and in one implementation the reduction is performed equally across all the different resources. That is, each of the resources is reduced in an corresponding amount to less than twenty-five percent of the original allocation of a corresponding resource. At 1060, the method includes initializing the virtual machine using the reduced allocation of the plurality of resources.

After the virtual machine is instantiated, additional resource allocation must be performed to bring the virtual machine up to its intended capabilities. As such, at 1065, the method includes allocating additional resources for each of the plurality of resources. The resources are allocated such that additional allocation of resources if made to the plurality of resources so that the allocation of resource reaches the original allocation.

TABLE 3

LISTING OF CLAIMS

1. A method for network cloud resource generation, comprising:
creating a template virtual machine;
creating an instantiation of a virtual machine for an end user by cloning said template;
loading an application executed by said virtual machine;
accessing first information associated with said end user; and
loading said first information in an instantiation of said application.
2. The method of Claim 1, wherein said template virtual machine comprises a plurality of pre-selected gaming applications available to each of a plurality of end users.
3. The method of Claim 1, wherein said accessing first information comprises:
accessing a saved game file associated with said application.
4. The method of Claim 1, wherein said accessing first information comprises:
accessing a user profile of said user.
5. The method of Claim 1, further comprising:
receiving an instruction to terminate said instantiation of said virtual machine; and
storing an updated version of said specific information associated with said user in a storage system independent of said virtual machine.
6. The method of Claim 1, wherein said creating an instantiation of a virtual machine comprises:
determining an original allocation of a plurality of resources for said instantiation of said virtual machine;
reducing said original allocation of said plurality of resources; and
initializing said virtual machine using said reduced allocation of said plurality of resources.
7. The method of Claim 6, wherein said reducing said original allocation comprises:
reducing said original allocation for each of said plurality of resources.
8. The method of Claim 7, wherein said reducing said original allocation comprises:
allocating each of said plurality of resources at an amount that is less than twenty-five percent of a corresponding original allocation.
9. The method of Claim 6, further comprising:
after said virtual machine is instantiated, allocating additional resources for each of said plurality of resources to reach said original allocation.
10. The method of Claim 1, wherein said initializing said virtual machine further comprises:
initializing said instantiation of said virtual machine in a cloud based graphics processing system for an end user.
11. A non-transitory computer readable medium having computer executable instructions for causing a computer system to perform a method for network cloud resource generation, comprising:
creating a template virtual machine;
creating an instantiation of a virtual machine for an end user by cloning said template;
loading an application executed by said virtual machine;
accessing specific information associated with said end user; and
loading said specific information in an instantiation of said application.
12. The computer readable medium of Claim 11, wherein in said method said template virtual machine comprises a plurality of pre-selected gaming applications available to each of a plurality of end users.
13. The computer readable medium of Claim 11, wherein said accessing first information in said method comprises:
accessing a saved game file associated with said application; and
accessing a user profile of said user.
14. The computer readable medium of Claim 11, wherein said creating an instantiation of a virtual machine in said method comprises:
determining an original allocation of a plurality of resources for an instantiation of a virtual machine;
reducing said original allocation of said plurality of resources; and
initializing said virtual machine using said reduced allocation of said plurality of resources.
15. The computer readable medium of Claim 11, wherein said method further comprises:
after said virtual machine is instantiated, allocating additional resources for each of said plurality of resources to reach said original allocation.

TABLE 3-continued

LISTING OF CLAIMS

16. The computer readable medium of Claim 14, wherein said plurality of resources comprises a number of CPU cores, and an amount of memory.

17. A computer system comprising:
   a processor; and
   memory coupled to said processor and having stored therein instructions that, if executed by a computer system, causes said computer system to execute a method for network cloud resource generation, comprising:
      creating a template virtual machine;
      creating an instantiation of a virtual machine for an end user by cloning said template;
      loading an application executed by said virtual machine;
      accessing specific information associated with said end user; and
      loading said specific information in an instantiation of said application.

18. The computer system of Claim 17, wherein in said method said template virtual machine comprises a plurality of pre-selected gaming applications available to each of a plurality of end users.

19. The computer system of Claim 17, wherein said creating an instantiation of a virtual machine in said method comprises:
   determining an original allocation of a plurality of resources for said instantiation of said virtual machine;
   reducing said original allocation of said plurality of resources; and
   initializing said virtual machine using said reduced allocation of said plurality of resources.

20. The computer system of Claim 17, wherein said method further comprises:
   after said virtual machine is instantiated, allocating additional resources for each of said plurality of resources until reaching said original allocation.

Figure 11:
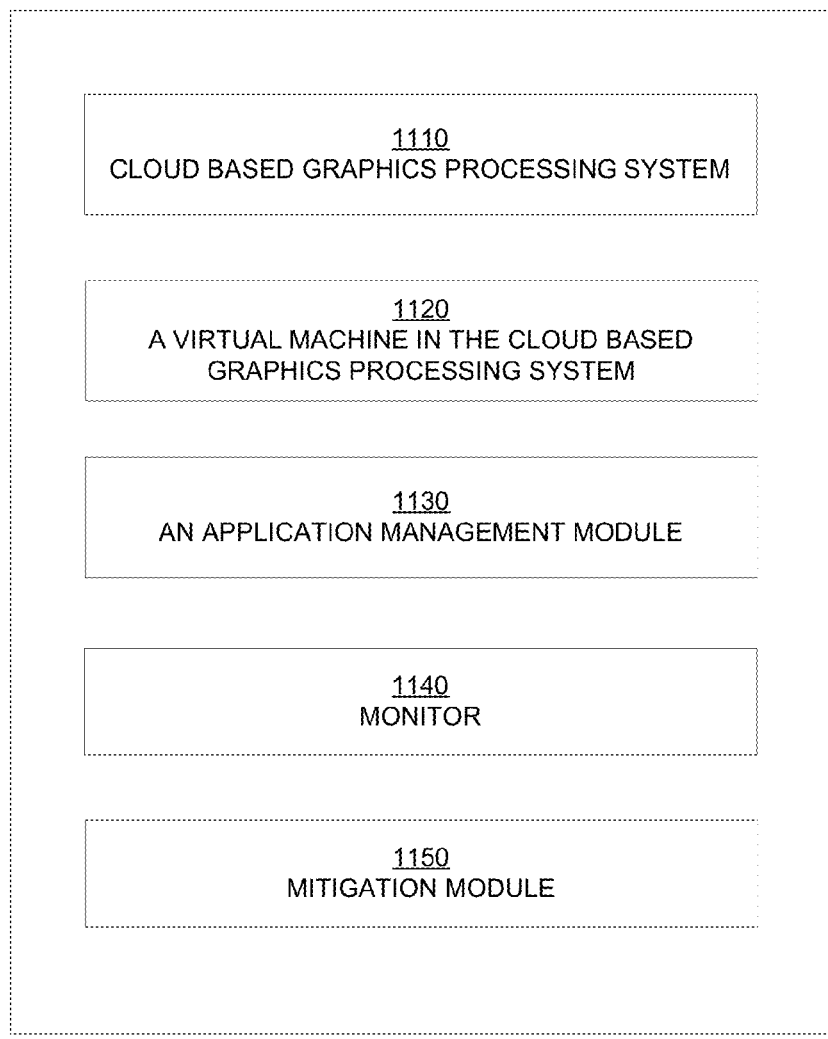
FIG. 11 is a block diagram of a system capable of performing windows management on a remote display for purposes of minimizing exposure of a desktop operating system on a front window of the remote display, in accordance with one embodiment of the present disclosure.

Windows Management to Reduce Exposure of a Desktop Operating System Displayed on a Front Window FIG. 11 is a block diagram of a system 1100 capable of performing windows management on a remote display for purposes of minimizing exposure of a desktop operating system on a front window of the remote display, in accordance with one embodiment of the present disclosure. System 1100 is implementable within the cloud architecture 400B of FIG. 4B and is used to monitor output video of corresponding virtual machines to ensure that an application, as requested by a corresponding end user, is displayed on a front window of a display, and that display and/or messages of a desktop of an underlying operating system is rendered on one or more rear windows. In one embodiment, the system 1100 capable of windows management is configured within a game agent 456A of an instantiation of a virtual machine.

As shown in FIG. 11, system 1100 includes a cloud based graphics processing system 1110 that provides virtualized graphics processing for remote displays. More particularly, system 1110 is capable of configuring a plurality of virtual machines for a plurality of end users through corresponding terminals (e.g., thin clients, etc.). For example, an instantiation of a virtual machine acts includes an operating system that is used to execute application instructions on the resources available and assigned to the virtual machine. In one embodiment, each of the virtual machines run on an Windows® operating system, though they may be configured and held out as gaming platforms.

The system 1100 includes a virtual machine 1120 that is instantiated or implemented through the cloud based graphics processing system. The virtual machine executes an application that is typically selected by an end user for interaction. That is, the end user beings a gaming session with the cloud based graphics processing system with the intention of playing a cloud based gaming application through a corresponding instantiation of a virtual machine. The virtual machine while executing the application generates a video stream that comprises rendered images for display. The rendered video is ultimately encoded and streamed to a remote display for viewing by one or more end users.

The system 1100 includes an application management module 1130 that is configured for ensuring that information being displayed in a front window of a remote display is within an application context related to the application being executed. Specifically, a monitor 1140 is configured to monitor the front buffer to detect when video information stored in the front buffer is outside of the application context. Information retrieved or read from the front buffer is scanned out for immediate display.

When the video information contained within the front buffer is outside of the application context, a mitigation nodule 1150 is configured to taking an action that mitigates an effect of the video information being displayed. For instance, the video information that is outside of the application context may be an operating system message or desktop, as initiated by an end user (e.g., entering a command sequence, such as, ALT-ENTER), or directly through the workings of the operating system.

Figure 12:
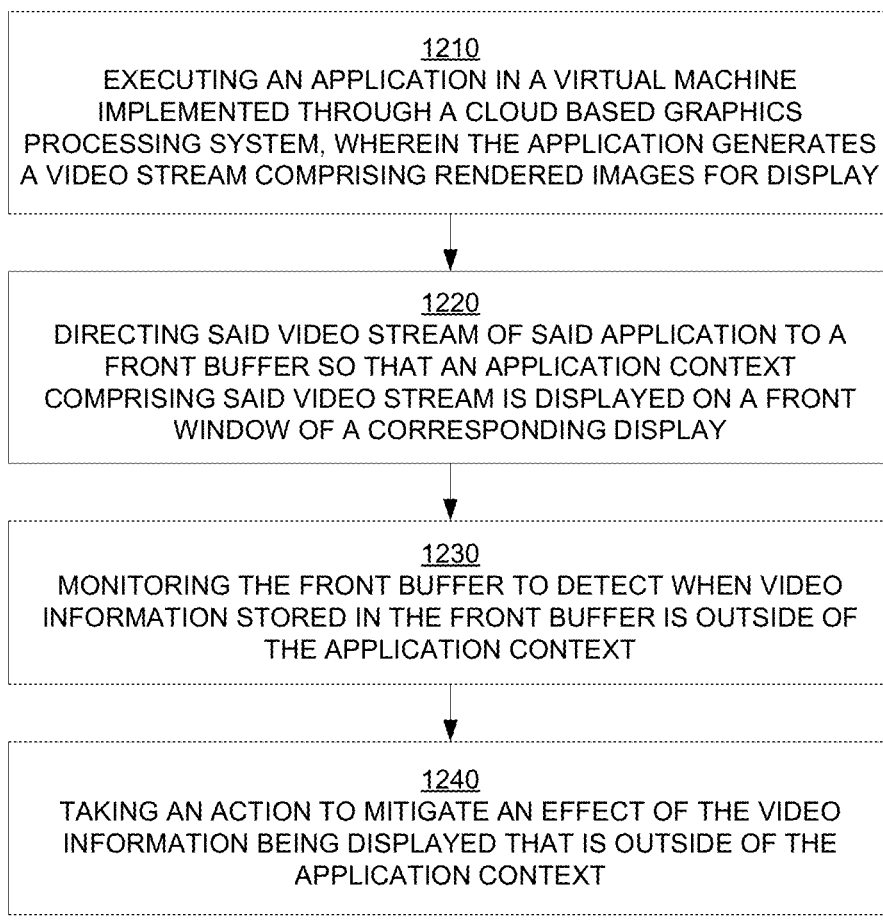
FIG. 12 is a flow chart illustrating a method for performing windows management on a remote display for purposes of minimizing exposure of a desktop operating system on a front window of the remote display, in accordance with one embodiment of the present disclosure.

FIG. 12 is a flow chart 1200 illustrating a method for performing windows management on a remote display for purposes of minimizing exposure of a desktop operating system on a front window of the remote display, in accordance with one embodiment of the present disclosure. In still another embodiment, flow diagram 1200 illustrates a computer implemented method for performing windows management on a remote display for purposes of minimizing exposure of a desktop operating system on a front window of the remote display. In another embodiment, flow diagram 1200 is implemented within a computer system including a processor and memory coupled to the processor and having stored therein instructions that, if executed by the computer system causes the system to execute a method for performing windows management on a remote display for purposes of minimizing exposure of a desktop operating system on a front window of the remote display. In still another embodiment, instructions for performing a method as outlined in flow diagram 1200 are stored on a non-transitory computer-readable storage medium having computer-executable instructions for causing a computer system to perform a method for performing windows management on a remote display for purposes of minimizing exposure of a desktop operating system on a front window of the remote display. In embodiments, the method outlined in flow diagram 1200 is implementable by one or more components of the computer system 100 and client device 200 of FIGS. 1 and 2, respectively, as well as the system 1100 capable of windows management of FIG. 11.

At 1210, the method includes executing an application in a virtual machine that is implemented through a cloud based graphics processing system. For example, the cloud based system is implemented through the architecture 400B of FIG. 4B that is configured to provide a plurality of virtual machines to a plurality of end users, wherein each of the virtual machines are fully operational computing system functioning under an operating system, such as, the Windows® operating system. In one implementation, the cloud based graphics processing system is a gaming platform where end users enter to play gaming applications that are stored and instantiated within the gaming platform, through a corresponding virtual machine.

During execution of the application by the virtual machine, a video stream is generated that comprises rendered images for display. At 1220, the method includes directing the video stream of the application to a front buffer of the corresponding virtual machine, wherein information from the front buffer is fetched and scanned out for presentation on a remote display. By directing the video stream to the front buffer, this ensures that the video stream is displayed on a front window of the remote display. This is important for the cloud based graphics processing system that is acting, for example, as a gaming platform. By directing the gaming application to the front window or forward most window, the end user's gaming experience is enhanced, as the user is immersed entirely within a gaming environment—front and center. Moreover, the end user is not confronted with any exposure to the underlying operating system (e.g., desktop, error messages, etc.). In a further embodiment, the front window is maximized so that the video stream is displayed on a full screen of the remote display. In one implementation, the directing of the video stream to the front buffer, and maximizing the front window is accomplished through execution of application programming interface (API) calls.

At 1230, the method includes monitoring the front buffer to detect when video information stored in the front buffer is outside of the application context. That is, instead of information related to the video stream of the application running on the virtual machine, the front buffer is loaded with other video information that is outside the application context. As an example, the video information may be operating system specific and includes responses to user initiated operating system command sequences. For instance, some illustrations of command sequences include ALT-TAB, which brings the operating system desktop to the front window; or ALT-ENTER, which minimizes the front window; or CTL-ALT-DELETE, which reboots the system. Each of these commands present a window containing information that is not within the application context, and may include dialogue or messaging, or secondary video (e.g., desktop).

In another embodiment, the video information includes a frozen screen. That is, the application may have crashed and is not sending the video stream to the remote display. The method includes detecting when the gaming application has crashed. This is accomplished by detecting when the video stream has ended. In that case, the remote display may be locked onto one image for display. Again, this is not a desired gaming experience, and embodiments of the present invention can detect and taking action to mitigate this negative gaming experience.

At 1240, the method includes taking an action to mitigate an effect of the video information being displayed that is outside of the application context. In one embodiment, the mitigating action is selected by its ability to minimize the exposure of an operating system desktop, message, or any other communicating form in the front window.

In one embodiment, the video information is an operating system message or video that is forced to the front window. A mitigating action includes executing an API call to force a rendering of the video stream back to the front buffer, and as such, rendered images from the video stream are again stored in the front buffer ready for display. In one embodiment, the mitigating action includes ignoring the video information that is outside of the application context, and suppressing delivery of the video information to the display.

In another embodiment, as a last resort, the virtual machine session is terminated. For example, the application has crashed and cannot be rebooted within the virtual machine instantiation. As such, the mitigating action includes terminating a user session that implements the virtual machine, and reinitializing another virtual machine to execute another instantiation of the gaming application.

TABLE 4

LISTING OF CLAIMS

1. A non-transitory computer readable medium having computer executable instructions for causing a computer system to perform a method for window management, wherein said method comprises:
executing an application in a virtual machine implemented through a cloud based graphics processing system, wherein said application generates a video stream comprising rendered images for display;
directing said video stream of said application to a front buffer so that an application context comprising said video stream is displayed on a front window of a corresponding display;
monitoring said front buffer to detect when video information stored in said front buffer is outside of said application context; and
taking an action to mitigate an effect of said video information being displayed that is outside of said application context.

2. The computer readable medium of Claim 1, wherein said method further comprises:
executing an API call to maximize said front window of said corresponding display.

TABLE 4-continued

LISTING OF CLAIMS

3. The computer readable medium of Claim 1, where said taking an action in said method comprises:
   executing an API call to force a rendering of said video stream back to said front buffer.
4. The computer readable medium of Claim 1, wherein said monitoring said front buffer in said method comprises:
   detecting when said gaming application has crashed by determining that said video stream has ended;
   terminating a user session implementing said virtual machine; and
   reinitializing another virtual machine to execute another instantiation of said gaming application.
5. The computer readable medium of Claim 1, wherein said taking an action in said method comprises:
   minimizing exposure of a windows desktop in said front window.
6. The computer readable medium of Claim 1, wherein said taking an action in said method comprises:
   ignoring said video information that is outside of said application context; and
   suppress delivery of said video information to said display.
7. The computer readable medium of Claim 1, wherein in said method said video information is generated from a user initiated Windows ® operating system command sequence.
8. The computer readable medium of Claim 1, wherein in said method said application comprises a gaming application.
9. A computer system comprising:
   a processor; and
   memory coupled to said processor and having stored therein instructions that, if executed by a computer system, causes said computer system to execute a method for window management, wherein said method comprises:
   executing an application in a virtual machine implemented through a cloud based graphics processing system, wherein said application generates a video stream comprising rendered images for display;
   directing said video stream of said application to a front buffer so that an application context comprising said video stream is displayed on a front window of a corresponding display;
   monitoring said front buffer to detect when video information stored in said front buffer is outside of said application context; and
   taking an action to mitigate an effect of said video information that is outside of said application context.
10. The computer system of Claim 9, wherein said method further comprises:
    executing an API call to maximize said front window of said corresponding display.
11. The computer system of Claim 9, where said taking an action in said method comprises:
    executing an API call to force a rendering of said video stream back to said front buffer.
12. The computer system of Claim 9, wherein said monitoring said front buffer in said method comprises:
    detecting when said gaming application has crashed by determining that said video stream has ended;
    terminating a user session implementing said virtual machine; and
    reinitializing another virtual machine to execute another instantiation of said gaming application.
13. The computer system of Claim 9, wherein said taking an action in said method comprises:
    minimizing exposure of a windows desktop in said front window.
14. The computer system of Claim 9, wherein said taking an action in said method comprises:
    ignoring said video information that is outside of said application context; and
    suppress delivery of said video information to said display.
15. The computer system of Claim 9, wherein in said method said video information is generated from a user initiated Windows ® operating system command sequence.
16. The computer system of Claim 9, wherein in said method said application comprises a gaming application.
17. A system for window management, comprising:
    a cloud based graphics processing system;
    a virtual machine implemented through said cloud based graphics processing system, wherein said virtual machine executes an application and generates a video stream comprising rendered images for display;
    an application management module configured for directing said video stream of said application to a front buffer so that an application context comprising said video stream is displayed on a front window of a corresponding display, and wherein said application management module executes an API call to maximize said front window;
    a monitor configured for monitoring said front buffer to detect when video information stored in said front buffer is outside of said application context; and
    a mitigation module configured for taking an action to mitigate an effect of said video information that is outside of said application context.

TABLE 4-continued

LISTING OF CLAIMS

18. The system of Claim 17, wherein said mitigation module is configured to execute an API call to force a rendering of said video stream back to said front buffer.

19. The system of Claim 17, wherein said monitor is configured for detecting when said gaming application has crashed by determining that said video stream has ended; terminating a user session implementing said virtual machine; and reinitializing another virtual machine to execute another instantiation of said gaming application.

20. The system of Claim 17, wherein said mitigation module is configured for minimizing exposure of a windows desktop in said front window.

Figure 13A:
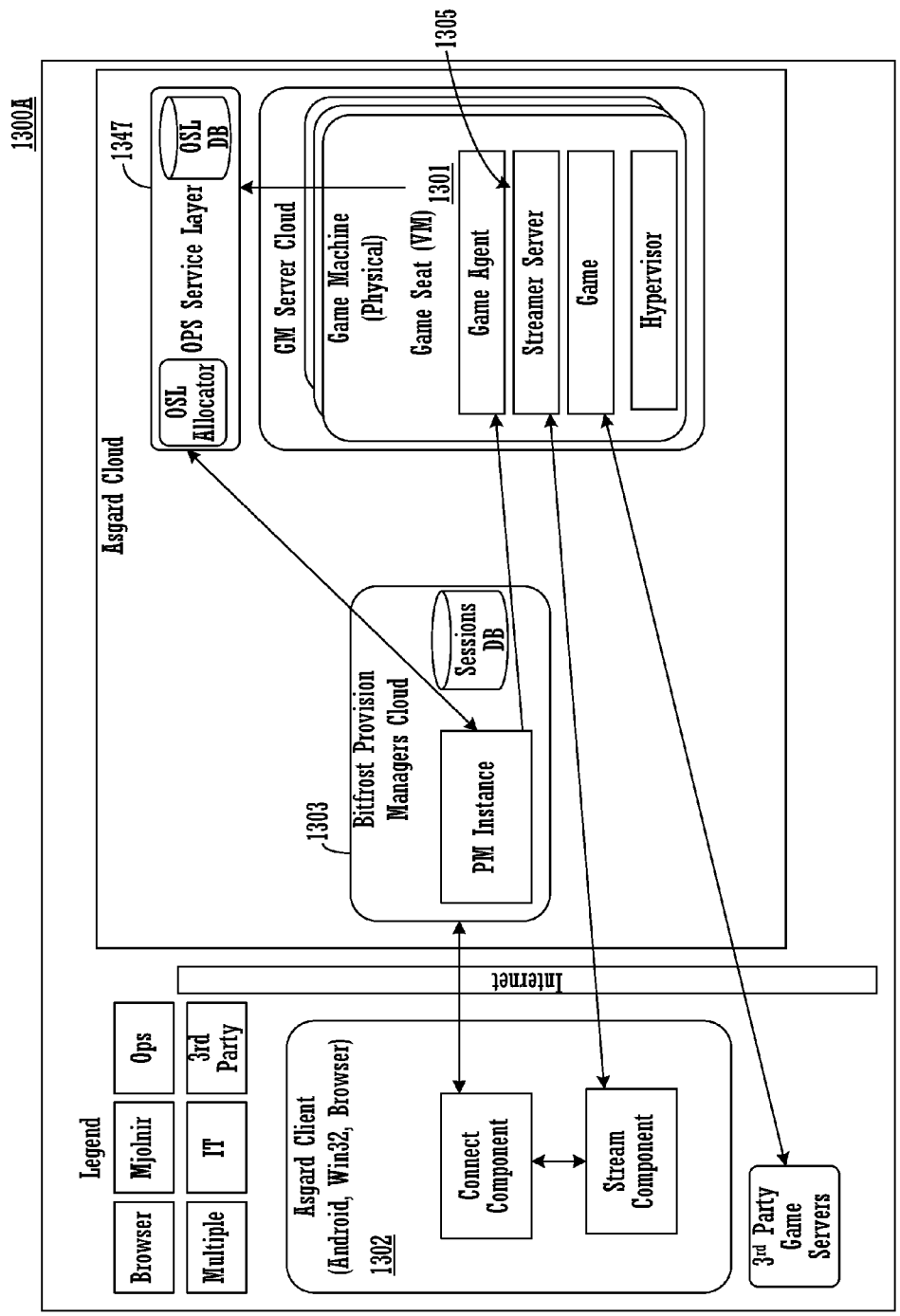
FIGS. 13A-O illustrate the implementation of a gaming platform providing cloud based virtualized graphics processing for remote displays, in accordance with embodiments of the present disclosure.
Figure 13B:
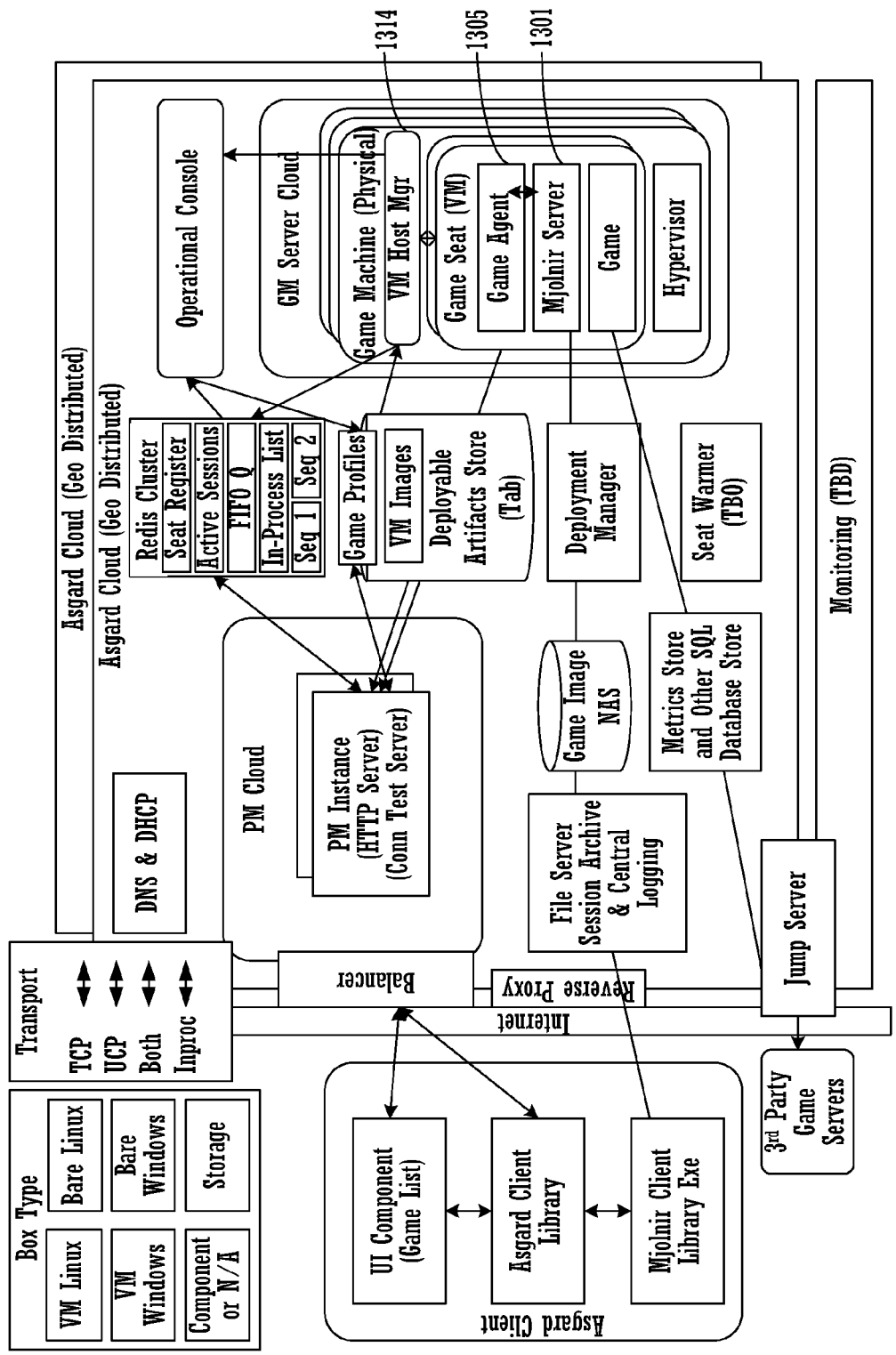
Figure 13C:
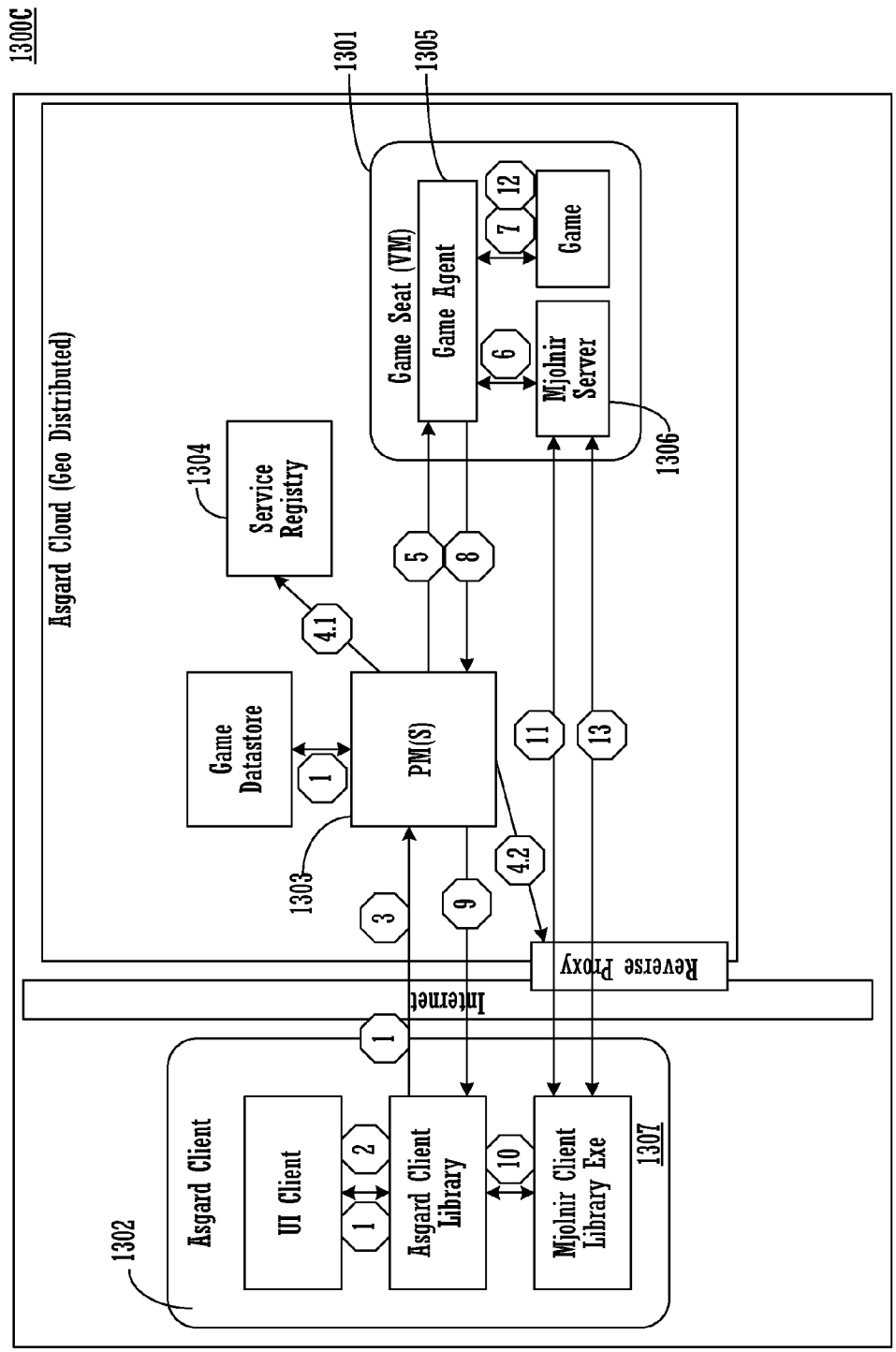
Figure 13D:
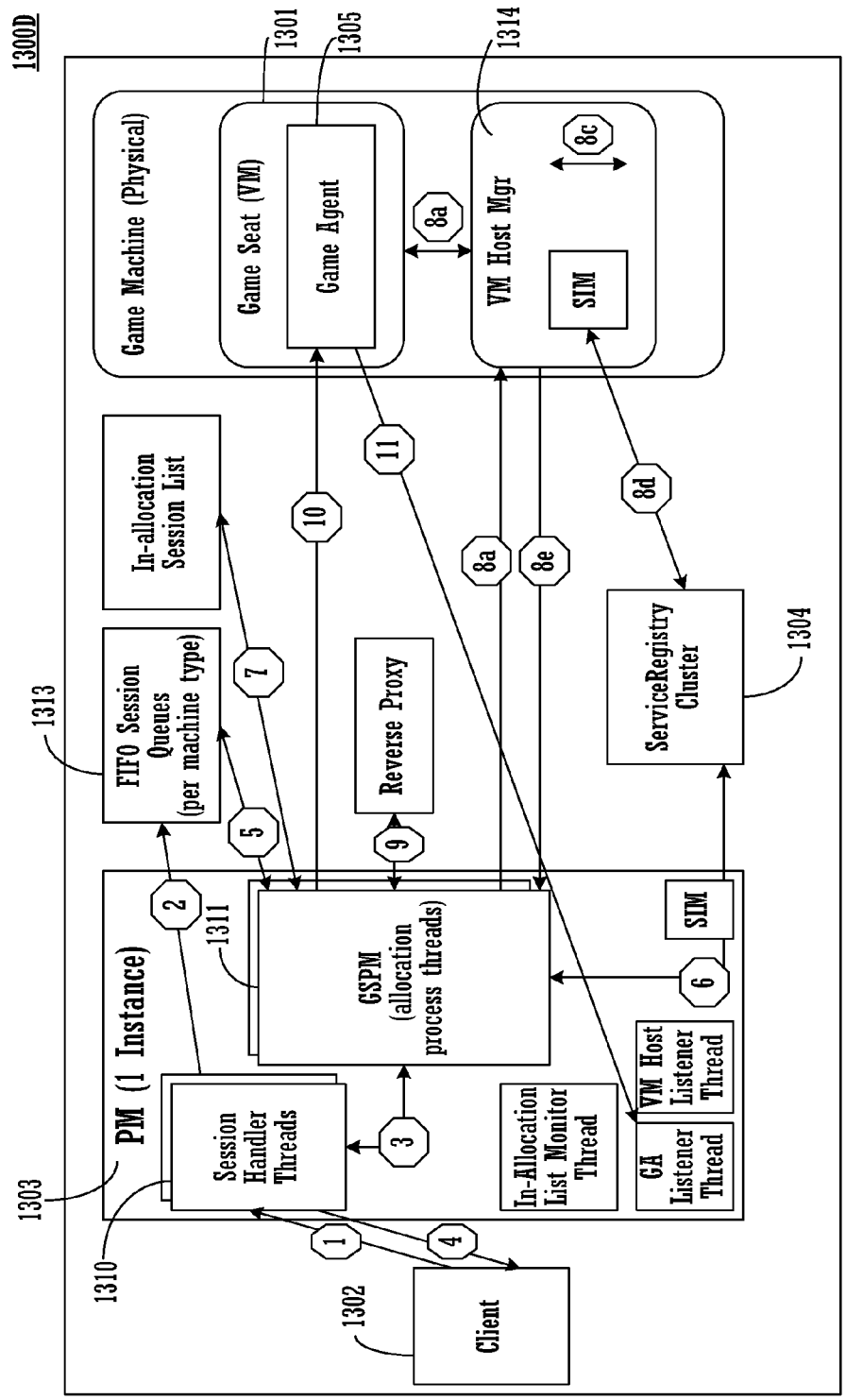
Figure 13E:
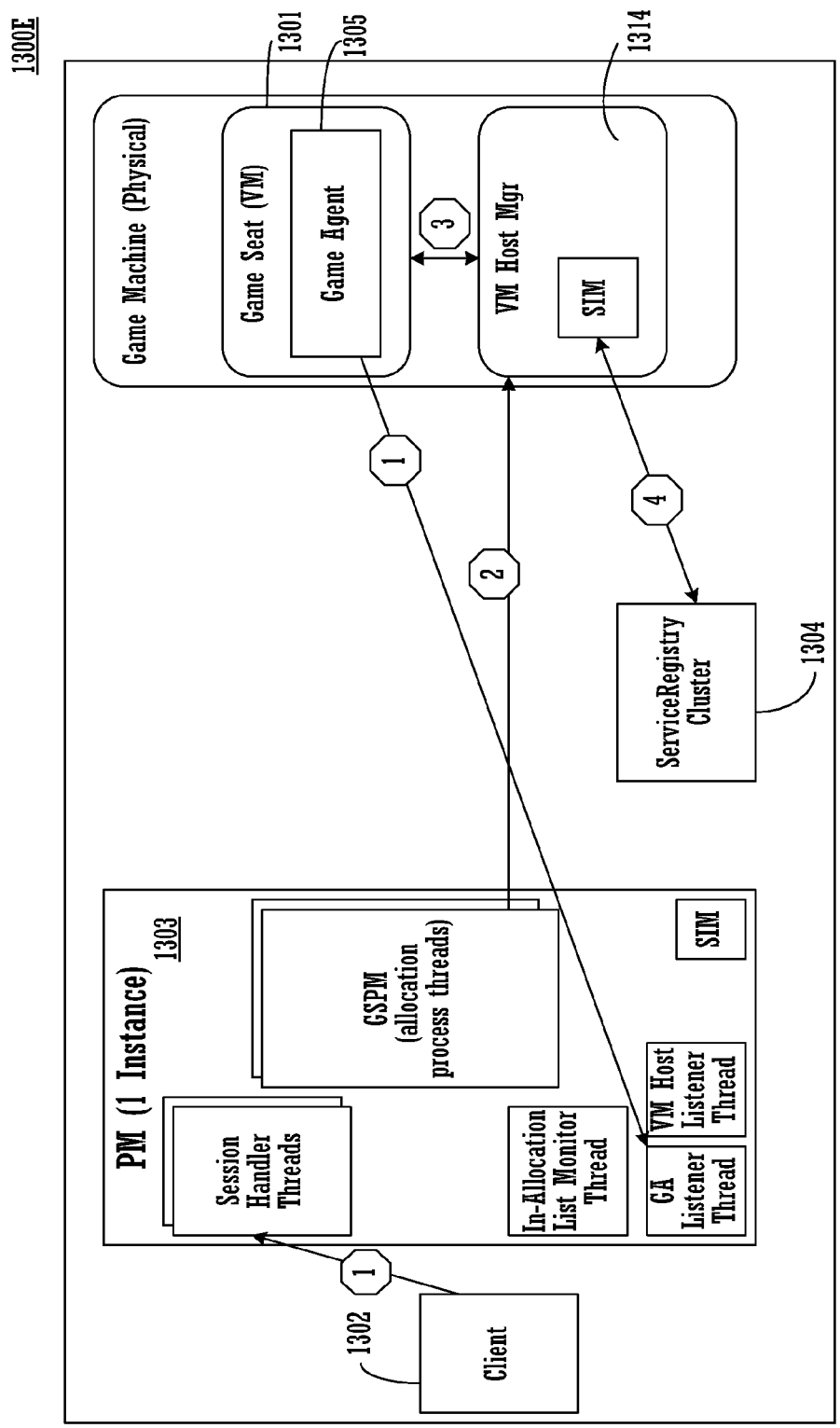
Figure 13F:
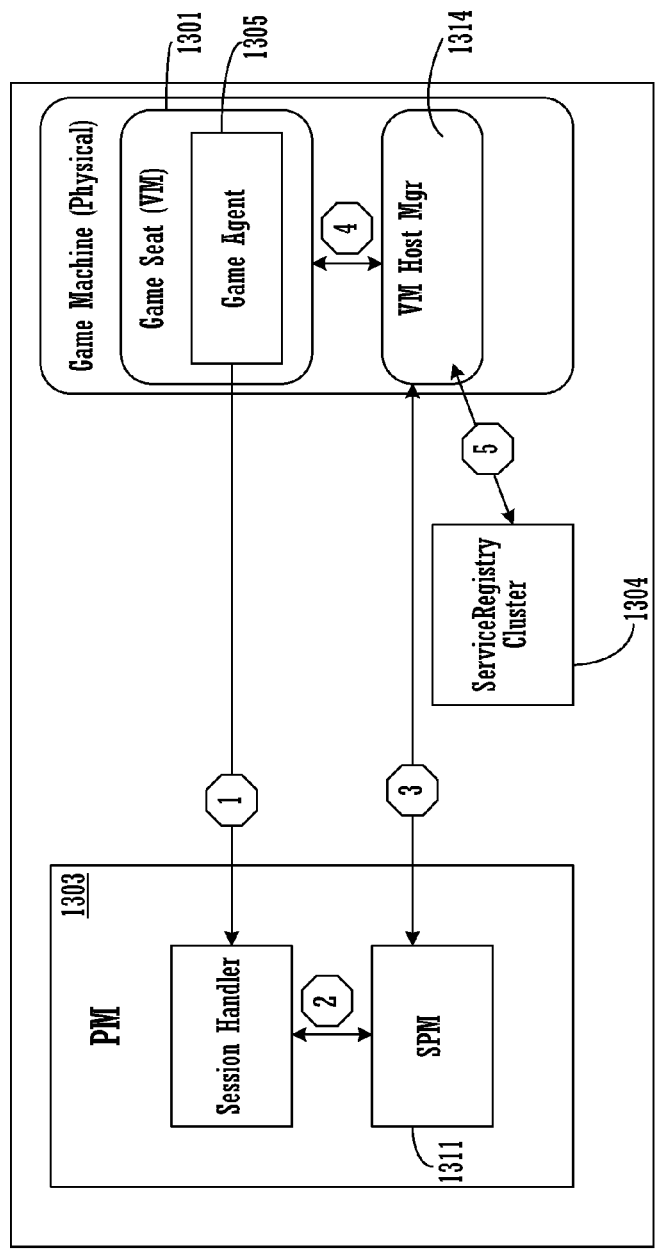
Figure 13G:
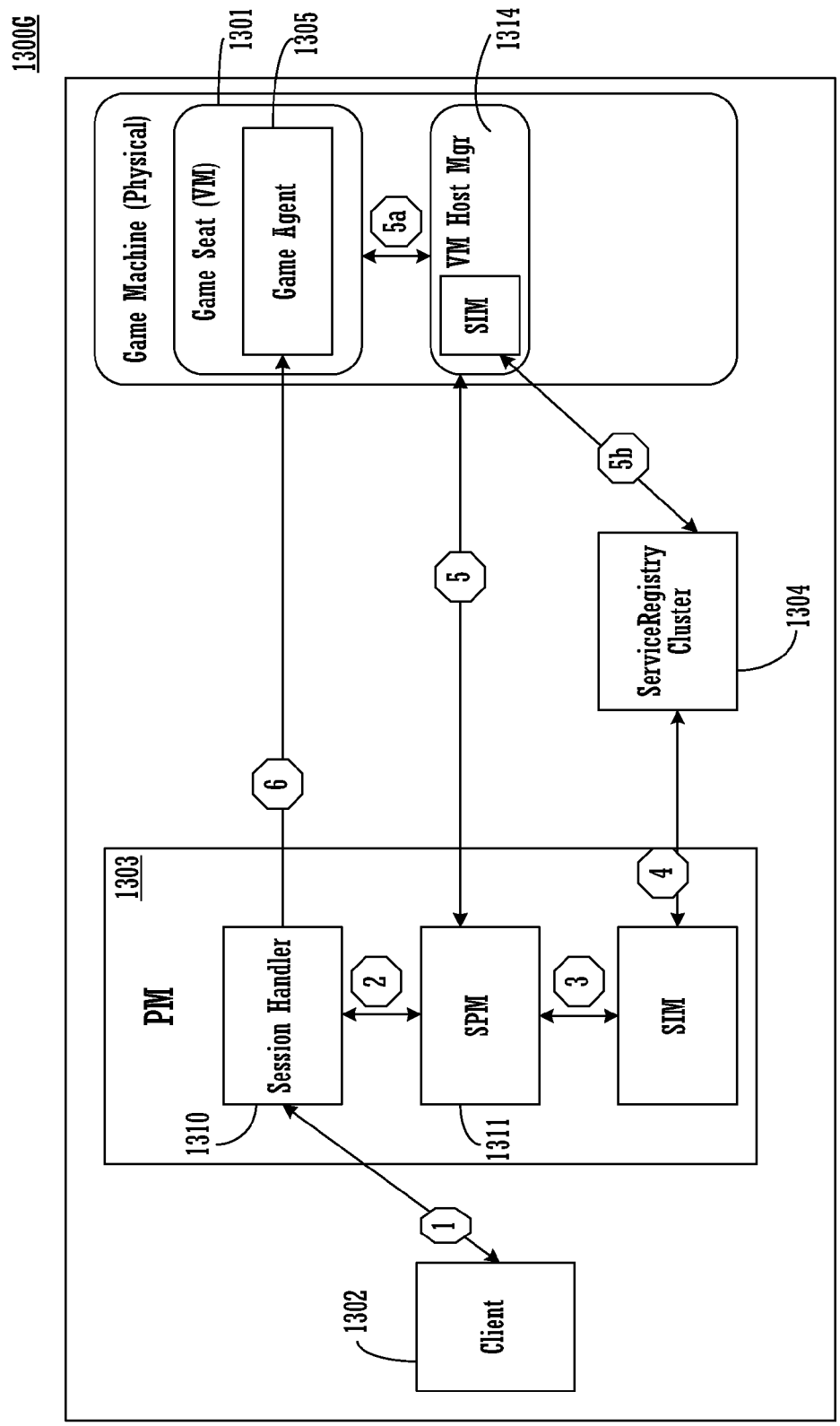
Figure 13H:
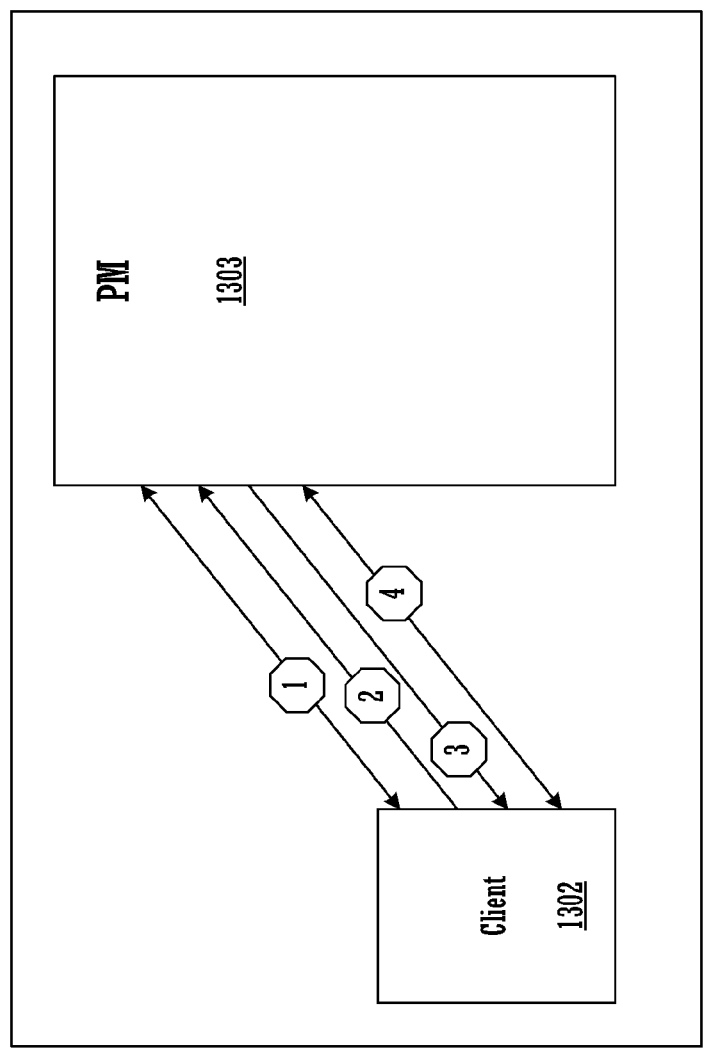
Figure 13I:
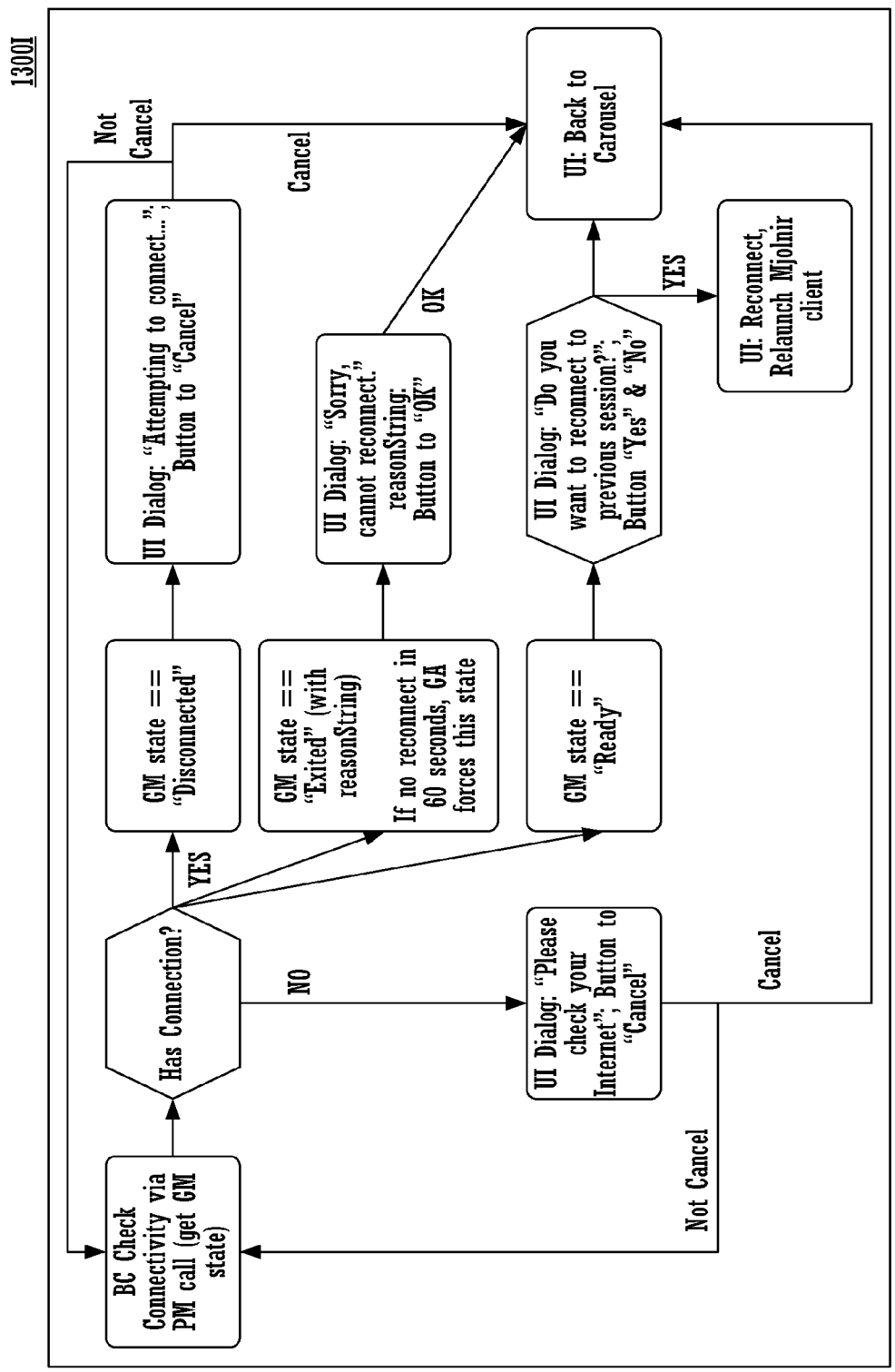
Figure 13J:
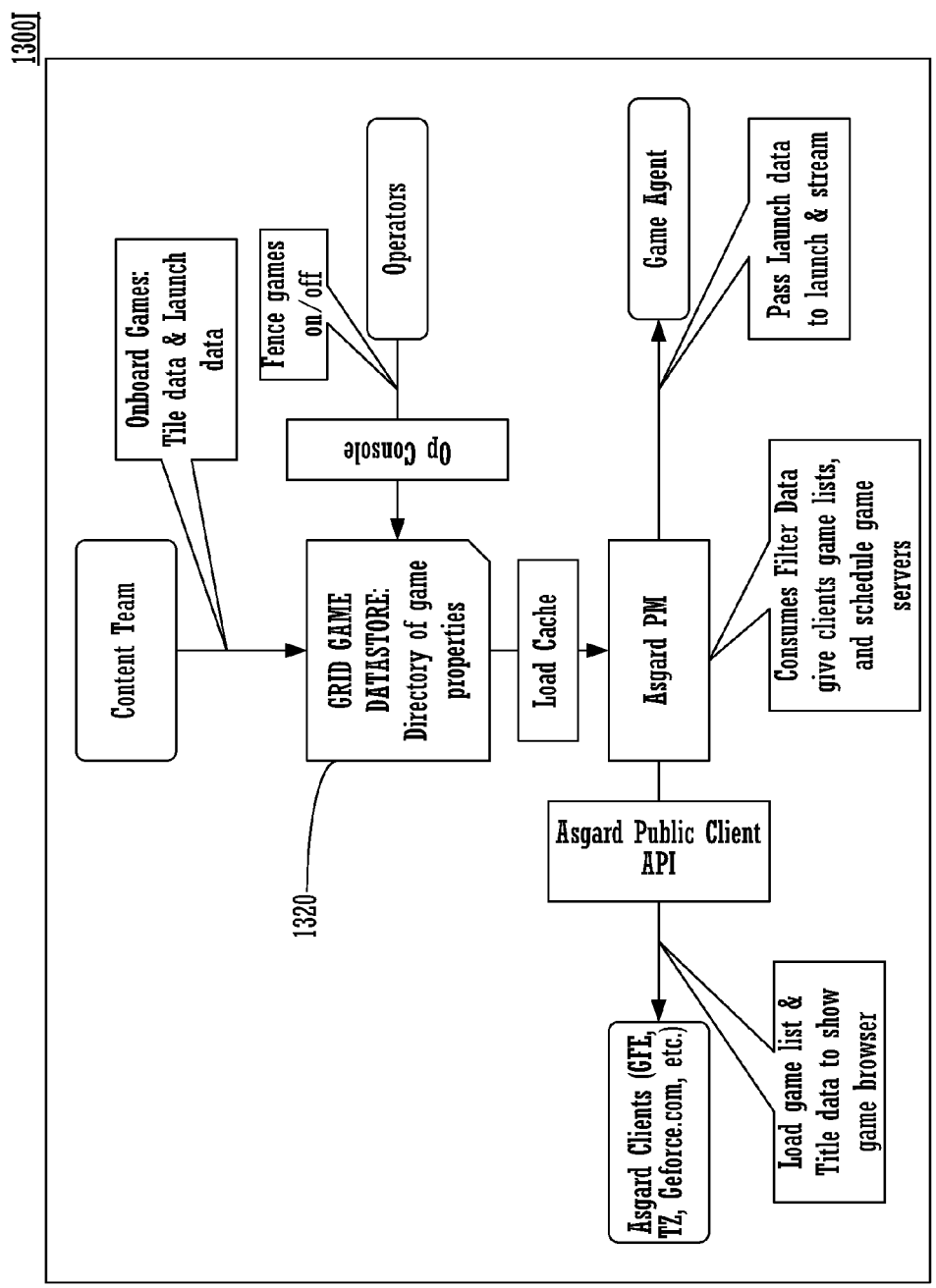
Figure 13K:
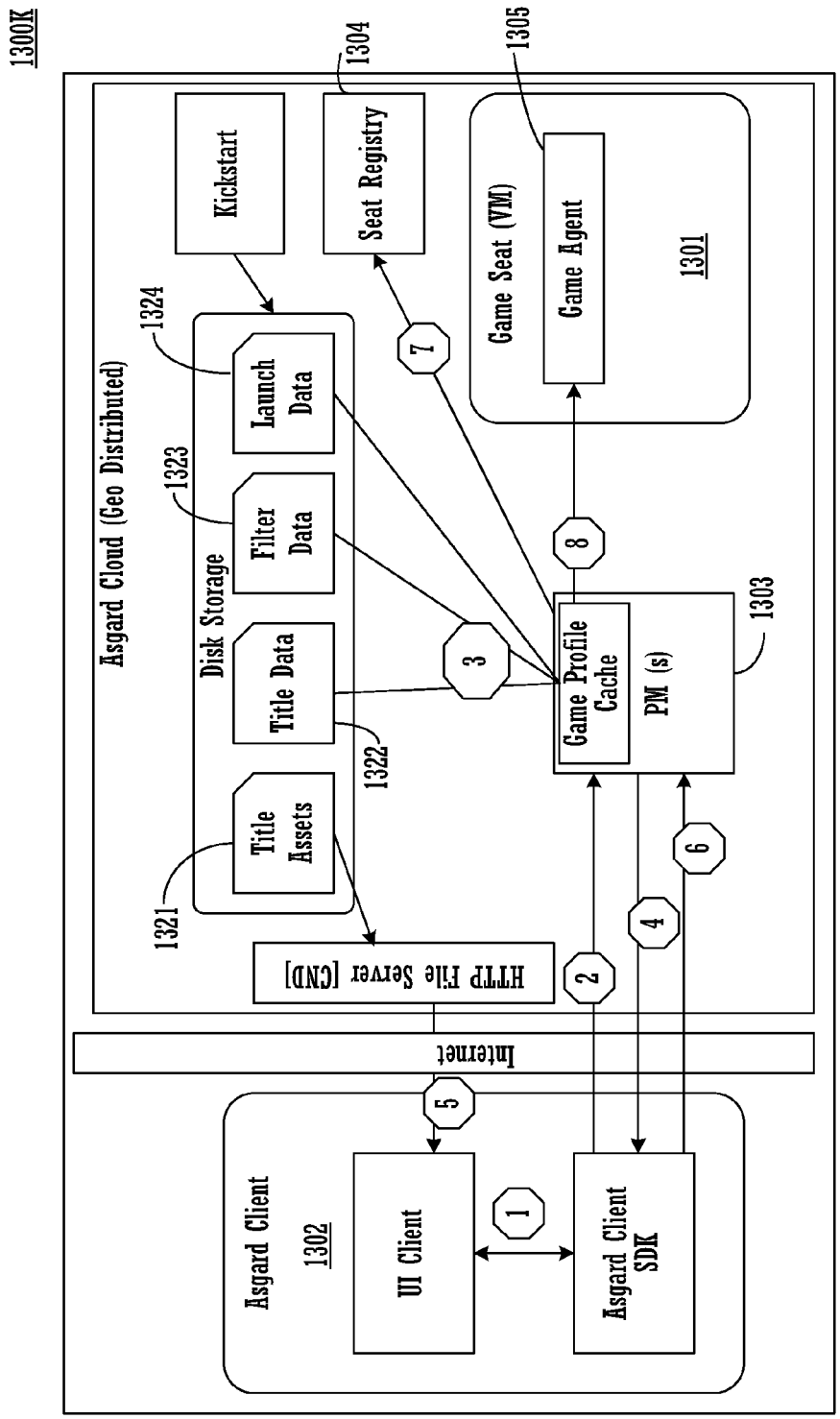
Figure 13L:
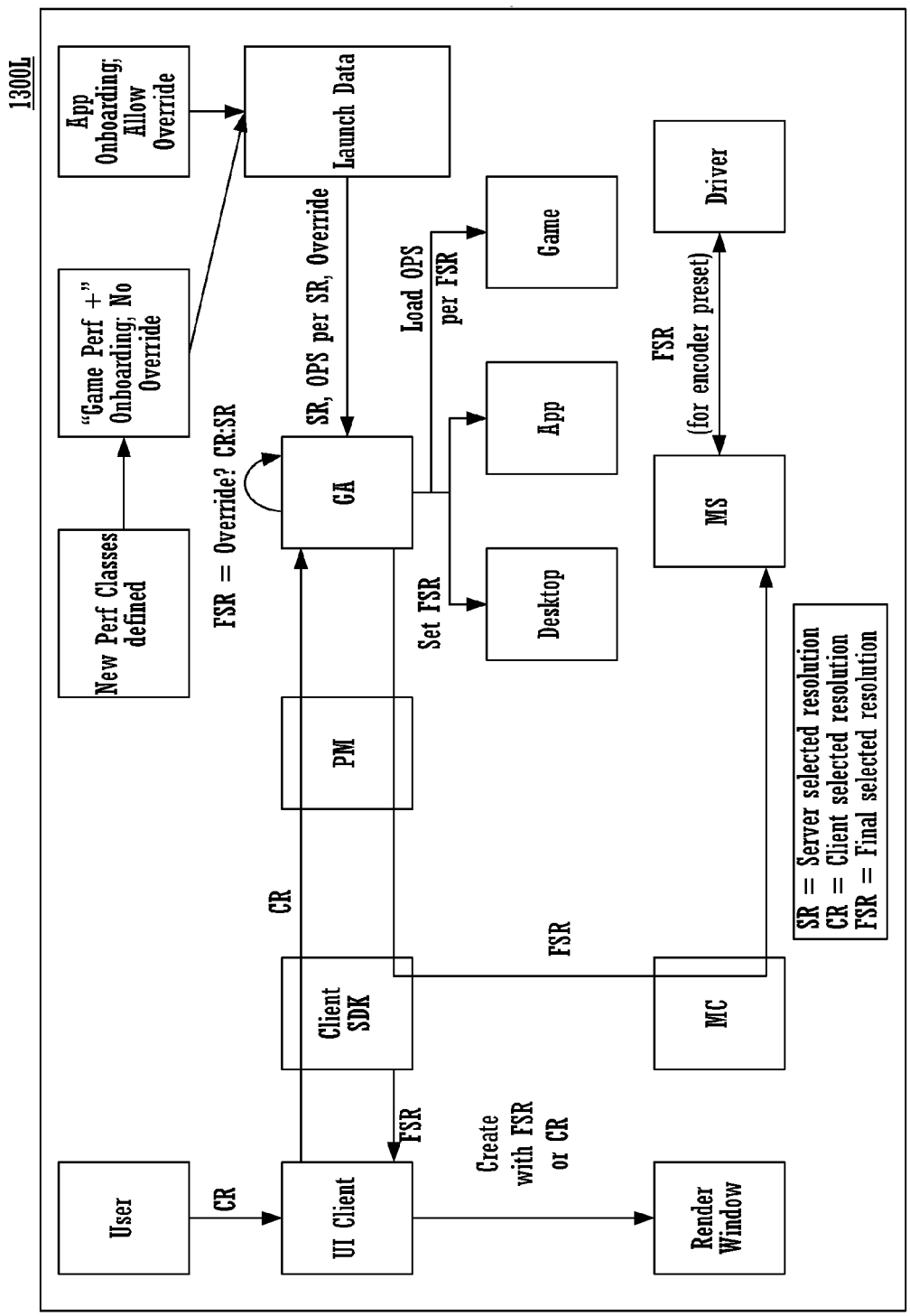
Figure 13M:
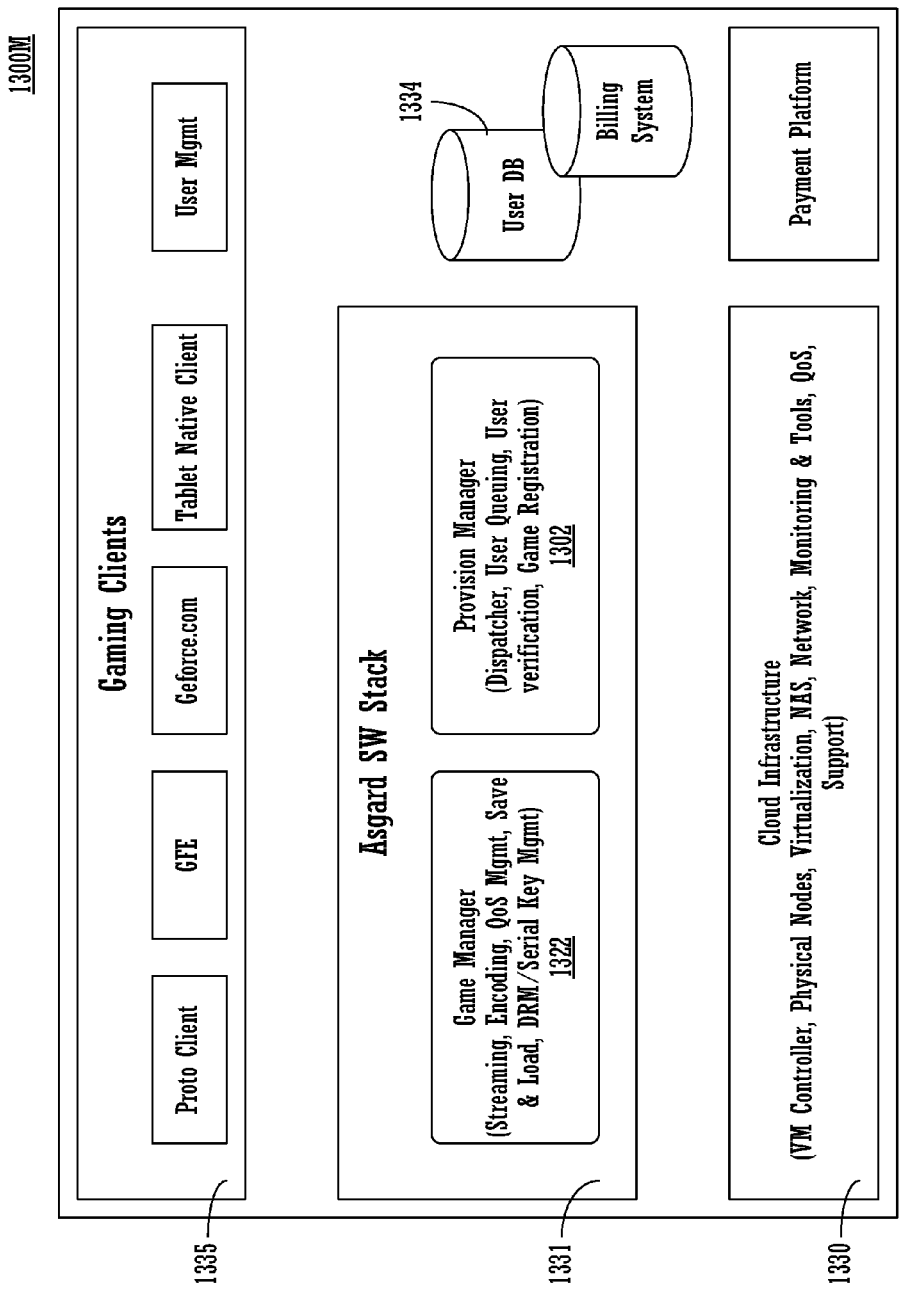
Figure 13N:
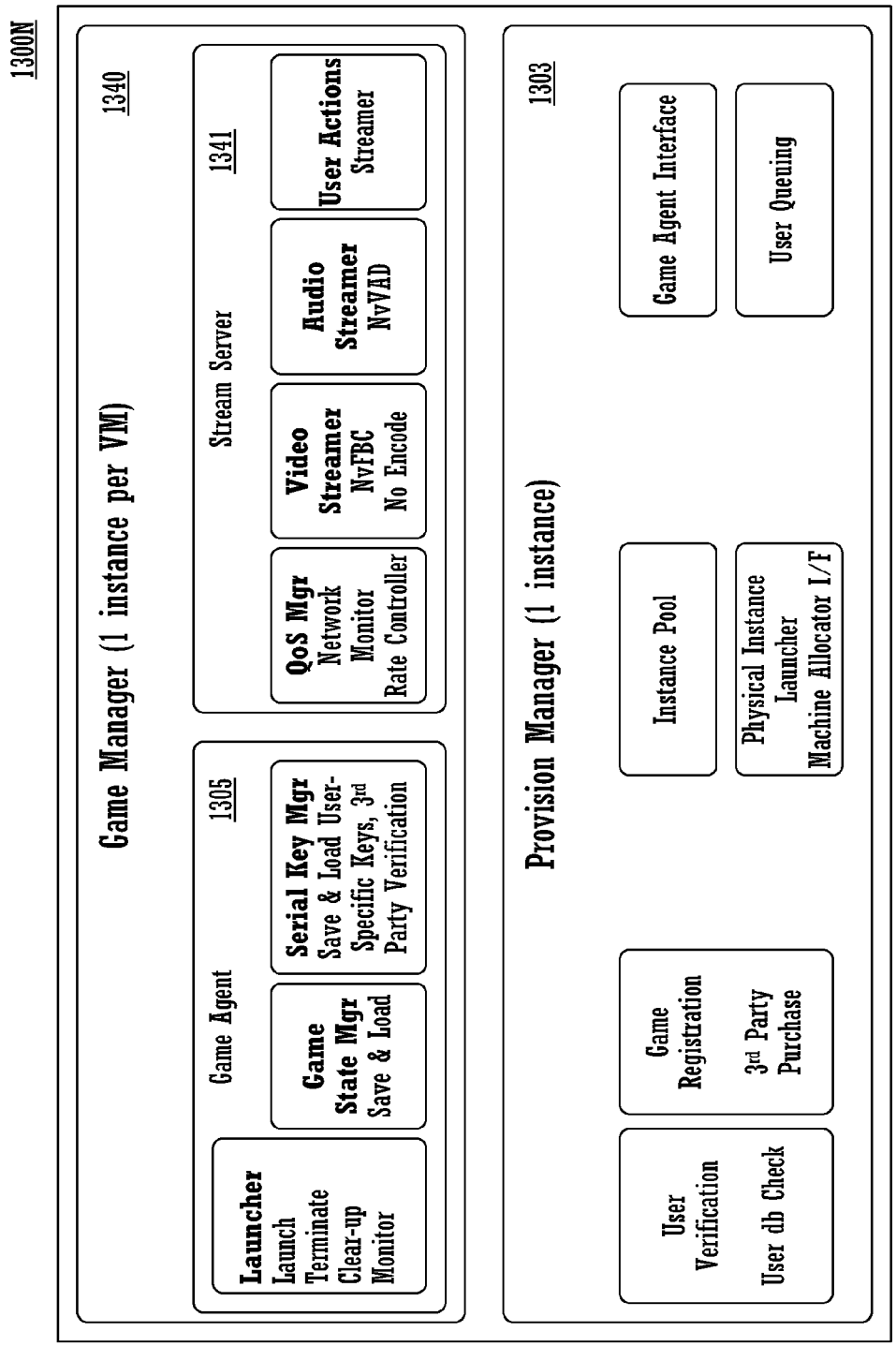
Figure 13O:
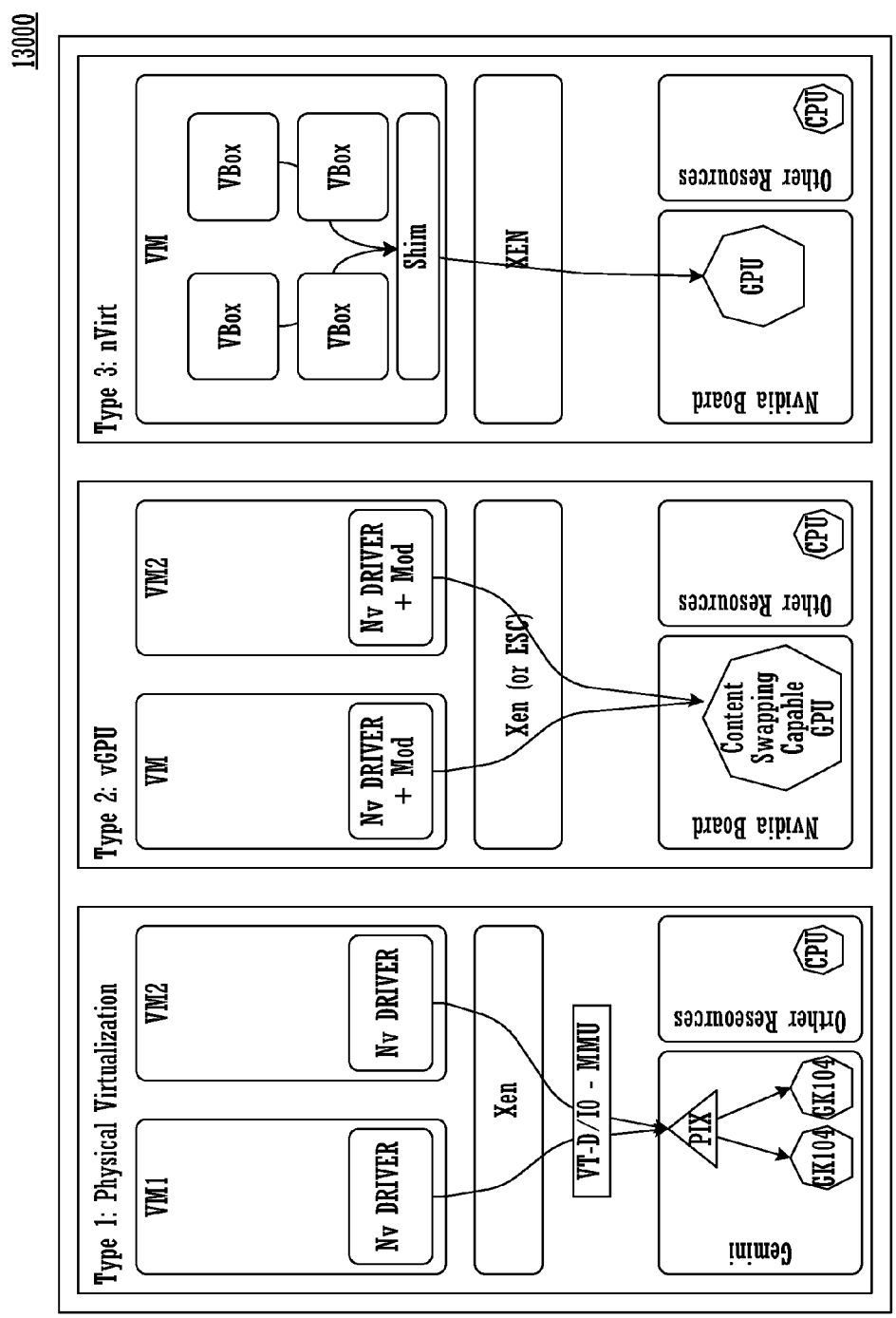

Methods and Systems for Dynamically Allocating Resources to Virtual Machines in a Gaming Platform Providing Cloud Based Virtualized Graphics Processing for Remote Displays FIGS. 13A-O illustrate the implementation of a gaming platform providing cloud based virtualized graphics processing for remote displays, in accordance with embodiments of the present disclosure. The gaming platform provides a complete gaming experience to connected end users. For instance, the gaming platform provides the necessary CPU and GPU processing powers through a corresponding virtual machine, and supplies a requested gaming application that the end user wants to play. In essence, end users connect with the gaming platform through user sessions in order to play supported gaming applications. The illustrations provided in FIGS. 13A-O provide further details and features first illustrated in architecture 400B of FIG. 4B. Though FIG. 513A-O refer to gaming applications, it is understood that the cloud based graphics processing platform is configured to support any type of application.

FIG. 13A is a block diagram of a system 1300A that provides cloud based graphics processing to end users, wherein a provision manager instantiates game seats or virtual machines with end users in gaming sessions, in accordance with one embodiment of the present disclosure. The provision manager 1303 coordinates with the client device 1302 to instantiate a game seat 1301 in relation to a requested application. The provision manager 1303 communicates with the Ops Service Layer 1347 to determine what performance level of game agent is needed for the requested application. Once the virtual machine is instantiated with the optimal amount of resources for playing the gaming application, the provision manager 1303 is configured to communicate with the instantiated game seat or virtual machine 1301 through the game agent 1305. The game agent 1305 is configured to instantiate the requested application. The streamer server 1306 communicates with the stream component 1307 on the client side 1302 to stream video data generated by executing the gaming application on the game seat 1301 to the client device 1302.

FIG. 13B is a network diagram 1300B illustrating the network connections between the components of the cloud based graphics processing system 400B, in accordance with one embodiment of the present disclosure.

FIG. 13C is a diagram 1300C illustrating the workflow for a setting up a standard game session between an end client 1302 and a game seat (VM) 1301 through a provision manager 1303, in accordance with one embodiment of the present disclosure. As shown, in step 1, a list of games is accessed. The provision manager 1303 (e.g., bifrost client) gets the list from a session manager, which in turn may obtain the list from a game datastore. At step 2, a request for game play is made by the client device 1302. At step 3, the request is delivered to the provision manager 1303, which coordinates the instantiation of a game seat 1301 in response to the request. In particular, at step 4, the provision manager 1303 communicates with the service registry 1304 to obtain an available virtual machine. The provision manager matches the resource capability of the virtual machine that is assigned with the recommended resource required by the requested gaming application to give the end user the best possible gaming experience. The service registry 1304 manages the plurality of virtual machines, and maintains the status for each of the virtual machines. As such, the service registry 1304 understands which virtual machines are actively used or instantiated, and which virtual machines are idle and ready to be assigned.

At step 5, the provision manager 1303 communicates with the assigned game seat 1301 via a game agent 1305. At step 6, handshaking is performed to instantiate the game seat 1301. At step 7, the game seat 1301 installs the gaming application. At step 8, the user session is active. At step 9, the game seat opens the ports necessary to stream video from the gaming application to the end client 1302 via the provision manager 1303. At step 11, a communication session is established between the mjolnir server 1306 at the game seat 1301 and the mjolnir client 1307 at the end client 1302. The mjolnir servers provide the encoding and packetization of information. For instance, mjolnir server 1306 is configured to encode and packetize graphics video data that is generated by the game seat (VM) 1301 through the execution of a gaming application. At step 12, the game seat 1301 starts execution of the gaming application. At step 13, the mjolnir server 1306 starts streaming the video from the gaming application to the mjolnir client 1307 at the client device 1303.

FIG. 13D is a diagram 1300D illustrating the workflow for allocation of resources (e.g., CPU cores, virtual GPUs, GPUs, memory, etc.) to a game seat 1301, in accordance with one embodiment of the present disclosure. The process outlined in FIG. 13D begins with the generation of a GUID sessionID, and a request for a gaming application with the ID. The client device 1303 communicates with the provision manager 1303. At step 2, the session handler thread 1310 in the provision manager 1303 checks to make sure the sessionID is in the active session store (recover if exists); validates the gaming application, check machine type, add request to the REDIS session store and FIFO queue 1313 based on the machine type of the game seat 1301. There is one FIFO queues for each machine type of virtual machine. 1312 are At step 3, one of the allocation threads in the game session provision manager (GSPM) 1311 is woken up. At step 4, the session handler thread 1310 returns the session object to the client device 1303. At step 5, the GSPM thread wakes up; gets a GLOBAL lock on the FIFO Queues (which checks for a deal lock and clears, if found); and reads the first item from each queue. At step 6, the GSPM 1311 allocates the earliest requested session by removing the first relevant free/hot seat from the service registry 1304 (through SIM). At step 7, the allocated session is moved from the FIFO queue 1313 to the In-Allocation List, and global lock is released.

In FIG. 13D, at step 8, the GSPM 1311 confirms with the VM Host Manager that the seat is OK, through the VMHost API: SeatAllocationMessage. In particular, at a), the GSPM requests the VM Host Manager 1314; at b) the VM Host Manager 1314 confirms availability of the seat internally (make sure no fence request is outstanding); at c) the VM Host Manager 1314 confirms the health of the seat; at d) the VM Host Manager 1314 puts the game seat 1301 in the allocated bucket on the Service Registry 1304 (via its own SIM); and at e) the VM Host Manager 1314 replies to the SPM that everything is OK.

In FIG. 13D, at step 9, the GSPM 1311 allocates the port with Reverse Proxy for this game seat 1301. At step 10, the GSPM 1311 handshakes with the game agent 1305 on the allocated game seat 1301, and passes game profile information, ports, etc. at step 11, the game agent 1305 reports back to the provision manager 1303 on the game agent listener (GA-Listener) thread that the game seat is ready for client connection.

FIG. 13E is a diagram 1300E illustrating the workflow for the release of a game seat 1301, in accordance with one embodiment of the present disclosure. At step 1, the client device 1303 or game agent 1305 provides notification that the game application is finished. At step 2, the Session Handler Thread 1310 or the GA Listener Thread in the provision manager 1303 makes an API call to release the game seat (e.g., calls "GameSeatProvisionMgrAPI:release", which calls the VM Host Manager 1314 through another API call (e.g., VMHost API:SeatReleaseMessage). At step 3, the VM Host Manager 1314 recycles the virtual machine. At step 4, once the virtual machine comes back, the VM Host Manager 1314 puts the virtual machine back into the hot/free bucket on the Service Registry 1304.

FIG. 13F is a diagram 1300F illustrating the workflow for handling an unrecoverable error during a game session, in accordance with one embodiment of the present disclosure. At step 1, the game agent 1305 provides notification of an unrecoverable error, or that a game seat 1301 BSOD has occurred, or some other series error occurs (e.g., provision manager times out on game agent communication, etc.). At step 2, the provision manager 1303 calls the SPM or game seat provision manager 1311 through an API call (e.g., "GameSeatProvisionMgr API: release+error". At step 3, the SPM 1311 calls the VM Host Manager 1314 through an API call (e.g., "VMHost API: fence+release"). At step 4, the VM Host Manager 1314 marks the game seat 1301 as fenced, and performs a reset to other appropriate actions. At step 5, the VM Host Manager 1314 puts the game seat 1301 back in the appropriate bucket (e.g., error/fenced) on the Service Registry 1304.

FIG. 13G is a diagram 1300G illustrating the workflow for the allocation of a game seat 1301, in accordance with one embodiment of the present disclosure. At step 1, the client device 1303 requests a gaming application from the gaming platform, or the cloud based graphics processing system. At step 2, the provision manager 1303 calls the SPM 1311 through an API call (e.g., "GameSeatProvisionMgr API: Allocate"). At step 3, the SPM 1311 calls the Service Registry 1304 through the ServiceRegistry Interface Module and the SIM API, using the Service Registry Schema. At step 4, the Service Registry 1304 returns a "NO" hot game seat, which indicates that no game seat is available. At step 5, the SPM 1311 confirms with the VM Host Manager 1314 that the seat is OK, through an API call (e.g., "VMHost API: SeatAllocatoinMessage"): wherein at a) the VM Host Manager 1314 confirms the availability of the seat; at b) the VM Host Manager 1314 puts the seat in t allocated bucket on the Service Registry 1304 (via its own SIM); and at c) the VM Host Manager 1314 replies to the SPM 1311 that everything is OK. At step 6, the provision manager 1303 handshakes with the game agent 1305 on the allocated game seat 1301.

FIG. 13H is a diagram 1300H illustrating the workflow for communication between the client device 1303 and the provision manager 1303, in accordance with one embodiment of the present disclosure. At step 1, the client device 1303 makes an initial connection with the provision manager 1303 using the hypertext transfer protocol (HTTP). The provision manager 1303 responds and performs allocations, etc. At step 2, the client device 1303 sense a user datagram protocol (UDP) message saying "what is my status?". This is performed periodically. At step 3, the provision manager 1303 sends a UDP response with session status. At step 4, if there is no UDP response from the provision manager 1303 within a certain number of seconds (e.g., Y), then the client device 1303 will execute an HTTP call to get a session status.

FIG. 13I is a diagram 1300I illustrating the workflow for a session reconnect, in accordance with one embodiment of the present disclosure. As shown, upon successful connection between the client device and an existing game seat, the mjolnir client is relaunched on the client device.

FIG. 13J is a diagram 1300J illustrating the features of a game data store 1320. The game data store 1320 provides access to a plurality of gaming applications to the virtual machines in a cloud based graphics processing system (previously described). In particular, the data store 1320 interacts with client devices and with game agents of the virtual machines. The data store 1320 sends a game list of supported gaming applications to each of the client devices. Also, each region/DC is able to maintain its own list of games (including game fencing). Each operator/MSO is able to maintain its own list of games (including game fencing). And client devices are able to load the game list from the cloud gaming platform that provides the gaming sessions.

As shown the game data store 1320 provides game profiles for each of the gaming applications. For instance, the game profile includes title data 1322; title assets 1321; filter data 1323; launch data 1324; and fence data. The game title data 1322 (shown in FIG. 13K) include a Game ID (unique); Build ID; published date (to the cloud); screenshots (e.g., player 1) and videos (URL links) (e.g., onboarded as file names); single player/multi-player capabilities; languages supported; game name, publisher name, genre, description of the game; game release data, publisher's URL; URL for support or additional promotions (e.g., GeForce.com URL); cover art or link to cover art (e.g., on boarded as file names); rating/age requirements; buy parameters (e.g., link to purchase path); and user input idle warning limit (e.g., in seconds).

In addition, the title assets 1321 include binary/downloadable assets pointed to by the title data URLs. The filter data 1323 includes regions allowed, list of hardware configuration supported and VM images, to include the OS/driver, and compatible input device. The launch data 1324 includes install script, launch script, keyframe type and star frame, start time, game process name and aux processes, POPS per hw, game setting script/exe, game disk I/O profile, user input idle maximum limit (in seconds). The fence data includes game on/off (zone wide or user/account level), and game playtime limit (e.g., global).

FIG. 13K is a diagram 1300K illustrating a game profile data flow. At step 1, the client device (through a user interface to an end user) requests a game list. At step 2, the cloud client SDK gets the game list from the one or more provisioning mangers 1302. At step 3, the provision manager 1303 gets non-fenced game list by checking cached Title and Filter data (e.g., implemented as folders), previously described. The game profile data structure includes the following: "games/release" indicates which gaming applications are playable; "games/fenced" indicates which gaming applications are unavailable; and "games/staging" indicates which gaming applications are currently being staged. At step 4, the provision manager returns filtered Title Data to the client device 1303. At step 5, the UI on the client device 1303 loads the Title Assets off the HTTP file servers. At step 6, the game request is sent to the provision manager 1303 from the client device 1303. At step 7, the provision manager 1303 checks the Filter data for capable game seats and allocates from the game seat registry 1304. At step 8, the provision manager 1303 sends the Launch Data to the game agent 1305 on the obtained game seat 1301. At step 9, a normal game launch and session initialization is performed.

FIG. 13L is a diagram 1300L illustrating dynamic resolution for gaming applications and applications at session start, in accordance with one embodiment of the present disclosure.

FIG. M is a block diagram 1300M illustrating the components of each layer utilizing a cloud based virtualized graphics processing system, in accordance with one embodiment of the present disclosure. For instance, the cloud infrastructure 1330 comprises a VM controller, physical nodes, virtualization, NAS, network, monitoring and tools, quality of service (QoS), support, etc. The software stack layer 1331 implements the cloud based graphics processing service (e.g., gaming platform) and includes a game manager 1332 which performs streaming, encoding, QoS management, save and loading, DRM/Serial key management). The software stack layer 1331 includes the provision manager 11302 which includes a dispatcher, user queuing, user verification, and game registration. The gaming client layer 1335 includes various functional components, includes a proto client, a GFE, one or more links to web content (e.g., GeForce.com), a tablet native client, and user management. Also, a database 1334 is configured to store persistent data used to create virtual machines that are custom to a user. For instance, the database 1334 stores user profile information, and game save information, as previously described.

FIG. N is a block diagram illustrating a game manager 1340 and a provision manager 1303, in accordance with one embodiment of the present disclosure. As shown, one instance of a game manager 1340 is provided within a virtual machine or game seat 1301. The game manager 1340 manages the gaming application launched within the game seat 1301, and includes a game agent 1305. The game agent 1305 includes the following: a launcher which performs launching of applications, termination of applications, cleanup, and monitoring of applications; a game state manager, which performs saying and loading operations; and a serial key manager. The game manager 1340 also includes a stream server 1341, which manages the outgoing streams. The stream server 1341 includes which further includes a QoS manager, a video streamer, and audio streamer, and user actions streamer.

There is one instance of a provision manager in a network of cloud based virtual machines serviced by a plurality of servers providing a server cloud 461A-N. the provision manager includes a user verification module, a game registration module, a physical instance launcher, an instance pool, a game agent interface, and user queuing.

FIG. 130 is a block diagram of various implementations of GPU virtualization for providing cloud based graphics processing for remote displays. In Type 1, there is physical virtualization of GPUs. That is, every virtual machine (e.g., VM1 and VM2) is assigned to one physical GPU, such as, a chipset, through a virtualization interface (e.g., XEN virtual machine interface). In Type 2, there is virtualization of GPUs. That is, each virtual machine (e.g., VM1 and VM2) is assigned to a virtual GPU through a virtualization interface. In Type 3, there is again virtualization of GPUs, but through a pseudo virtual machine. That is, a virtual machine is itself split into one or more sub virtual machines (e.g., VBox). Each of the sub virtual machines is assigned to virtual GPU.

FIGS. 14A-H are diagrams illustrating a system and method for dynamically allocating and assigning game seats in a cloud based gaming/application environment or gaming platform, in embodiments of the present invention. Again, the gaming platform provides a complete gaming experience to connected end users. For instance, the gaming platform provides the necessary CPU and GPU processing powers through a corresponding virtual machine, and supplies a requested gaming application that the end user wants to play. In essence, end users connect with the gaming platform through user sessions in order to play supported gaming applications. The illustrations provided in FIGS. 14A-H provide further details and features first illustrated in architecture 400B of FIG. 4B and further illustrated in FIGS. 13A-O. Though FIG. 514A-H refer to gaming applications, it is understood that the cloud based graphics processing platform is configured to support any type of application.

When allocating game seats, the virtual machines need to be managed. For instance, the virtual machines need to be started and/or instantiated. An active virtual machine needs to be managed and advertised throughout the network as to its availability and capabilities. The virtual machine needs to be recycled after the application is finished, or when the virtual machine goes "bad", or for any other reason. Management of the virtual machine is related to the specifics of the virtual machine, and not necessarily to the application running on the virtual machine, which is related to managing applications.

On the other hand, the management of applications includes managing requests to play a gaming application, as previously described. The management of applications includes accepting the request, matching the request to suitably resourced game seats by knowing about application requirements for task execution, providing feedback about the play initialization process, establishing a game session, and terminating a game session.

In particular, a user session manager runs on portals or the machines that accept user requests, including the provision manager 1302. In addition, the VM manager or VM Host Manager 462 knows how to handle virtual machines, but does not know about the application specifics. The seat registry 1304 provides a space where game seats are advertised, and a place where the allocation and allocation status of game seats are managed (taken for allocation, and returned for later allocation).

Figure 14A:
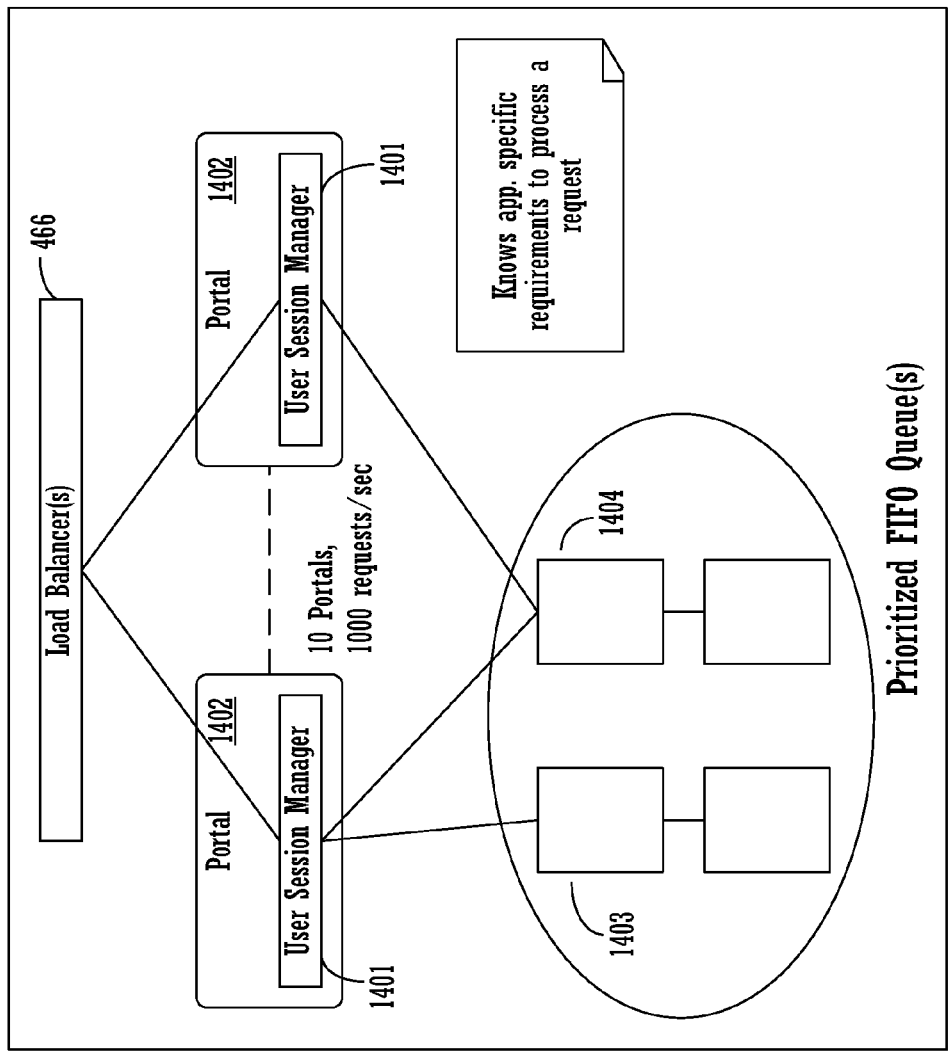

FIG. 14A is a diagram 1400A illustrating the processing of an incoming request, in accordance with one embodiment of the present disclosure. As shown, the load balancer 466 receives the incoming request from an end user or client device 1302. There are many end users and potentially bursts of requests, and only a limited number of user session managers located in the portal(s) 1402. In order to provide progress updates to the client device 1302, after accepting a request, the user session manager 1401 puts a request into a prioritized FIFO queue from wherein it is asynchronously processed. As shown in FIG. 14A, requests are placed into FIFO queues, which are arranged by performance class. That is, each queue is associated with a particular game seat performance class (high, medium, low resource capabilities). For example, queue 1403 may be associated with the high performance class, and the queue 1404 may be associated with the medium performance class. In particular, depending on the application requirements, one or more performance classes of virtual machines may service that application. For example, the application may run on the highest powered virtual machine and give the best overall gaming experience, but may also run on a medium powered virtual machine, and still give a satisfactory gaming experience.

Assigning a game seat of a particular performance class will depend on various factors. For instance, the user requirements are considered, such as, what application does the user want to execute. In addition, resource requirements for the request are considered, such as, what requirements are necessary to execute the application (e.g., CPU, GPU, memory, bandwidth requirements. In addition, the process used for setting up a game session is considered, and when the anticipated game session termination is also considered.

Figure 14B:
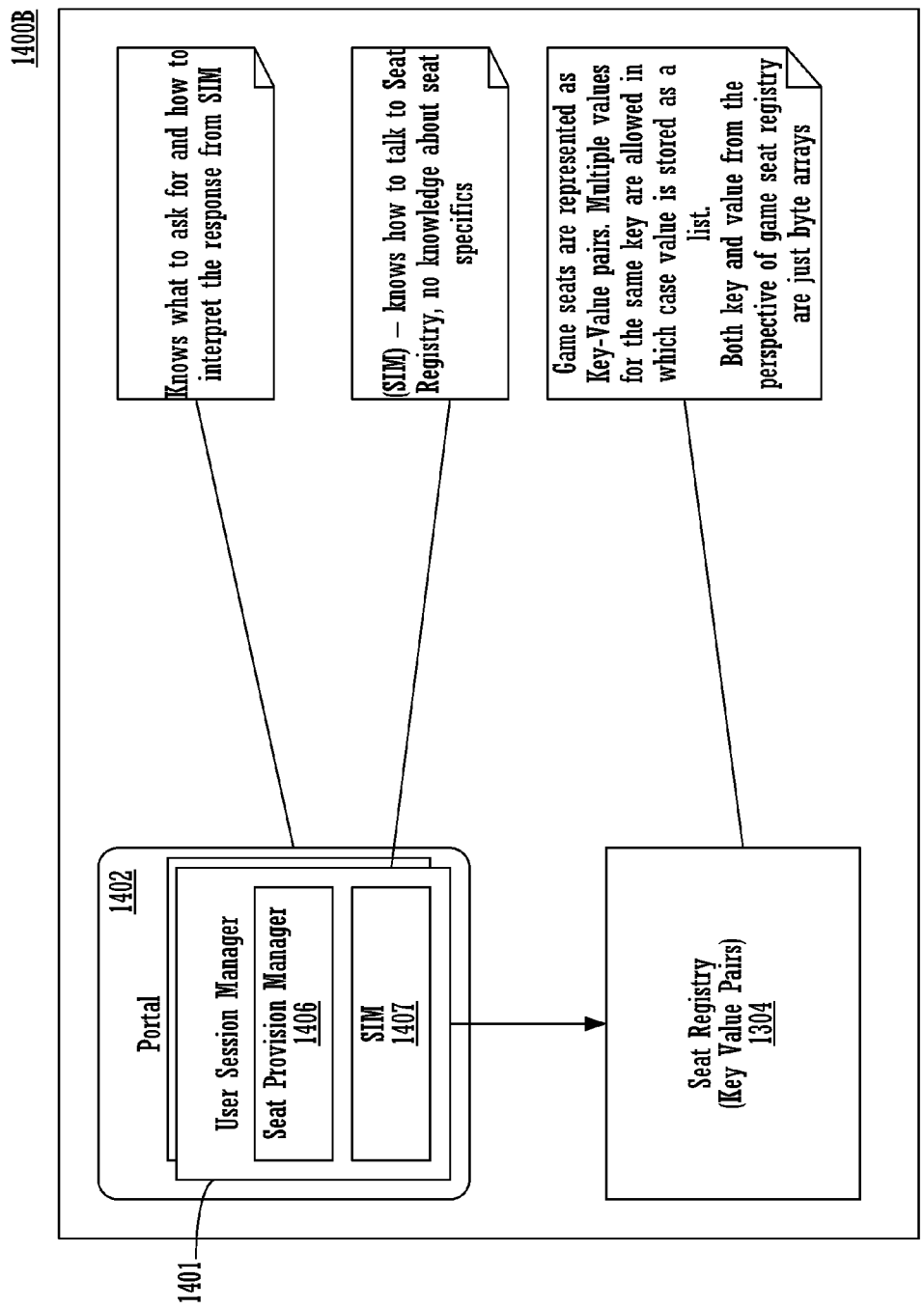

FIG. 14B is a diagram 1400B illustrating the further processing of incoming requests to execute an application, in accordance with one embodiment of the present disclosure. In a portal 1402, the user session manager understand the requested application specifics and asks for a service or game seat that can fulfill application specific requirements. In particular, the user session manager 1401 talks to the seat provision manager 1406 and provides parameters for the service being requested. The seat provision manager 1406 understand how to interpret the request and translate it into a SIM request that is handled by the SIM module 1407. The SIM module 1407 talks to the seat registry 1304 using a key provided by the seat provision manager 1406, retrieves the value, and returns it to the seat provision manager 1406. The seat provision manager 1406 then interprets the value and returns it to the user session manager 1401. In particular, game seats are represented as key-value pairs.

From the seat registry 1304 perspective, all entries are key-value pairs. In addition, multiple values for the same key are allowed in which case the value is stored as a list. From the seat provision manager 1406 perspective, keys are used to retrieve end point virtual machines that are capable of performing certain tasks. In a key-pair, the key takes the form of "/SeatFree/performance_class/". An example key includes "Seat/Free/Medium/" which indicates that a virtual machine is capable of performing "medium" level of services. In a key-pair, the value may take on the following form as an example: 10.0.172.1.192.168.1.1 at 10.0.0.1. This value indicates that this virtual machine lives on the management host with IP address of 10.0.0.1.

FIG. 14C is a diagram 1400C illustrating seat register entries for request processing. There are four distinct buckets to which a virtual machine or game seat is registered. A hot bucket 1410 includes a list of seats that are available or free, and assigned game seats. A booting bucket 1411 includes a list of game seats that are currently booting up. A fenced bucket 1412 includes a list of game seats that are unavailable and fenced off. A failed bucket 1413 includes a list of game seats that have failed.

Figure 14D:
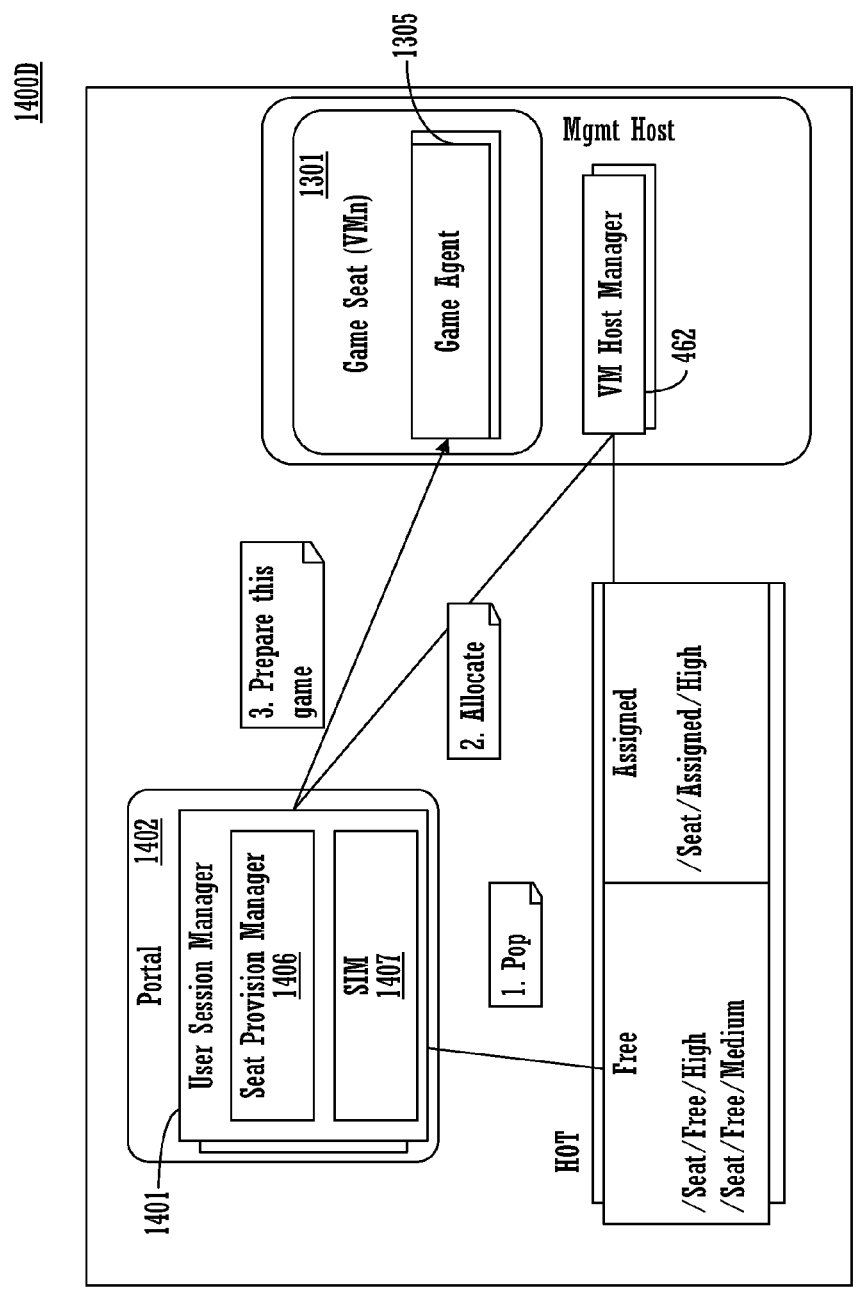

FIG. 14D is a diagram 1400D illustrating the process of seat allocation. In particular, the seat provision manager 1406 returns the first free service or game seat that can service a request, in accordance with one embodiment of the present disclosure. In one embodiment, seats with the highest performance class required are first provisioned, then the next highest, etc. the entry is popped by the seat provision manager 1406 to actually find the location of the seat. The user session manager 1401 now has the IP address that represents the game seat that is capable of executing the required task, or executing the application. The user session manager contacts the VM Host Manager 462 that controls this game seat, and asks it to ensure that game seats health. In particular, the VM Host Manager asks the game agent 1305 about the health of the game seat 1301. The VM Host Manager then complies and marks the game seat 1301 as being assigned. The user session manager 1401 then contacts the game agent 1305 to initiate the gaming application.

In the seat allocation, a game seat is available in the free list most of the time (e.g., over 95 percent). As such, the seat registration entry is moved to the HOT/assigned list. When a game seat is not available in the free list, then an error code is returned. In that case, all physical hardware is in use, and a waiting process is performed until a service release occurs before any request can be serviced. In another case, although there are not more HOT virtual machines, more virtual machines can be brought online to serve the increasing demand at a particular point in time. Furthermore, when waiting, the seat provision manager 1406 is configured to support a "call me when this type of seat is available" functionality. That is, the seat provision manager 1406 is looking for notification that a certain type of game seat has become available from the seat registry 1304.

Figure 14E:
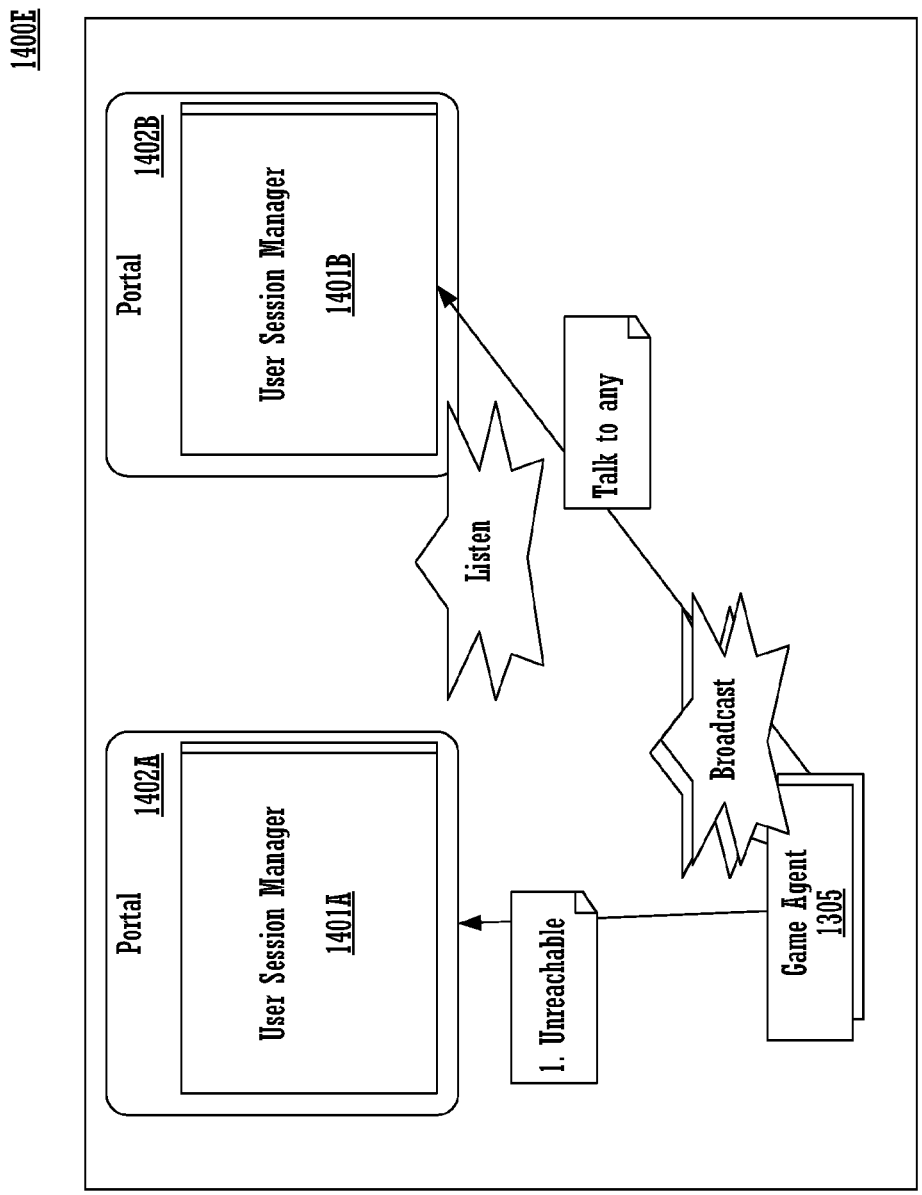

FIG. 14E is a diagram 1400E illustrating the communication from the game agent 1305 to the user session manager 1401A or 1401B, in accordance with one embodiment of the present disclosure. The game agent 1305 sends messages back to the user session managers 1401A and 1401B on provision managers to give updates on the progress of game initialization, streaming updates, crashes, etc. This communication is done using the IP address of the portal 1402A or 1402B or provision manager that initiated game initialization. If this IP address is not responsive/reachable, then the game agent is able to broadcast to all the provision managers (e.g., 1402A-N) a request asking "is there a PM out there" that can handle my request. All the provision managers are listing and will response. In addition, the game agent 1305 sense updates to the first providing manager that responds. There are two major advantages when broadcasting, when referring to registering to the provision manager, and looking up a game seat. First, if one provision manager fails, then traffic to the registry would spike in an increases of 1000 times (e.g., one provision manager per 1000 game seats). In addition, a failed provision manager may still be in the registry.

Figure 14F:
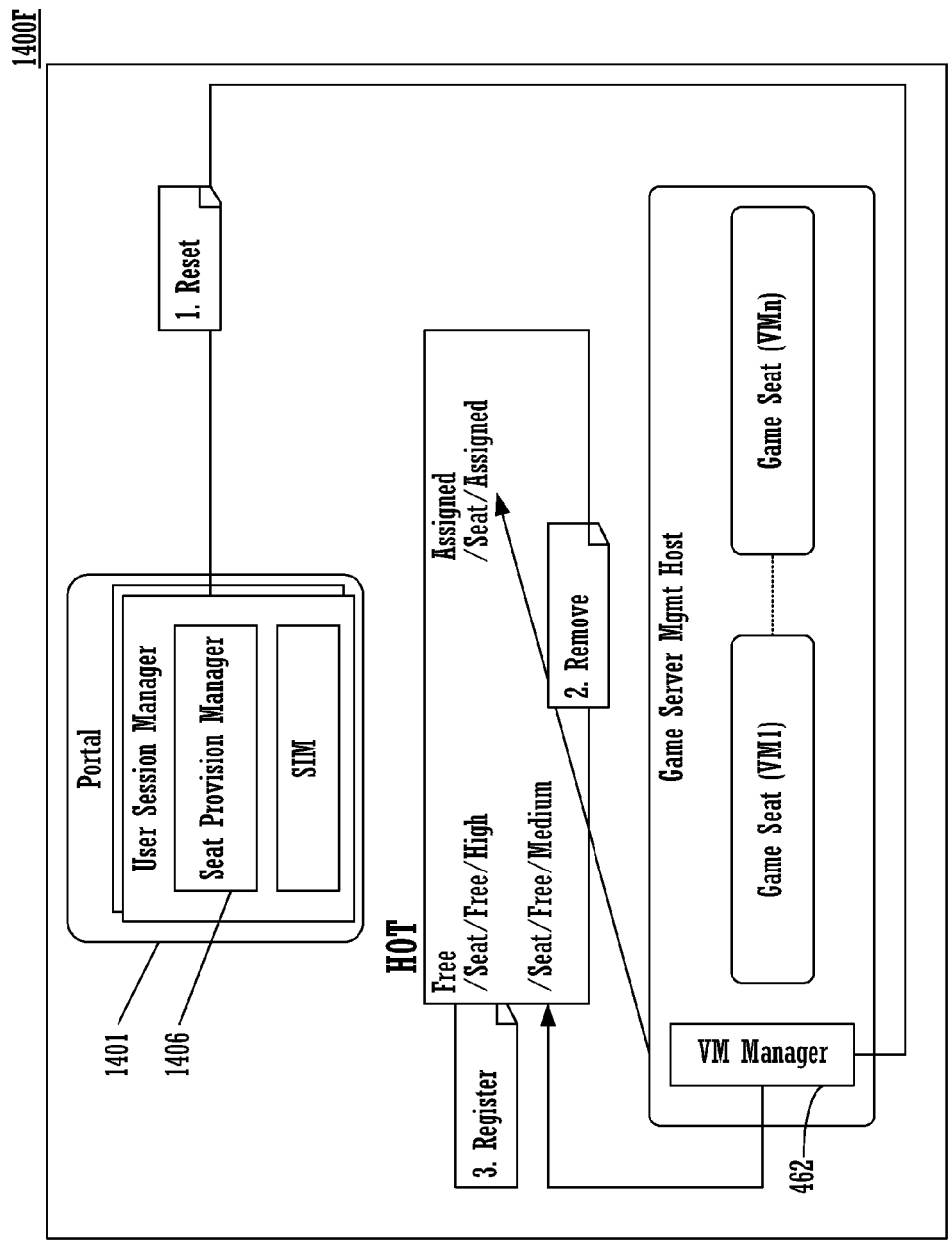

FIG. 14F is a diagram 1400F illustrating the process used when releasing a game seat, in accordance with one embodiment of the present disclosure. Once a task (e.g., game session) is complete, a user session manager 1401 invokes the seat provision manager 1406 to release a game seat. The seat provision manager 1406 involves the VM Host Manager 462 running on the physical machine/server to reset the game seat/service (e.g., reset virtual machine), in step 1. In step 2, the VM Host Manager instructs the service registry 1304 to remove the game seat, and as such, it is removed from the assigned block. In step 3, the VM Host Manager 462 resets the service and sends the registration to the service registry 1304, so that the game seat is now free and available. That is, the status of the game seat is moved from the assigned block to the free block.

When maintaining seat registrations, the VM Host Manager is responsible to maintain seat registrations. The VM Host Manager verifies that the game seats under its control are registered with the service registry 1304. In addition, if the VM Host Manager discovers that a game seat is somehow missing from the service registry 1304, then the VM Host Manager adds the game seat to the service registry 1304. The check for game seat status is periodic. For example, the VM Host Manager knows where the registration should be (e.g., under which bucket, so it should check under the correct bucket list). In addition, adding a game seat to the service registry 1304 is a synchronized operation for the VM Host Manager. Also, the VM Host Manager handles all the race conditions that may exist in the process of seat management. The race conditions are handled such that seat re-registration is not performed too hastily, and a re-verification process is performed before re-registering.

In prioritized FIFO processing, when a request to play a game comes in, it is stamped with a running global sequence number and placed in the queue that corresponds to the requested capability. This implies that there is as many queues for incoming requests as there are seat capabilities. The thread that is processing requests will create a short-lived global lock to ensure the true FIFO nature of the queue. That is, only one thread processing requests may hold the global lock at a time. The thread will try to fulfill the request with the lowest sequence number with an item (that is associated with a game seat). If no seats are available, it will try to fulfill the next lowest request item (the next sequence number in line) with a game seat that may have a lower capability, if one exists. This is done to ensure maximum seat occupancy. That is, a request for a lower capability seat is not stuck behind a request for a higher capability seat and the FIFO integrity is still maintained.

Figure 14G:
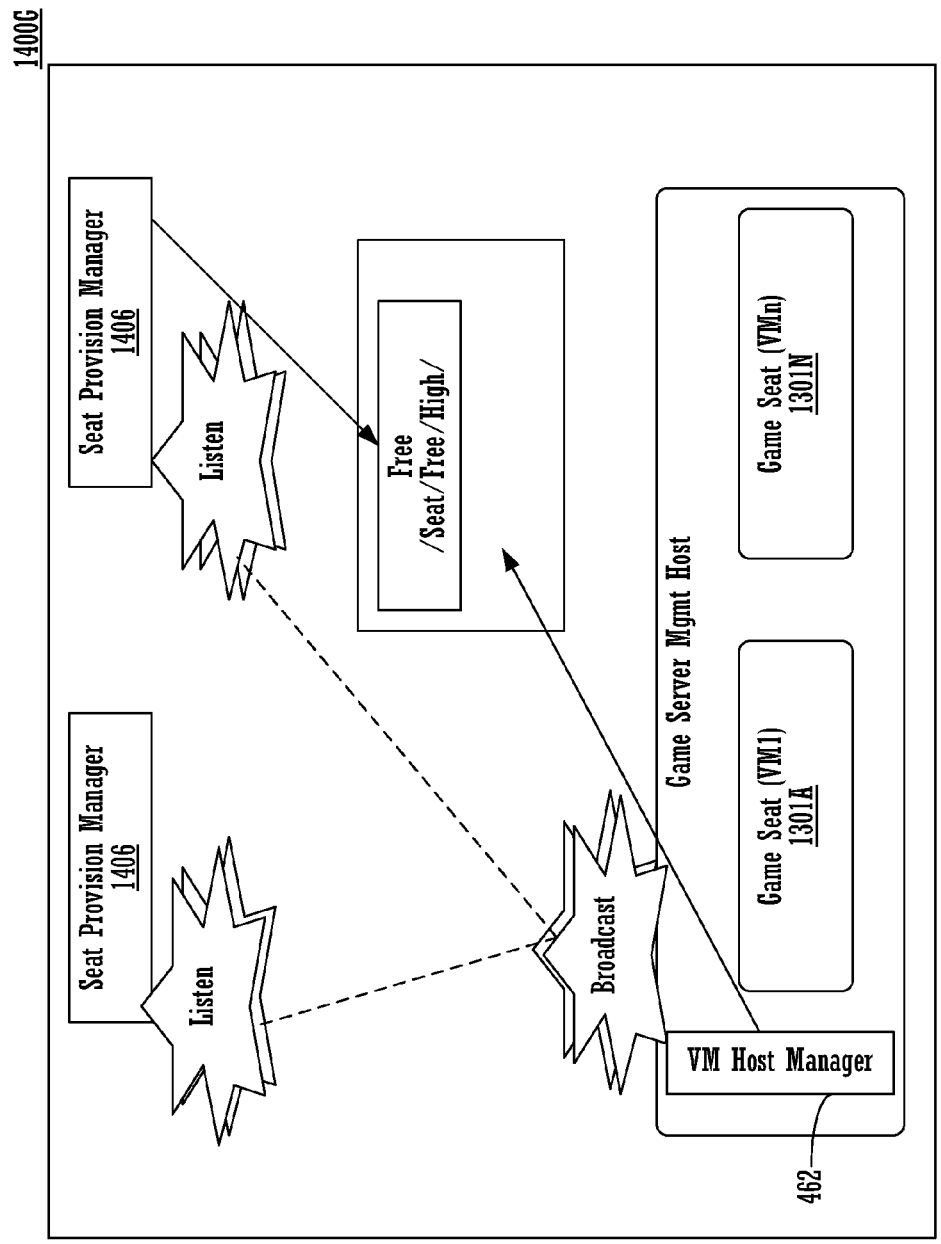

FIG. 14G is a diagram 1400G illustrating a seat provision manager call back, in accordance with one embodiment of the present disclosure. The seat provision manager 1406 supports a "call me when this service is available" feature. Specifically, the seat provision manager 1406 is not polling seat registry, but is listening to the broadcasts from the VM Host Managers. That is, the VM Host Manager is registering the seat in the seat registry 1304, and the VM Host Manager broadcast seat availability once the virtual machine is HOT.

When the seat provision manager 1406 receives a broadcast, a callback method "seat might be available" is invoked. The call back method implementation of the user session manager notifies the thread(s) that are processing the request from the user queue, and this thread gets the first entry from the prioritized FIFO queue and proceeds with normal execution. Specifically, multiple threads may compete over a single game seat that became available, but using the global lock, the integrity of the FIFO queue is maintained. Also, queue processing thread invokes an end-point (e.g., game agent) to start executing the task.

Figure 14H:
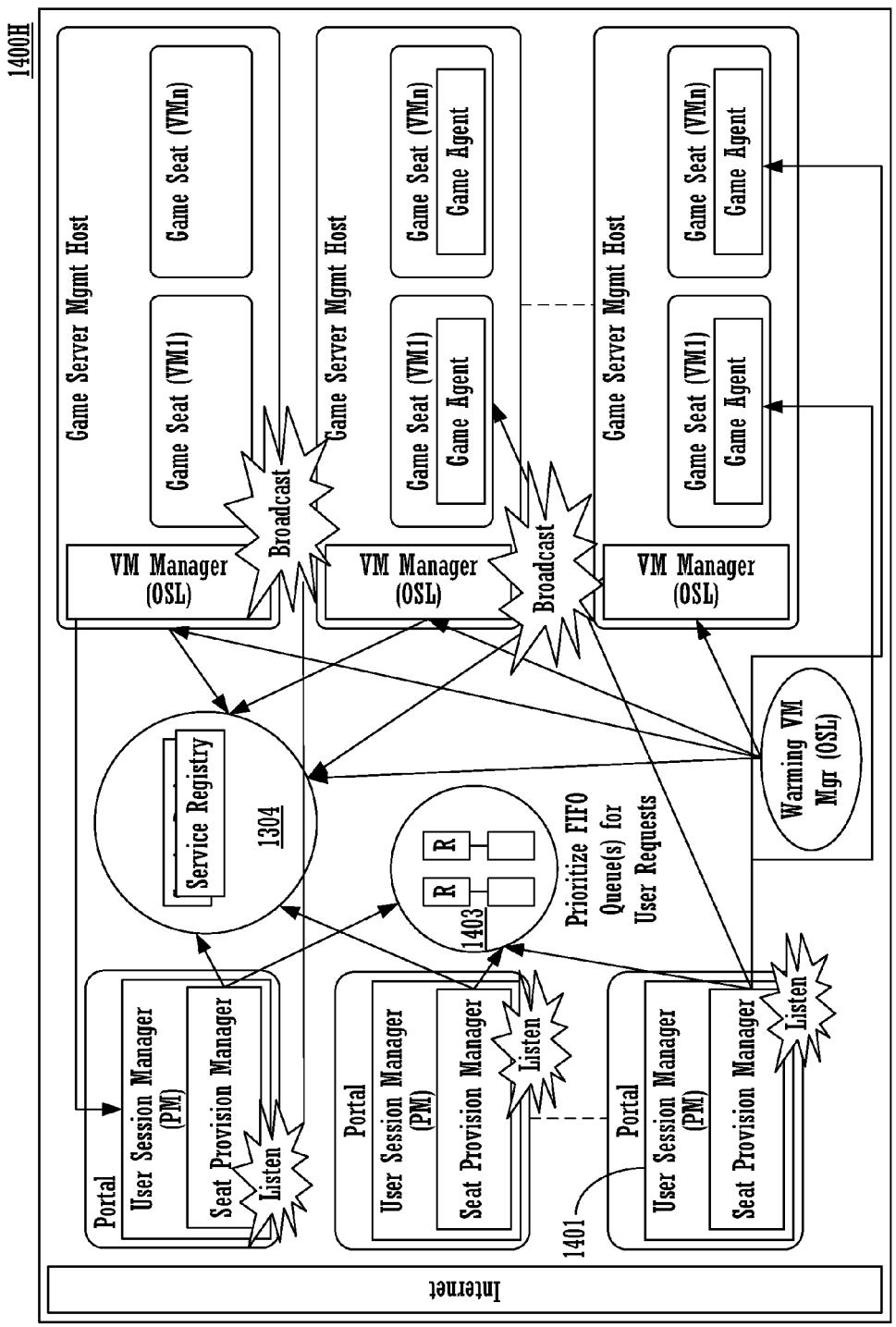

FIG. 14H is a diagram 1400H that illustrates the network connectivity between components of a cloud based graphics processing platform that is performs seat allocation, in accordance with one embodiment of the present disclosure. In one implementation, the diagram 1400H combines portions of diagrams 1400A and 1400F, wherein diagrams 1400A and 1400H illustrate the process of handling an incoming request through the user session managers 1401 located in the portals 1402 of provision managers 1303. The requests are delivered to the prioritized FIFO (e.g., 1403).

The user session manager 1401 understands the requested application specifics and asks for a service or game seat that can fulfill application specific requirements by inquiring through the service registry 1304. In addition, diagrams 1400F and 1400H illustrate the process of assigning and releasing a game seat using the VM Host Managers 462, the seat registry 1304, and the management hosts.

Figure 15:
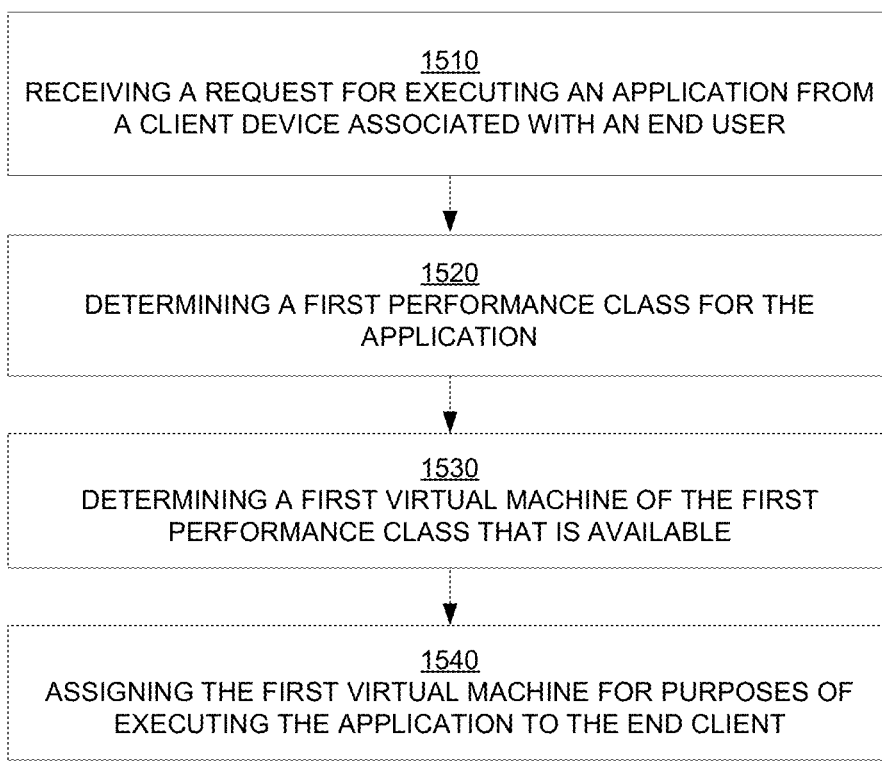
FIG. 15 is a flow chart illustrating a method for allocating a virtual machine to an end client in a cloud based graphics processing system

FIG. 15 is a flow chart illustrating a method for allocating a virtual machine to an end client in a cloud based graphics processing system, in accordance with one embodiment of the present disclosure. In still another embodiment, flow diagram 1500 illustrates a computer implemented method for allocating a virtual machine to an end client in a cloud based graphics processing system. In another embodiment, flow diagram 1500 is implemented within a computer system including a processor and memory coupled to the processor and having stored therein instructions that, if executed by the computer system causes the system to execute a method for allocating a virtual machine to an end client in a cloud based graphics processing system. In still another embodiment, instructions for performing a method as outlined in flow diagram 1500 are stored on a non-transitory computer-readable storage medium having computer-executable instructions for causing a computer system to perform a method for allocating a virtual machine to an end client in a cloud based graphics processing system. In embodiments, the method outlined in flow diagram 1500 is implementable by one or more components of the computer system 100 and client device 200 of FIGS. 1 and 2, respectively.

Flow diagram 1500 illustrates a method to allocate and assign game seats in a cloud wherein each game seat is configured to host one or more instances of gaming or application execution. A software module provision manager 1303 handles requests for game seats in a queue fashion. It translates the request into a game seat of a particular performance class in order to optimally provide the end user with the best gaming experience. Each performance class for the game seats is associated with a queue into which the requested added.

In particular, at 1510, the method includes receiving a request for executing an application from a client device associated with an end user. At 1520, the method includes determining a first performance class for the application, which indicates what kind of resources are needed to execute the application properly in order to give the end user a good gaming experience. More than one performance class may be assigned to the application. At 1530, the method includes determining a first virtual machine of the first performance class that is available. That is, virtual machines are also assigned performance classes that match those assigned to the application. By matching performance classes between the application and the virtual machine, an optimal gaming experience is provided to the end user when playing the gaming application, for example. At 1540, the method includes assigning the first virtual machine for purposes of executing the application in association with the client device. That is, the first virtual machine is assigned to the end user.

If it is determined that no virtual machine of the first performance class is available, then the method includes determining a second performance class for the application, and determining that a second virtual machine is available that is also of the second performance class. The second virtual machine is then assigned to the end user for purposes of executing the application.

Requests for game seats are treated in a first-in-first-out (FIFO) fashion. A pool of worker threads work on the various queues by peeking at the first item in the queues, checking for availability in a key-value store, and when available popping the request off in a FIFO manner. A global lock is used to ensure that requests are handled in a FIFO manner. Operation of the global lock is described in relation to FIG. 16. The provision manager 1303 contacts the resource owner of the game seat for confirmation and updated registration of the game seat. Allocation is completed by contacting the game agent 1305 running on the game seat 1301 and passing on the request details.

When implementing the FIFO queue, a request is assigned a unique global sequence number. The request is placed into one or more FIFO queues depending on the assigned performance classes of the application. Processing of the requests is handled by retrieving the first item from each of the plurality of queues, wherein each item in the plurality of queues is associated with a request having a corresponding sequence number. It is determined which of the items have the lowest sequence number. An available virtual machine is assigned to the request associated with that item. If no virtual machine is available for that item, then a next item is determined having the next lowest sequence number. An available virtual machine is assigned to that next item More generally, if no seat is determined for the item having the lowest sequence number, then the method repeatedly determines a next item with the lowest sequence number, wherein the next item has not been considered for seat assignment and allocation. Thereafter, an available virtual machine is assigned to that item.

In a physical server that is hosting multiple virtual machines, each virtual machine is considered as a game seat (e.g., 1301). It should embodiment appreciated that each virtual machine may support multiple seats, or that one seat may be supported by multiple virtual machines. Different applications may require different amounts of resources and/or processing power. For example, a 3D (there dimensional) gaming application may require more resourcing and processing than a 2D (two dimensional) gaming application. Based on the gaming application, the available seats and their corresponding performance classes, unavailable seats, and the performance class of the gaming application, as well as the performance classes of gaming seats supporting that application in history, a given seat may be designated with a certain level of performance class. Therefore, it may be determined whether a seat is appropriate to begin executing a gaming application that may require ore or less processing power. Accordingly, gaming seats may be allocated or assigned to different applications based on performance classes the available gaming seats and of the application to be executed.

Figure 16:
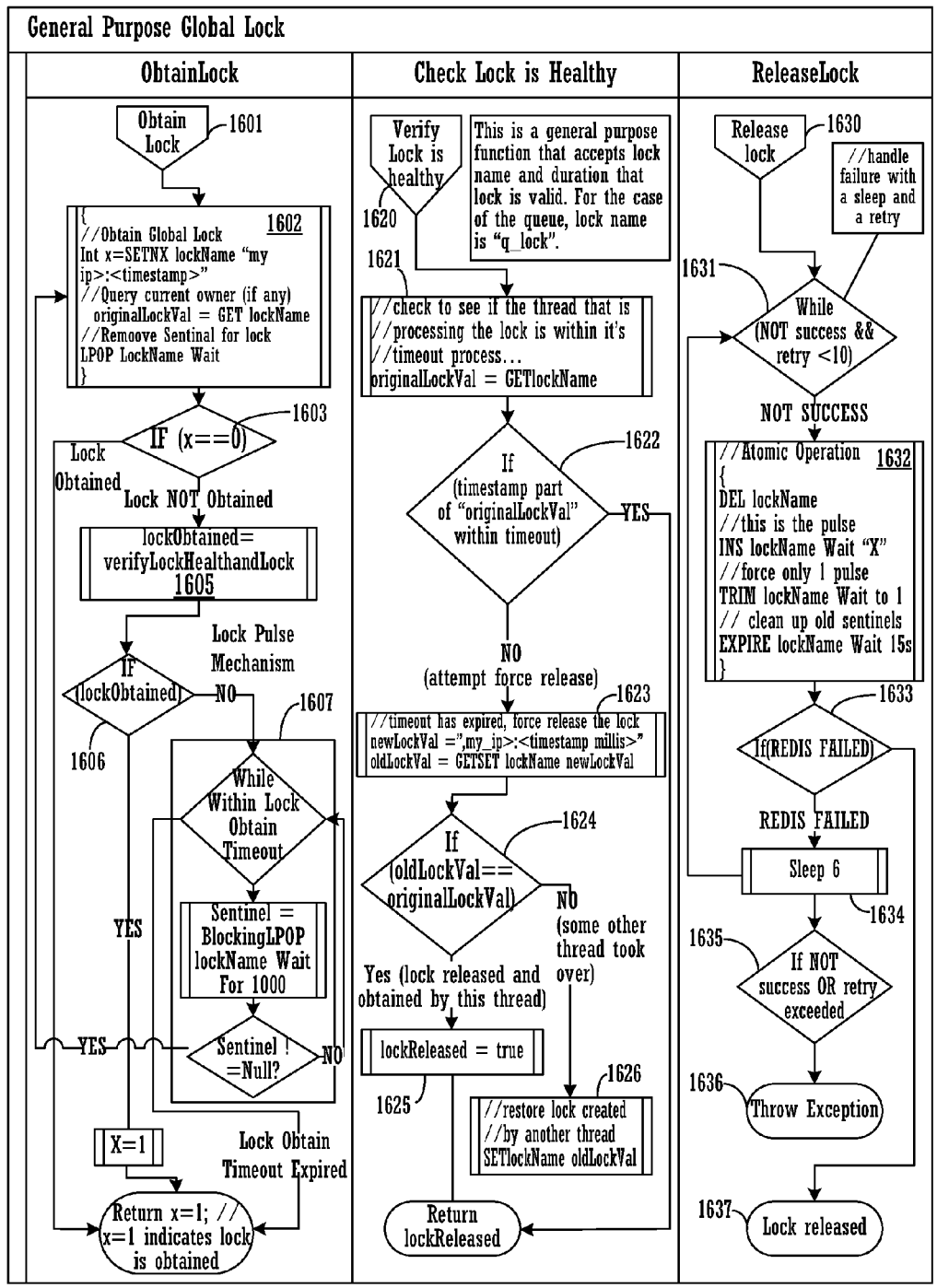
FIG. 16 is a flow chart 1600 illustrating a computer implemented method for implementing a global lock to order the handling of requests, in accordance with one embodiment of the present disclosure.

FIG. 16 is a flow chart 1600 illustrating a computer implemented method for implementing a global lock to order the handling of requests, in accordance with one embodiment of the present disclosure. In still another embodiment, flow diagram 1600 illustrates a computer implemented method for implementing a global lock to order the handling of requests. In another embodiment, flow diagram 1600 is implemented within a computer system including a processor and memory coupled to the processor and having stored therein instructions that, if executed by the computer system causes the system to execute a method for implementing a global lock to order the handling of requests. In still another embodiment, instructions for performing a method as outlined in flow diagram 1600 are stored on a non-transitory computer-readable storage medium having computer-executable instructions for causing a computer system to perform a method for implementing a global lock to order the handling of requests. In embodiments, the method outlined in flow diagram 1600 is implementable by one or more components of the computer system 100 and client device 200 of FIGS. 1 and 2, respectively.

At 1601, the method attempts to obtain the global lock. At 1602, the global lock is attempted to be obtained. At 1603, an attempt is made to acquire the lock by checking the name of the lock and seeing if the current thread or another thread set the name of the lock. At 1603, if false, then the name is not the same, and another thread has set the name, and the process goes to 1605. At 1603, if true, then the lock is obtained, and the process proceeds to 1604, wherein the request can be allocated.

On the other hand, if the lock is not obtained, then the process proceeds to 1605 and checks that health of the lock to see if the lock should be destroyed and replaced. At 1620, the process verifies that the lock is healthy. At 1621, the value of the lock is obtained from REDIS database. At 1622, a comparison is made to see if timeout has expired, the longest lifetime of a lock. At 1623, an attempt is made to free the lock. That is, the value of the lock is obtained again a second time, and a new value is placed there with a name related to the current thread. At 1624, a comparison is made to determine if the lock obtained the second time is the same as the name of the lock obtained the first time. If they are identical, then the thread can release the lock and obtain the lock (put its name to the lock in REDIS) at 1625. If not the same, then another thread has beaten this thread to release the lock. As such, at 1626, the value obtained the second time is restored back into the memory location in the REDIS database.

When releasing the lock at 1630, release is performed aggressively at 1631, and tried for about ten times. If successful, then the process ends, and the lock is released. However, if not released, then at 1632 a delete lock name operation is attempted. If successful at 1633, then the lock is released, and the process proceeds to 1637. On the other hand, if not successful at 1633, then wait 6 milliseconds at 1634, and retry back at 1631. If not successful, or the retry exceeds the maximum limit of tries, then the process at 1635 throws an exception at 1636.

Returning back to 1606, if the lock was not obtained, then a lock pulse mechanism is performed at 1607. This mechanism provides notification that a lock has been released. The notification is provided to the next thread in line to obtain the lock, wherein that thread begins at 1601.

Figure 17A:
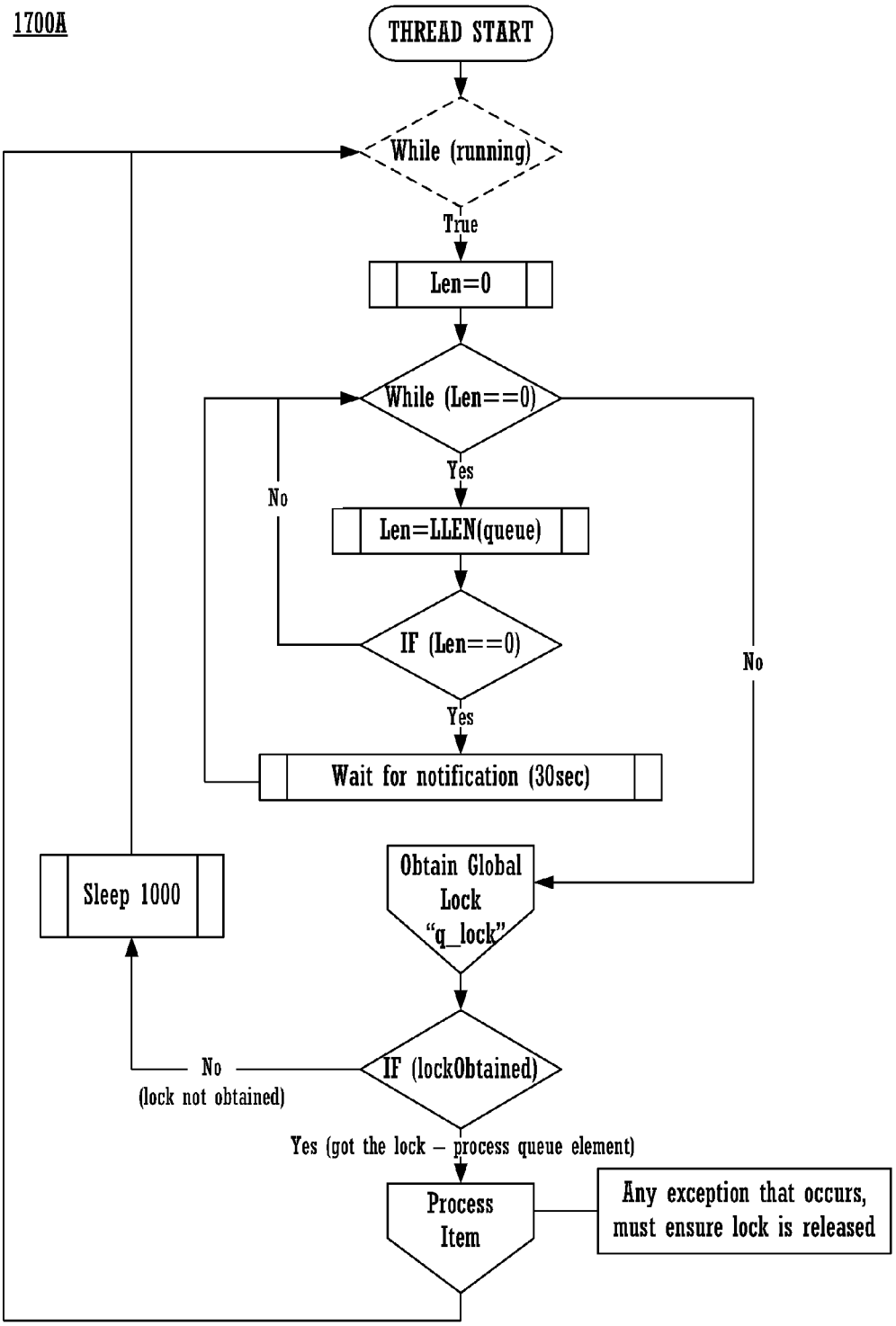
FIGS. 17A-F are illustrations of various method implemented for seat allocation in a cloud based graphics processing system, in accordance with embodiments of the present disclosure.
Figure 17B:
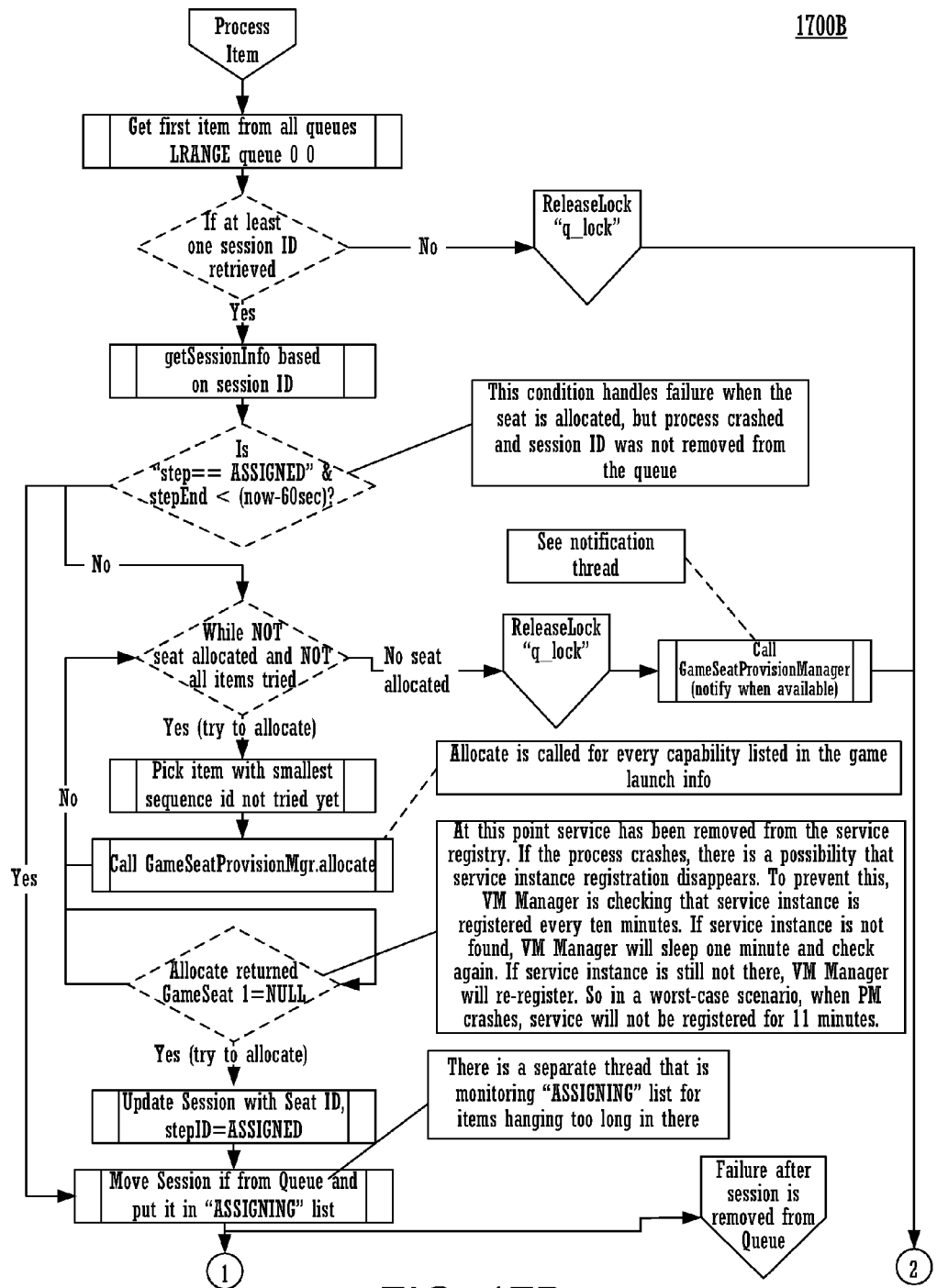
Figure 17C:
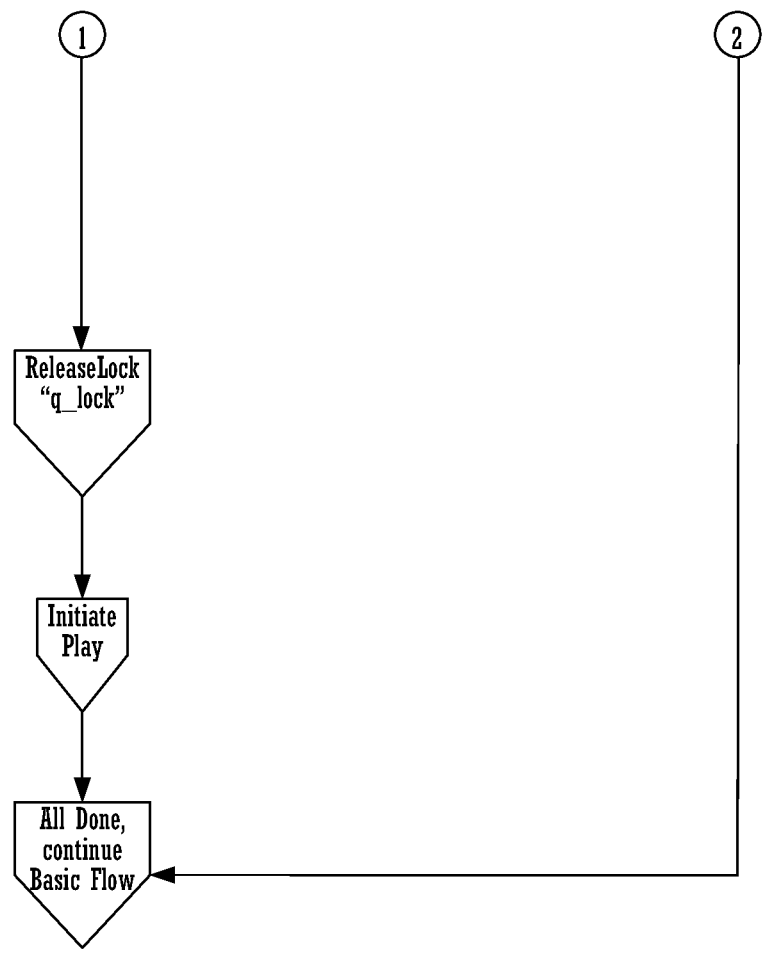
Figure 17D:
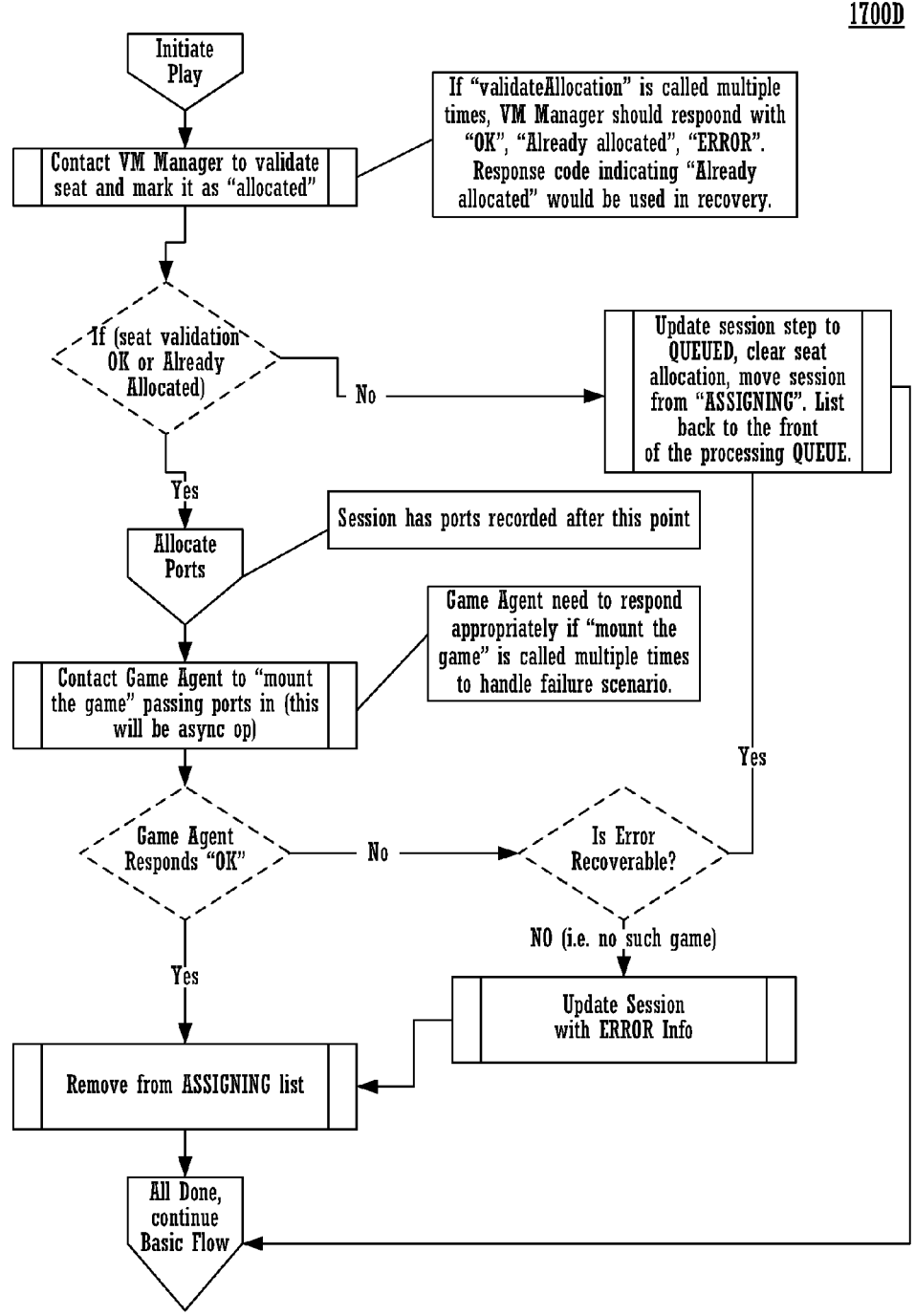
Figure 17E:
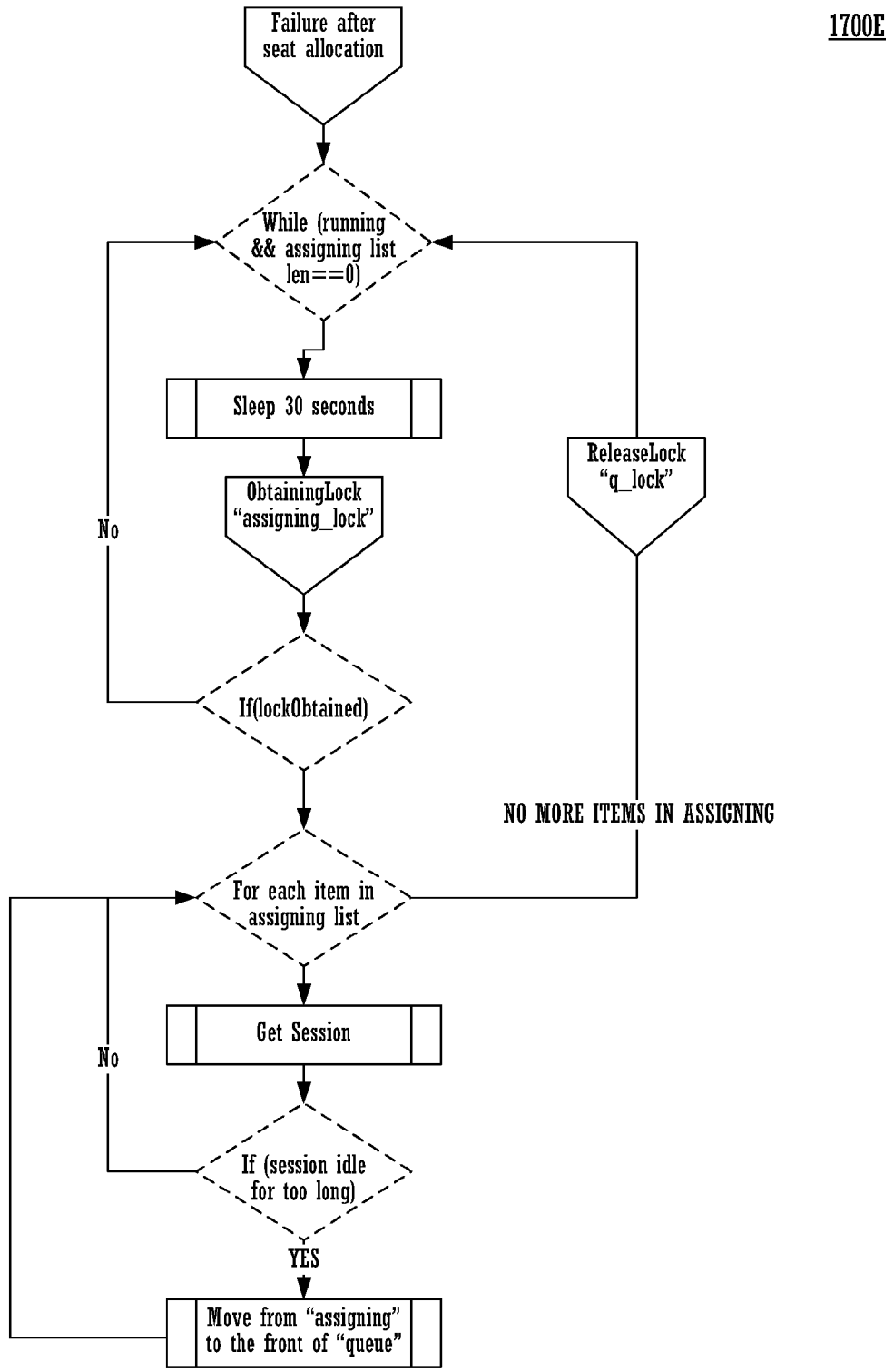
Figure 17F:
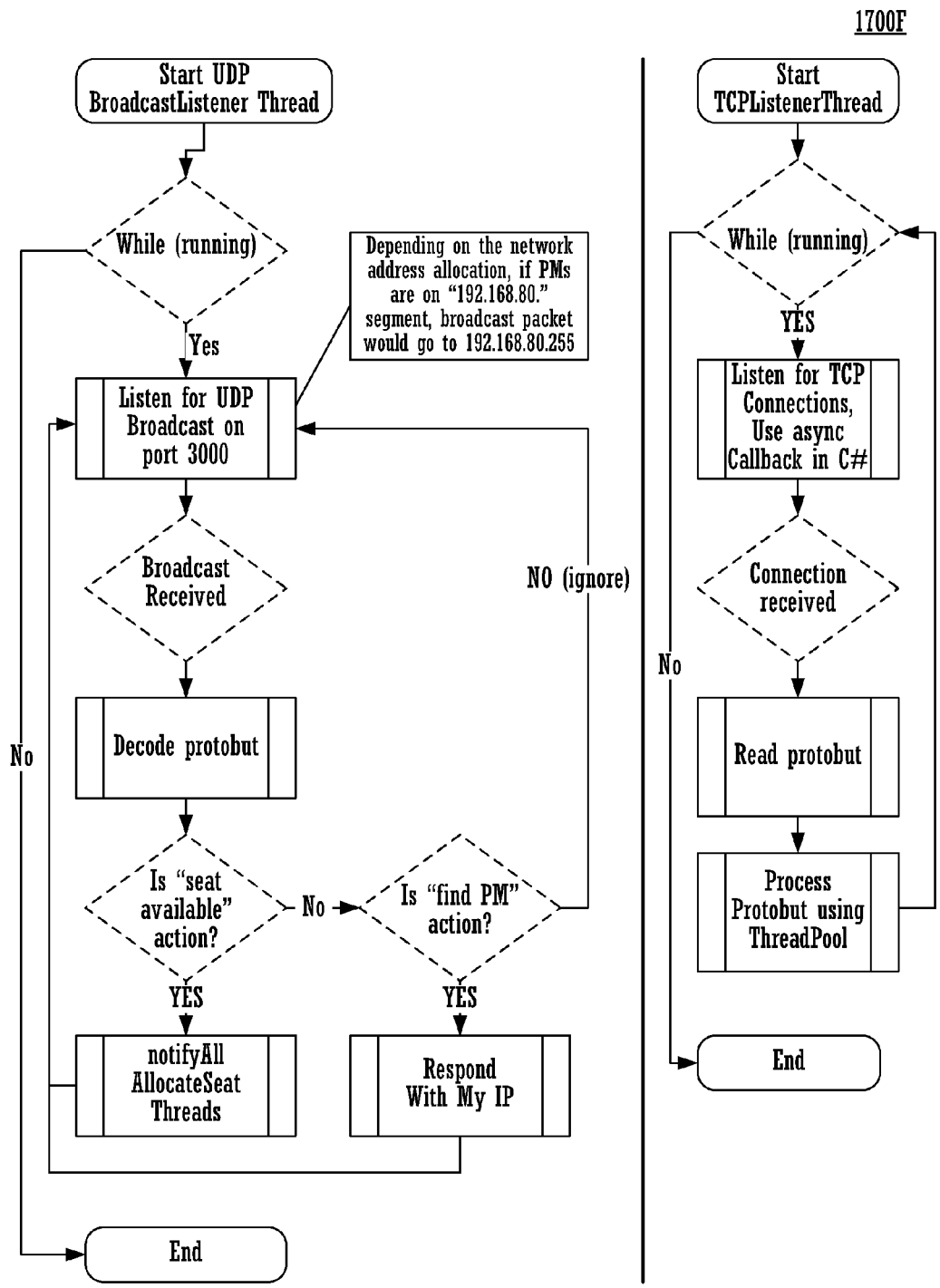

FIGS. 17A-F are illustrations of various methods implemented for seat allocation in a cloud based graphics processing system, in accordance with embodiments of the present disclosure. For example, FIG. 17A is a flow diagram 1700A illustrating a method for seat allocation by a thread that is processing a request from a FIFO queue, in accordance with one embodiment of the present disclosure. FIG. 17B-C are flow diagrams 1700B-C illustrating a method for processing a request once a global lock is acquired, in accordance with one embodiment of the present disclosure. FIG. 17D is a flow diagram 1700D illustrating a method for initiating game play, in accordance with one embodiment of the present disclosure. FIG. 17E is a flow diagram 1700E illustrating a method for recovering a thread for the "assigning" list, wherein this occurs upon a failure after seat allocation, wherein a separate thread is monitoring the "assigning" list, in accordance with one embodiment of the present disclosure. FIG. 17F is a flow diagram 1700F illustrating a method for listening for remote communication, in accordance with one embodiment of the present disclosure.

TABLE 5

LISTING OF CLAIMS

1. A method of allocation, comprising:
receiving a request for executing an application from a client device associated with an end user;
determining a first performance class for said application;
determining a first virtual machine of the first performance class that is available; and
assigning said first virtual machine for purposes of executing said application in association with said client device.

2. The method of Claim 1, further comprising:
determining a second performance class for said application when no virtual machine of said first performance class is available;
determining a second virtual machine of said second performance class that is available; and
assigning said second virtual machine for use by said end user to execute said application.

3. The method of Claim 1, further comprising:
assigning a unique global sequence number to said request;
placing said request into one or more FIFO queues depending on assigned performance classes of said application;

4. The method of Claim 3, further comprising:
retrieving a first item from each of the plurality of queues, wherein each item in said plurality of queues is associated with a request having a corresponding sequence number;
determining which of said retrieved items has the lowest sequence number; and
assigning an available virtual machine to a request associated with said item having the lowest sequence number.

5. The method of Claim 4, further comprising:
determining that no virtual machine is available for said item having the lowest sequence number;
determining a next item with a next lowest sequence number; and
assigning an available virtual machine to said item with said next lowest sequence number.

6. The method of Claim 4, further comprising:
determining that no virtual machine is available for said item having the lowest sequence number;
repeatedly determining a next item with a next lowest sequence number that has not been considered; and
assigning an available virtual machine to said item with said next lowest sequence number that has not been considered.

7. The method of Claim 1, wherein said virtual machine is instantiated in a cloud based processing system providing graphics processing for a remote display associated with said client device.

8. A non-transitory computer readable medium having computer executable instructions for causing a computer system to perform a method for allocation, comprising:
receiving a request for executing an application from a client device associated with an end user;
determining a first performance class for said application;
determining a first virtual machine of the first performance class that is available; and
assigning said first virtual machine for purposes of executing said application in association with said client device.

9. The computer readable medium of Claim 8, wherein said method further comprises:
determining a second performance class for said application when no virtual machine of said first performance class is available;
determining a second virtual machine of said second performance class that is available; and
assigning said second virtual machine for use by said end user to execute said application.

10. The computer readable medium of Claim 8, wherein said method further comprises:
assigning a unique global sequence number to said request;
placing said request into one or more FIFO queues depending on assigned performance classes of said application;

11. The computer readable medium of Claim 10, wherein said method further comprises:
retrieving a first item from each of the plurality of queues, wherein each item in said plurality of queues is associated with a request having a corresponding sequence number;
determining which of said retrieved items has the lowest sequence number; and
assigning an available virtual machine to a request associated with said item having the lowest sequence number.

12. The computer readable medium of Claim 11, wherein said method further comprises:
determining that no virtual machine is available for said item having the lowest sequence number;

TABLE 5-continued

LISTING OF CLAIMS determining a next item with a next lowest sequence number; and
assigning an available virtual machine to said item with said next lowest sequence number.
13. The computer readable medium of Claim 11, wherein said method further comprises:
determining that no virtual machine is available for said item having the lowest sequence number;
repeatedly determining a next item with a next lowest sequence number that has not been considered; and
assigning an available virtual machine to said item with said next lowest sequence number that has not been considered.
14. The computer readable medium of Claim 8, wherein in said method said virtual machine is instantiated in a cloud based processing system providing graphics processing for a remote display associated with said client device.
15. A computer system comprising:
a processor; and
memory coupled to said processor and having stored therein instructions that, if executed by a computer system, causes said computer system to execute a method of allocation, comprising:
receiving a request for executing an application from a client device associated with an end user;
determining a first performance class for said application;
determining a first virtual machine of the first performance class that is available; and
assigning said first virtual machine for purposes of executing said application in association with said client device.
16. The computer system of Claim 1, wherein said method further comprises:
determining a second performance class for said application when no virtual machine of said first performance class is available;
determining a second virtual machine of said second performance class that is available; and
assigning said second virtual machine for use by said end user to execute said application.
17. The computer system of Claim 15, wherein said method further comprises:
assigning a unique global sequence number to said request;
placing said request into one or more FIFO queues depending on assigned performance classes of said application;
18. The computer system of Claim 17, wherein said method further comprises:
retrieving a first item from each of the plurality of queues, wherein each item in said plurality of queues is associated with a request having a corresponding sequence number;
determining which of said retrieved items has the lowest sequence number; and
assigning an available virtual machine to a request associated with said item having the lowest sequence number.
19. The computer system of Claim 18, wherein said method further comprises:
determining that no virtual machine is available for said item having the lowest sequence number;
determining a next item with a next lowest sequence number; and
assigning an available virtual machine to said item with said next lowest sequence number.
20. The computer system of Claim 18, wherein said method further comprises:
determining that no virtual machine is available for said item having the lowest sequence number;
repeatedly determining a next item with a next lowest sequence number that has not been considered; and
assigning an available virtual machine to said item with said next lowest sequence number that has not been considered.

Thus, according to embodiments of the present disclosure, systems and methods are described implementing cloud based virtualized graphics processing for remote displays, as implemented through visual computing appliances.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples in that many architectural variants can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A method for network cloud resource generation, comprising:
    creating, using one or more cloud based processors executing programmed instructions stored in one or more cloud based memory devices, a template virtual machine;
    creating a first instantiation of a virtual machine for an end user by cloning said template in the one or more cloud based processors located remotely from said end user;
    loading an application to be executed by said virtual machine;
    accessing first information associated with said end user, said first information corresponding to user interactions within said application;
    loading said first information in an instantiation of said application;
    updating said first information based on said instantiation of said application; and
    storing said updated first information in a storage system, wherein subsequent instantiations of said virtual machine are customized for said end user by creating new instantiations with said template virtual machine and automatically modifying said new instantiations with said updated first information.

2. The method of claim 1, wherein said template virtual machine comprises a plurality of pre-selected gaming applications available to each of a plurality of end users.

3. The method of claim 1, wherein said accessing first information comprises:
    accessing a saved game file associated with said application.

4. The method of claim 1, wherein said accessing first information comprises:
    accessing a user profile of said user.

5. The method of claim 1, further comprising:
    receiving an instruction to terminate said first instantiation of said virtual machine, wherein said storing said modification information is performed responsive to said receiving said instruction to terminate.

6. The method of claim 1, wherein said creating a first instantiation of a virtual machine comprises:
    determining an original allocation of a plurality of resources for said first instantiation of said virtual machine;
    reducing said original allocation of said plurality of resources; and
    initializing said virtual machine using said reduced allocation of said plurality of resources.

7. The method of claim 6, wherein said reducing said original allocation comprises:
    reducing said original allocation for each of said plurality of resources.

8. The method of claim 7, wherein said reducing said original allocation comprises:
    allocating each of said plurality of resources at an amount that is less than twenty-five percent of a corresponding original allocation.

9. The method of claim 6, further comprising:
    after said virtual machine is instantiated, allocating additional resources for each of said plurality of resources to reach said original allocation.

10. The method according to claim 6, wherein said reducing said original allocation of said plurality of resources further comprises reducing adverse effects upon other existing and operational instantiations of said virtual machine template resulting from said original allocation of said plurality of resources.

11. The method of claim 1, wherein said initializing said virtual machine further comprises:
    initializing said first instantiation of said virtual machine in a cloud based graphics processing system for an end user.

12. A non-transitory computer readable medium having computer executable instructions for causing a computer system to perform a method for network cloud resource generation, comprising:
    creating, using one or more cloud based processors executing programmed instructions stored in one or more cloud based memory devices, a template virtual machine;
    creating a first instantiation of a virtual machine for an end user by cloning said template in the one or more cloud based processors;
    loading an application to be executed by said virtual machine;
    accessing specific information associated with said end user, said specific information corresponding to user interactions within said application;
    loading said specific information in an instantiation of said application;
    updating said specific information based on said instantiation of said application; and
    storing said updated specific information in a storage system,
    wherein subsequent instantiations of said virtual machine are customized for said end user by creating new instantiations with said template virtual machine and automatically modifying said new instantiations with said updated specific information.

13. The computer readable medium of claim 12, wherein in said method said template virtual machine comprises a plurality of pre-selected gaming applications available to each of a plurality of end users.

14. The computer readable medium of claim 12, wherein said accessing first information in said method comprises:
    accessing a saved game file associated with said application; and
    accessing a user profile of said user.

15. The computer readable medium of claim 12, wherein said creating an instantiation of a virtual machine in said method comprises:
    determining an original allocation of a plurality of resources for said first instantiation of a virtual machine;
    reducing said original allocation of said plurality of resources; and
    initializing said virtual machine using said reduced allocation of said plurality of resources.

16. The computer readable medium of claim 15, wherein said method further comprises:
    after said virtual machine is instantiated, allocating additional resources for each of said plurality of resources to reach said original allocation.

17. The computer readable medium of claim 15, wherein said plurality of resources comprises a number of CPU cores, and an amount of memory.

18. The compute readable medium according to claim 15, wherein said reducing said original allocation of said plurality of resources further comprises reducing adverse effects upon other existing and operational instantiations of said virtual machine template resulting from said original allocation of said plurality of resources.

19. A computer system comprising:
    a cloud-based processor; and
    a cloud-based memory coupled to said cloud-based processor and having stored therein instructions that, if executed by a computer system, causes said computer system to execute a method for network cloud resource generation, comprising:
    creating a template virtual machine in said cloud-based processor;
    creating a first instantiation of a virtual machine for an end user by cloning said template;
    loading an application to be executed by said virtual machine;
    accessing specific information associated with said end user, said specific information corresponding to user interactions within said application;
    loading said specific information in an instantiation of said application;
    updating said specific information based on said instantiation of said application; and
    storing said updated specific information in a storage system,
    wherein subsequent instantiations of said virtual machine are customized for said end user by creating new instantiations with said template virtual machine and automatically modifying said new instantiations with said updated specific information.

20. The computer system of claim 19, wherein in said method said template virtual machine comprises a plurality of pre-selected gaming applications available to each of a plurality of end users.

21. The computer system of claim 19, wherein said creating an instantiation of a virtual machine in said method comprises:
    determining an original allocation of a plurality of resources for said first instantiation of said virtual machine;
    reducing said original allocation of said plurality of resources; and
    initializing said virtual machine using said reduced allocation of said plurality of resources.

22. The computer system of claim 21, wherein said method further comprises:
    after said virtual machine is instantiated, allocating additional resources for each of said plurality of resources until reaching said original allocation.

23. The computer system according to claim 21, wherein said reducing said original allocation of said plurality of resources further comprises reducing adverse effects upon other existing and operational instantiations of said virtual machine template resulting from said original allocation of said plurality of resources.

\* \* \* \* \*